US012671894B2

(12) United States Patent
Dong et al.

(10) Patent No.: US 12,671,894 B2
(45) Date of Patent: Jun. 30, 2026

(54) PREVIEW METHOD, ELECTRONIC DEVICE, AND SYSTEM

(71) Applicant: Huawei Technologies Co., Ltd., Shenzhen (CN)

(72) Inventors: Xiaojie Dong, Shenzhen (CN); Xiaolong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 18/691,379

(22) PCT Filed: Sep. 9, 2022

(86) PCT No.: PCT/CN2022/118163
§ 371 (c)(1),
(2) Date: Mar. 12, 2024

(87) PCT Pub. No.: WO2023/040775
PCT Pub. Date: Mar. 23, 2023

(65) Prior Publication Data
US 2024/0406540 A1 Dec. 5, 2024

(30) Foreign Application Priority Data
Sep. 14, 2021 (CN) .......................... 202111076797.X

(51) Int. Cl.
*H04N 23/63* (2023.01)
*G06F 3/04883* (2022.01)
*H04N 23/62* (2023.01)

(52) U.S. Cl.
CPC ....... *H04N 23/632* (2023.01); *G06F 3/04883* (2013.01); *H04N 23/62* (2023.01)

(58) Field of Classification Search
CPC .. H04N 23/632; H04N 23/62; G06F 3/04883; G06F 2203/04105; G06F 1/163; G06F 1/1694; G06F 3/0481; G06F 9/451; G06F 3/0484; G06F 3/0488
See application file for complete search history.

(56) References Cited

U.S. PATENT DOCUMENTS

2017/0053542 A1* 2/2017 Wilson .................... G06F 3/011
2020/0264567 A1* 8/2020 Ok ............................ G06T 7/90
2021/0158622 A1* 5/2021 Leelaphattarakij ..........................
                                              G06F 3/04815

FOREIGN PATENT DOCUMENTS

KR          20170025406 A          3/2017

* cited by examiner

*Primary Examiner* — Christopher K Peterson
(74) *Attorney, Agent, or Firm* — Slater Matsil, LLP

(57) ABSTRACT

This application discloses a preview method, an electronic device, and a system. The disclosure includes a first device that displays an image collection area. The first device collects and identifies an image of at least a first object including a second device having a home screen theme and including an object enabling wearing of the second device (e.g., a worn on a part of a user). The first device displays a first image that includes an image depiction of the second device and an image depiction of the object enabling wearing of the second device. The home screen theme displayed includes a second theme selected by a user.

20 Claims, 52 Drawing Sheets

| Application layer | Camera | Calendar | Map | WLAN | Music | Settings |
|---|---|---|---|---|---|---|
| | Gallery | Phone | Navigation | Bluetooth | Videos | ... |

| Application framework layer | Window manager | Content provider | Phone manager | Resource manager |
|---|---|---|---|---|
| | Notification manager | View system | ... | |

| System library | Surface manager | Three-dimensional graphics processing library | Android runtime |
|---|---|---|---|
| | Two-dimensional graphics engine | Media library | ... |

| Kernel layer | Display driver | Camera driver | |
|---|---|---|---|
| | Audio driver | Sensor driver | ... |

FIG. 1B

Communication system 10

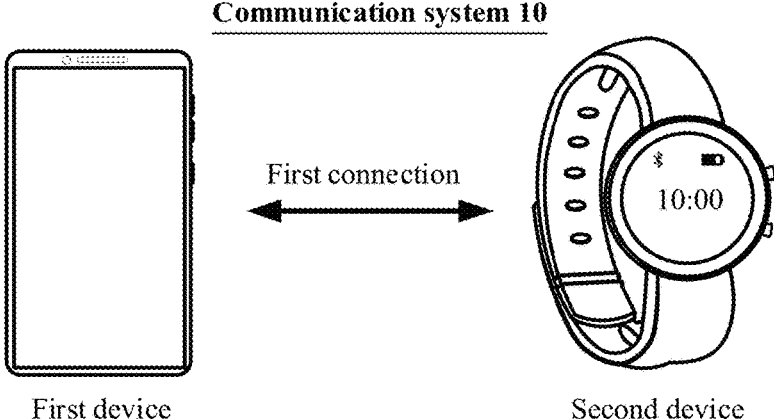

First connection

First device        Second device

FIG. 2

User interface 300

User interface 400

User interface 500

601

~
TO

User interface 600

User interface 600

TO

User interface 700

CONT.
FROM

~

User interface 800

CONT.
FROM

~

User interface 900

CONT.
FROM

~

User interface 700

User interface 1000

CONT.
FROM

~

User interface 1100

TO

User interface 1120

CONT.
FROM

~

601

90%

10:00
Thursday
09/09

~
TO

CONT.
FROM

~

601

~
TO

CONT.
FROM

~

TO

~

User interface 1120

Monday
Tuesday
Wednesday
Thursday
Friday
Saturday
Sunday 3D collection

90%

10:00 AM

Thursday
09/09

1121

1122

CONT.
FROM

~

Simple series
10:00 AM

Cherry blossom
10:00 AM

Star
10:00 A

Matching wristband A    1104

601

∼
TO

CONT. FROM FIG. 12C-1
~

CONT.
FROM

~

601

CONT.
FROM

~

1301

TO

User interface 1400

User interface 1900

User interface 1910

CONT.
FROM

~

1911

User interface 2000

CONT.
FROM

~

2001

CONT.
FROM

~

User interface 2400

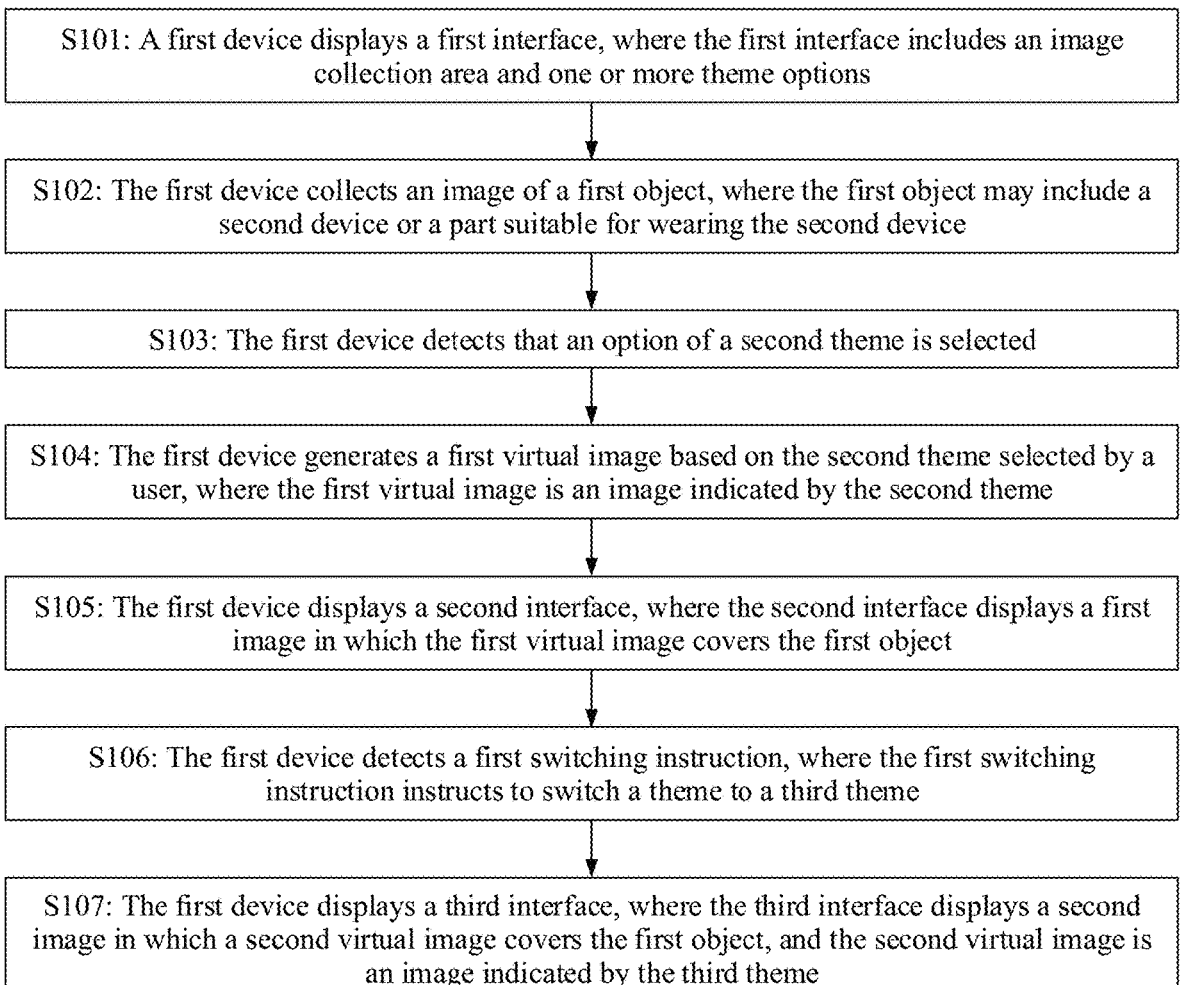

S101: A first device displays a first interface, where the first interface includes an image collection area and one or more theme options S102: The first device collects an image of a first object, where the first object may include a second device or a part suitable for wearing the second device S103: The first device detects that an option of a second theme is selected S104: The first device generates a first virtual image based on the second theme selected by a user, where the first virtual image is an image indicated by the second theme S105: The first device displays a second interface, where the second interface displays a first image in which the first virtual image covers the first object S106: The first device detects a first switching instruction, where the first switching instruction instructs to switch a theme to a third theme S107: The first device displays a third interface, where the third interface displays a second image in which a second virtual image covers the first object, and the second virtual image is an image indicated by the third theme

FIG. 26

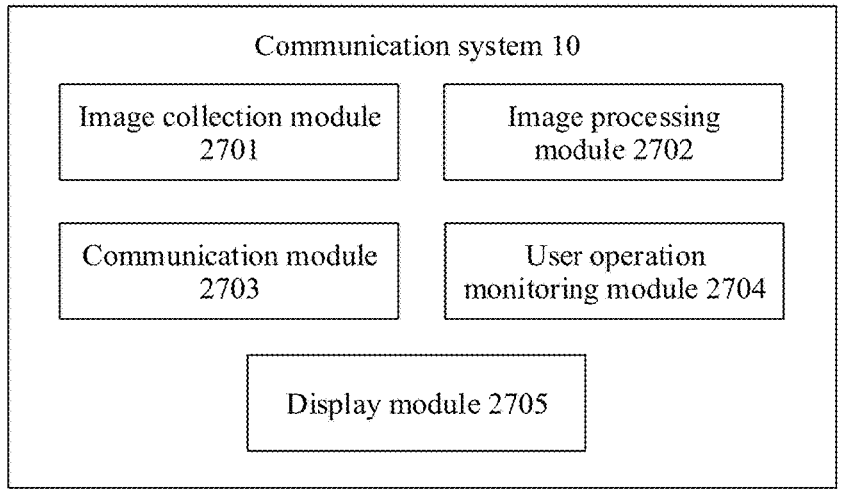

Communication system 10

Image collection module 2701

Image processing module 2702

Communication module 2703

User operation monitoring module 2704

Display module 2705

FIG. 27

PREVIEW METHOD, ELECTRONIC DEVICE, AND SYSTEM

CROSS-REFERENCE TO RELATED APPLICATIONS

This application is a National Stage of International Patent Application No. PCT/CN2022/118163, filed on Sep. 9, 2022, which claims priority to Chinese Patent Application No. 202111076797.X, filed on Sep. 14, 2021, both of which are hereby incorporated by reference in their entireties.

TECHNICAL FIELD

This application relates to the field of terminal technologies, and in particular, to a preview method, an electronic device, and a system.

BACKGROUND

With the upgrade of consumption, a quantity of intelligent terminal devices owned by users is increasing. For a terminal device configured with a display, a user increasingly pursues aesthetic, personalized, and diversified home screen displaying, and the like.

For requirements of the user, developers design many home screens of different styles and different patterns for the user to select. However, the user usually can only view, in an introduction interface for a home screen, a display effect image of the home screen provided by a designer, and cannot preview display effect in an actual use scenario. However, after the user purchases the home screen, in the actual use scenario, the display effect of the home screen may not be as expected by the user, and user experience is poor.

SUMMARY

This application provides a preview method, an electronic device, and a system. The preview method may support a first device in collecting and identifying an image of a contour (or a contour of a screen) of a second device or a part (for example, a wrist part of a user) on which the second device, and the like. Then, the first device displays, in a photographing preview interface by using an image processing technology, a picture in which a home screen theme image of a home screen option selected by the user covers a corresponding position such as the screen of the second device or the part on which the second device is worn.

The foregoing objective and other objectives are achieved by using features in the independent claims. Further implementations are embodied in the dependent claims, the specification, and the accompanying drawings.

According to a first aspect, an embodiment of this application provides a preview method. The method includes: A first device displays an image collection area. The first device collects an image of a first object, where the first object includes a second device, the second device has a display, a home screen theme displayed on the display is a first theme, the image of the first object includes a display of the first object and the first theme, and the first object further includes an object for wearing the second device. The first device displays the first image in the image collection area, where the first image includes the second device and the object for wearing the second device, and a home screen theme displayed in an area of the display in the first image is a second theme selected by a user.

According to the method in the first aspect, the user may preview display effect of different selected home screen themes in an actual environment on the first device. According to the method provided in this application, human-machine interaction performance can be enhanced, a more intuitive, vivid, convenient, and interesting preview manner is provided for the user, and user experience is improved.

In some embodiments, the first object includes a screen area of the second device, and may further include another non-screen area of the second device, for example, a wristband, a watch crown, or a side frame of a smart watch, a keyboard, a base, or a side frame of a computer, or a side frame of a digital photo frame.

With reference to the first aspect, in some embodiments, the first device receives a first switching instruction, where the first switching instruction instructs to switch from the second theme to a third theme. The first device displays a second image in the image collection area, where a home screen theme displayed in the area of the display in the second image is the third theme. For example, the second theme and the third theme are different home screen themes. The second theme or the third theme may be a static image or a dynamic image.

With reference to the first aspect, in some embodiments, the first switching instruction may include any one or more of the following: a first user operation that is detected by the first device and that is performed on the first device, a second user operation that is detected by the second device and that is performed on the second device, a switching instruction that is automatically sent by the first device at an interval of a first time period, and the like. The first device and/or the second device may further support detection of a user operation such as a touch, a gesture, or a voice, and convert the user operation into a corresponding instruction. For example, a display of the first device and/or the display of the second device may identify a touch operation, and when a flick-left, flick-right, flick-up, or flick-down user operation on a touchscreen is detected, an image may be correspondingly switched to for display. Alternatively, the first device and/or the second device may detect a device status via one or more sensors such as an acceleration sensor, a gravity sensor, and a gyroscope sensor, for example, tilting leftward, tilting rightward, tilting upward, and tilting downward, and may correspondingly switch to an image for display. Alternatively, the first device and/or the second device may further detect a user gesture via a camera or another sensor, detect that a button such as a volume button or a watch crown is pressed, rotated, or the like, or collect a user voice via a microphone, or the like, convert the foregoing operation into an instruction for switching to an image for display, and respond to the instruction. These user operations enable the user to more conveniently and quickly switch between and preview different home screen themes.

With reference to the first aspect, in some embodiments, the first user operation may include any one or more of the following: a flick operation performed on a touchscreen of the first device, a tap operation performed on the touchscreen of the first device, a gesture operation of moving toward a first direction, a voice switching operation, a press, touch, or rotation operation performed on a first button of the first device, and the like.

The second user operation may include any one or more of the following: a flick operation performed on a touchscreen of the second device, a tap operation performed on the touchscreen of the second device, a gesture operation of moving toward a second direction, a gesture operation of rotating a wrist toward a third direction, a voice switching operation, a press, touch, or rotation operation performed on a second button of the second device, and the like.

With reference to the first aspect, in some embodiments, the first theme includes a plurality of display interfaces, for example, includes a first display interface and a second display interface, and the method may further include: The first device receives a second switching instruction, where the second switching instruction instructs to switch from the first display interface of the first theme to the second display interface. The first device displays a third image in the image collection area, where the second display interface of the first theme is displayed in the area of the display in the third image. For example, a home screen theme may include one or more interfaces, such as a main interface, an icon interface, a lock screen interface, and a password input interface, and even may include an image of another area, such as an image of a wristband matching a watch face of a watch. A home screen theme may alternatively be a series theme, and include a plurality of watch faces with similar design styles, for example, including a series theme corresponding to seven interfaces for Monday to Sunday.

In some embodiments, the first display interface displays one or more of the following: a wireless signal strength indicator, a battery level indicator, and a time indicator. The second display interface displays one or more application icons. For example, the first display interface is a main interface, and the second display interface is an icon interface.

With reference to the first aspect, in some embodiments, the second switching instruction may include any one or more of the following: a third user operation that is detected by the first device and that is performed on the first device, a fourth user operation that is detected by the second device and that is performed on the second device, a switching instruction that is automatically sent by the first device at an interval of a second time period, and the like. These user operations enable the user to more conveniently and quickly switch between and preview different home screen themes.

With reference to the first aspect, in some embodiments, the third user operation may include any one or more of the following: a flick operation performed on the touchscreen of the first device, a tap operation performed on the touchscreen of the first device, a gesture operation of moving toward a fourth direction, a voice switching operation, a press, touch, or rotation operation performed on a third button, and the like.

The fourth user operation may include any one or more of the following: a flick operation performed on the touchscreen of the second device, a tap operation performed on the touchscreen of the second device, a gesture operation of moving toward a fifth direction, a gesture operation of rotating a wrist toward a sixth direction, a voice switching operation, a press, touch, or rotation operation performed on a fourth button, and the like.

With reference to the first aspect, in some embodiments, the flick operation performed on the touchscreen of the first device includes a flick operation performed on the image collection area in the touchscreen of the first device.

In some embodiments, if a currently displayed home screen theme is a last home screen interface of the series theme, when an operation of indicating to display the next one is detected, a first home screen interface in the series watch face may be returned to be displayed. For example, when displaying a simple series watch face corresponding to Sunday, after detecting a flick-down operation of the user, a mobile phone may display a simple series watch face corresponding to Monday. When displaying the simple series watch face corresponding to Monday, after detecting a flick-up operation of the user, the mobile phone may display the simple series watch face corresponding to Sunday, where watch face options of Monday and Sunday may be linked.

In some other embodiments, if a currently displayed home screen theme is a last home screen interface of the series theme, when an operation of indicating to display the next one is detected, an interface of a next home screen theme of the series theme may be displayed, and the home screen theme is a theme watch face different from the series theme. For example, when displaying a simple series watch face corresponding to Sunday, after detecting a flick-down operation of the user, a mobile phone may display a next theme cherry blossom watch face.

With reference to the first aspect, in some embodiments, the first device may first select a home screen theme, and then enable an image collection function to collect the image of the first object. Before the first device collects the image of the first object, the first device displays options of one or more home screen themes, where the one or more home screen themes include the second theme, and then the user selects the second theme. In this way, the first device directly displays an image of the second device with the second theme.

With reference to the first aspect, in some embodiments, the first device may first enable an image collection function, and then select a home screen theme after identifying the first object. After the first device collects the image of the first object, the first device displays options of one or more home screen themes, where the one or more home screen themes include the second theme, and then the user selects the second theme. The first device displays the first image in the image collection area in response to the operation that the user selects the second theme. In this way, the first device first displays an image of the second device with the first theme, and then selects the home screen theme to cover the display area of the second device.

With reference to the first aspect, in some embodiments, an entire preview process is a process in which the first device collects the first object in real time, the first image is a real-time preview image, and positions of the second device and the object for wearing the second device in the first image displayed in the image collection area change with a relative position between the first object and the first device. For example, in some embodiments, when the user rotates the wrist to change an angle, a smart watch image displayed in the preview image of the mobile phone also changes an angle accordingly.

In some other embodiments, the first device may switch a preview field of view. If a product previewed by the user is jewelry such as a necklace, a front-facing camera may be used for photographing, which is more convenient for the user to view try-on effect. The mobile phone may quickly switch a lens from a rear-facing camera to the front-facing camera in response to an operation that the user selects a lens switching control. A type of the switched camera is not limited herein. Cameras may include the front-facing camera, the rear-facing camera, a wide-angle camera, a depth camera, and other types.

With reference to the first aspect, in some embodiments, the first device may further collect a freezing image of the part on which the second device is worn (which may include the second device, or may not include the second device), synthesize the freezing image and an image with a different home screen theme, another enhanced display image, or the like, to obtain an image in which the user tries on a different home screen theme, and display the image in a preview interface. The freezing image may be static or dynamic. In this solution, for example, in a process in which the user tries on the smart watch, the wrist of the user does not need to be in a camera collection range of the mobile phone, which frees one hand of the user, the entire try-on process is easier and more convenient, and it is more convenient for the user operation.

To be specific, the first device collects one or more frames of images of the first object at one or more angles. After the first device collects the one or more frames of images of the first object at the one or more angles, the first device generates a freezing image of the first object, and displays the freezing image of the first object in the first image, where the freezing image of the first object generated by collecting an image of the first object at one angle is a static image, and the freezing image of the first object generated by collecting images of the first object at a plurality of angles is a dynamic image.

In some embodiments, a position of the first object in the dynamic image changes with an indication operation of the user, the indication operation is performed on the first device, and the indication operation includes one or more of the following: a flick operation performed on the touchscreen of the first device, a tap operation performed on the touchscreen of the first device, a gesture operation of moving toward a seventh direction, a voice operation of indicating a rotation position, and a press, touch, or rotation operation performed on a fifth button of the first device.

With reference to the first aspect, in some embodiments, the first device may first collect a plurality of frames of images of the part on which the second device is worn at a plurality of angles (which may include the second device, or may not include the second device), construct a three-dimensional model, and then synthesize, by using an image processing technology, an image with a different home screen theme and the three-dimensional model for the part on which the second device is worn and/or the second device, to generate a try-on image. In this solution, for example, in a process in which the user tries on the smart watch, the wrist of the user does not need to be in a camera collection range of the mobile phone, which frees one hand of the user, the entire try-on process is easier and more convenient, and it is more convenient for the user operation.

To be specific, the first device collects one or more frames of images of the first object at a plurality of angles. After the first device collects the one or more frames of images of the first object at the plurality of angles, the first device synthesizes a three-dimensional image of the first object based on an image at each angle, where the three-dimensional image of the first object is displayed in the first image.

In some embodiments, a position of the first object in the three-dimensional image of the first object changes with an indication operation of the user, the indication operation is performed on the first device, and the indication operation includes one or more of the following: a flick operation performed on the touchscreen of the first device, a tap operation performed on the touchscreen of the first device, a gesture operation of moving toward an eighth direction, a voice operation of indicating a rotation position, and a press, touch, or rotation operation performed on a sixth button of the first device.

With reference to the first aspect, in some embodiments, the second device further has a non-display part, and the first image further includes the non-display part of the first object, for example, a wristband, a watch crown, or a side frame of a smart watch, a keyboard, a base, or a side frame of a computer, or a side frame of a digital photo frame.

With reference to the first aspect, in some embodiments, before the first device displays the image collection area, the first device detects an operation that the user selects a first control in a description interface of the second theme. In response to the operation that the user selects the first control, the first device enables an image preview function, and displays the image collection area. The first control is a control for indicating to enable a preview try-on function.

With reference to the first aspect, in some embodiments, the first device detects a fifth user operation, where the fifth user operation indicates the second device to configure the home screen theme as the second theme. The first device sends a configuration file of the second theme to the second device in response to the fifth user operation. After completing receiving of the configuration file of the second theme, the second device displays, on the display, the second theme selected by the user to be the home screen theme. In some other embodiments, the second device may alternatively store some home screen themes for the user to select, and the user may select and configure a home screen on the second device.

With reference to the first aspect, in some embodiments, the first device includes any one of the following: a mobile phone, a tablet computer, a portable/non-portable computer, a smart camera, a personal computer, smart glasses, and an AR/VR device. The second device includes any one of the following: a mobile phone, a tablet computer, a personal computer, a portable/non-portable mobile computer, a desktop personal computer, a smart speaker, a smart watch, a smart band, a digital photo frame, a smart television, a vehicle-mounted device, a game console, a cloud host/cloud server, a smart wearable device, and a smart home device.

According to a second aspect, an embodiment of this application provides a preview method. The method includes: A first device displays an image collection area. The first device collects an image of a first object, where the first object includes an object for wearing a second device. The first device displays the first image in the image collection area, where the first image includes the second device and the object for wearing the second device, and a home screen theme displayed in an area of a display of the second device in the first image is a second theme selected by a user.

According to the method in the second aspect, the user may preview display effect of the second device with different home screen themes in an actual environment on the first device, and an image of the second device is synthesized by the first device based on the first object. According to the method provided in this application, human-machine interaction performance can be enhanced, a more intuitive, vivid, convenient, and interesting preview manner is provided for the user, and user experience is improved.

With reference to the second aspect, in some embodiments, the first object may be a part that the second device may be worn. For example, a smart watch or a smart band may be worn on a wrist part, a necklace may be worn on a neck part, a television is mounted on a television wall, and a computer is placed on a computer table. For example, the user may not wear the smart watch. A mobile phone captures an image of the wrist part of the user, identifies a contour of the wrist part of the user, synthesizes a virtual watch face image based on the image of the wrist part, covers the wrist of the user with the virtual watch face image, to obtain an image in which the user tries on this watch face, and displays the image in a preview interface. In some embodiments, the second device may include different styles for the user to select, for example, a watch with a round watch face or a watch with a square watch face.

For another example, the mobile phone may synthesize a virtual watch face or wristband image in real time based on different wrist parts of the user. If the mobile phone identifies that a currently photographed wrist part of the user is a back part of a hand, the watch face image is added to cover the back part of the hand. If the mobile phone identifies that a currently photographed wrist part of the user is an inner part of the wrist, the wristband image is added to cover the inner part of the wrist. When the user rotates the wrist to change an angle, the virtual smart watch image displayed on the mobile phone also changes accordingly.

Based on a same inventive idea, for other implementations in the second aspect, refer to the descriptions of embodiments in the first aspect. Details are not described herein again.

According to a third aspect, an embodiment of this application provides a preview method. The method includes: A first device displays an image collection area. The first device collects an image of a first object, where the first object includes a second device, the second device has a display, a home screen theme displayed on the display is a first theme, the image of the first object includes a display of the first object and the first theme, and the first object further includes an object for wearing the second device. The first device displays the first image in the image collection area, where the first image includes the second device and the object for wearing the second device, and a home screen theme displayed in an area of the display in the first image is a second theme selected by a user.

The second device detects a second user operation performed on the second device, and the second device sends a first switching instruction to the first device, where the first switching instruction instructs to switch from the second theme to a third theme. The first device displays a second image in the image collection area, where a home screen theme displayed in the area of the display in the second image is the third theme.

According to the method in the third aspect. The user may preview display effect of different selected home screen themes in an actual environment on the first device. After detecting a switching instruction of the user, the second device may send an instruction for switching a home screen theme to the first device. Then, after receiving the switching instruction, the first device may switch a previewed home screen theme. According to the method provided in this application, human-machine interaction performance can be enhanced, a more intuitive, vivid, convenient, and interesting preview manner is provided for the user, and user experience is improved.

In some embodiments, the first object includes a screen area of the second device, and may further include another non-screen area of the second device, for example, a wristband, a watch crown, or a side frame of a smart watch, a keyboard, a base, or a side frame of a computer, or a side frame of a digital photo frame.

With reference to the third aspect, in some embodiments, the first device receives the first switching instruction, where the first switching instruction instructs to switch from the second theme to the third theme. The first device displays the second image in the image collection area, where the home screen theme displayed in the area of the display in the second image is the third theme. For example, the second theme and the third theme are different home screen themes. The second theme or the third theme may be a static image or a dynamic image.

With reference to the third aspect, in some embodiments, the first switching instruction may include any one or more of the following: a first user operation that is detected by the first device and that is performed on the first device, the second user operation that is detected by the second device and that is performed on the second device, a switching instruction that is automatically sent by the first device at an interval of a first time period, and the like. The first device and/or the second device may further support detection of a user operation such as a touch, a gesture, or a voice, and convert the user operation into a corresponding instruction. For example, a display of the first device and/or the display of the second device may identify a touch operation, and when a flick-left, flick-right, flick-up, or flick-down user operation on a touchscreen is detected, an image may be correspondingly switched to for display. Alternatively, the first device and/or the second device may detect a device status via one or more sensors such as an acceleration sensor, a gravity sensor, and a gyroscope sensor, for example, tilting leftward, tilting rightward, tilting upward, and tilting downward, and may correspondingly switch to an image for display. Alternatively, the first device and/or the second device may further detect a user gesture via a camera or another sensor, detect that a button such as a volume button or a watch crown is pressed, rotated, or the like, or collect a user voice via a microphone, or the like, convert the foregoing operation into an instruction for switching to an image for display, and respond to the instruction. These user operations enable the user to more conveniently and quickly switch between and preview different home screen themes.

With reference to the third aspect, in some embodiments, the first user operation may include any one or more of the following: a flick operation performed on a touchscreen of the first device, a tap operation performed on the touchscreen of the first device, a gesture operation of moving toward a first direction, a voice switching operation, a press, touch, or rotation operation performed on a first button of the first device, and the like.

The second user operation may include any one or more of the following: a flick operation performed on a touchscreen of the second device, a tap operation performed on the touchscreen of the second device, a gesture operation of moving toward a second direction, a gesture operation of rotating a wrist toward a third direction, a voice switching operation, a press, touch, or rotation operation performed on a second button of the second device, and the like.

With reference to the third aspect, in some embodiments, the first theme includes a plurality of display interfaces, for example, includes a first display interface and a second display interface, and the method may further include: The second device detects a fourth user operation performed on the second device. The second device sends a second switching instruction to the first device, where the second switching instruction instructs to switch from the first display interface of the first theme to the second display interface. The first device receives the second switching instruction. The first device displays a third image in the image collection area, where the second display interface of the first theme is displayed in the area of the display in the third image. For example, a home screen theme may include one or more interfaces, such as a main interface, an icon interface, a lock screen interface, and a password input interface, and even may include an image of another area, such as an image of a wristband matching a watch face of a watch. A home screen theme may alternatively be a series theme, and include a plurality of watch faces with similar design styles, for example, including a series theme corresponding to seven interfaces for Monday to Sunday.

In some embodiments, the first display interface displays one or more of the following: a wireless signal strength indicator, a battery level indicator, and a time indicator. The second display interface displays one or more application icons. For example, the first display interface is a main interface, and the second display interface is an icon interface.

With reference to the third aspect, in some embodiments, the second switching instruction may include any one or more of the following: a third user operation that is detected by the first device and that is performed on the first device, a fourth user operation that is detected by the second device and that is performed on the second device, a switching instruction that is automatically sent by the first device at an interval of a second time period, and the like. These user operations enable the user to more conveniently and quickly switch between and preview different home screen themes.

With reference to the third aspect, in some embodiments, the third user operation may include any one or more of the following: a flick operation performed on the touchscreen of the first device, a tap operation performed on the touchscreen of the first device, a gesture operation of moving toward a fourth direction, a voice switching operation, a press, touch, or rotation operation performed on a third button, and the like.

The fourth user operation may include any one or more of the following: a flick operation performed on the touchscreen of the second device, a tap operation performed on the touchscreen of the second device, a gesture operation of moving toward a fifth direction, a gesture operation of rotating a wrist toward a sixth direction, a voice switching operation, a press, touch, or rotation operation performed on a fourth button, and the like.

With reference to the third aspect, in some embodiments, the flick operation performed on the touchscreen of the first device includes a flick operation performed on the image collection area in the touchscreen of the first device.

With reference to the third aspect, in some embodiments, the first device detects a fifth user operation, where the fifth user operation indicates the second device to configure the home screen theme as the second theme. The first device sends a configuration file of the second theme to the second device in response to the fifth user operation. After completing receiving of the configuration file of the second theme, the second device displays an interface in which the home screen theme is the second theme selected by the user. In some other embodiments, the second device may alternatively store some home screen themes for the user to select, and the user may select and configure a home screen on the second device.

Based on a same inventive idea, for other implementations in the third aspect, refer to the descriptions of embodiments in the first aspect. Details are not described herein again.

According to a fourth aspect, an embodiment of this application provides an electronic device. The electronic device may include a communication apparatus, a display apparatus, a memory, a processor coupled to the memory, a plurality of applications, and one or more programs. The communication apparatus is configured to perform communication, the display apparatus is configured to display an interface, the memory stores computer-executable instructions, and when the processor executes the instructions, the electronic device is enabled to implement any function of the first device in the first aspect or the first device in the second aspect.

According to a fifth aspect, an embodiment of this application provides a communication system. The communication system includes a first device and a second device, and the first device implements any possible implementation of the first aspect.

According to a sixth aspect, an embodiment of this application provides a computer storage medium. The storage medium stores a computer program, and the computer program includes executable instructions. When the executable instructions are executed by a processor, the processor is enabled to perform an operation corresponding to the method provided in the first aspect or the second aspect.

According to a seventh aspect, an embodiment of this application provides a computer program product. When the computer program product runs on an electronic device, the electronic device is enabled to perform any one of the possible implementations in the first aspect or the second aspect.

According to an eighth aspect, an embodiment of this application provides a chip system. The chip system may be used in an electronic device, the chip includes one or more processors, and the processor is configured to invoke computer instructions, so that the electronic device implements any one of the possible implementations in the first aspect or the second aspect.

According to the foregoing aspects provided in this application, the user may preview the display effect of the second device with different home screen themes in the actual environment on the first device. According to the method provided in this application, human-machine interaction performance can be enhanced, a more intuitive, vivid, convenient, and interesting preview manner is provided for the user, and user experience is improved.

BRIEF DESCRIPTION OF THE DRAWINGS

FIG. 1B is a schematic diagram of a software architecture of an electronic device according to an embodiment of this application;

FIG. 2 is a schematic diagram of a communication system according to an embodiment of this application;

FIG. 11A-1 and FIG. 11A-2 are a schematic diagram of an interaction interface according to an embodiment of this application;

FIG. 11B-1 and FIG. 11B-2 are a schematic diagram of an interaction interface according to an embodiment of this application;

FIG. 12A-1, FIG. 12A-2, and FIG. 12A-3 are a schematic diagram of an interaction interface according to an embodiment of this application;

FIG. 12B-1, FIG. 12B-2, and FIG. 12B-3 are a schematic diagram of an interaction interface according to an embodiment of this application;

FIG. 12C-1, FIG. 12C-2, and FIG. 12C-3 are a schematic diagram of an interaction interface according to an embodiment of this application;

FIG. 12D-1, FIG. 12D-2, and FIG. 12D-3 are a schematic diagram of an interaction interface according to an embodiment of this application;

FIG. 26 is a flowchart of a preview method according to an embodiment of this application; and FIG. 27 is a schematic diagram of function modules according to an embodiment of this application.

DETAILED DESCRIPTION OF ILLUSTRATIVE EMBODIMENTS

Figure 1A:
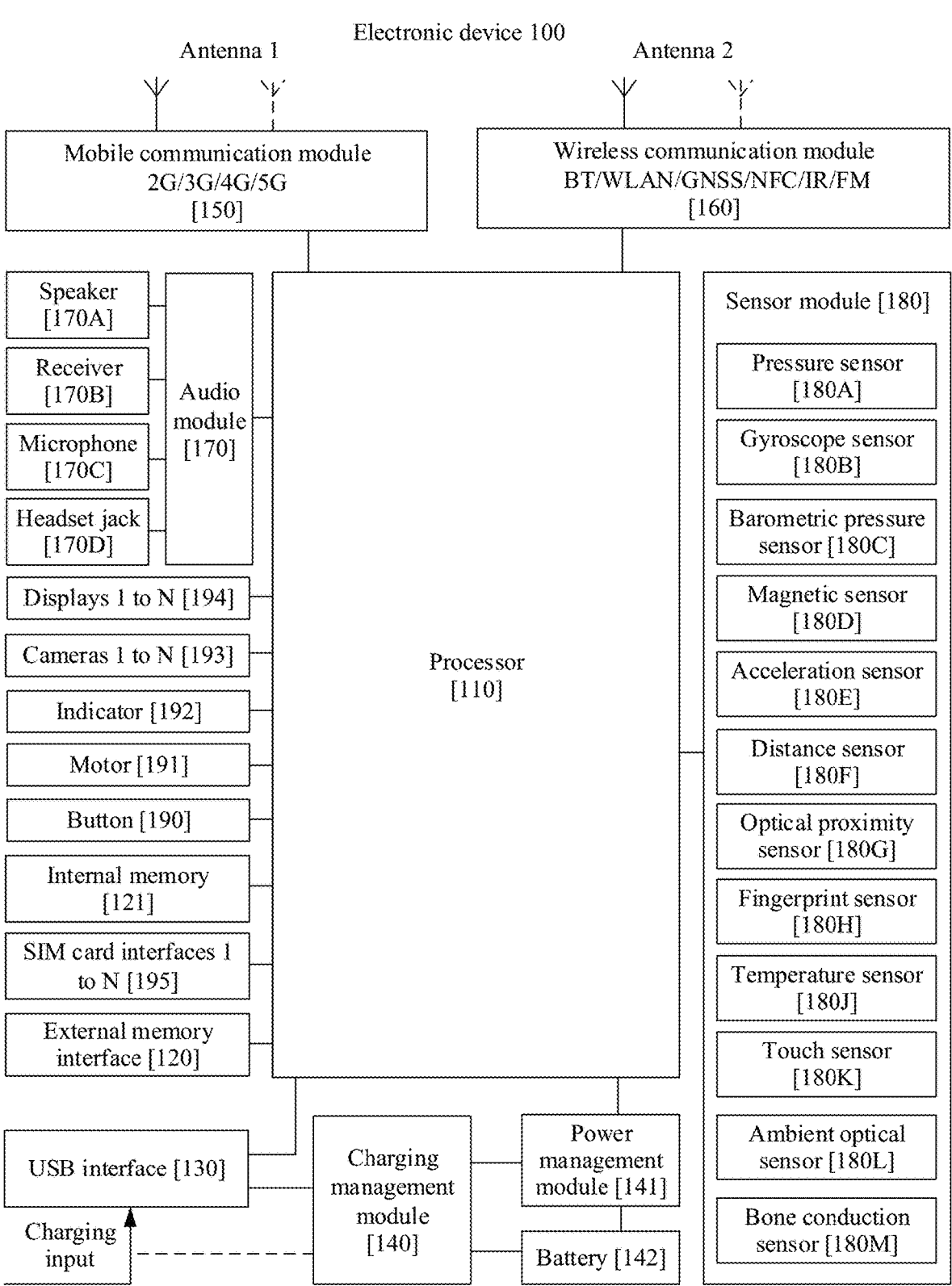
FIG. 1A is a schematic diagram of a hardware structure of an electronic device according to an embodiment of this application.

The following clearly describes technical solutions in embodiments of this application in detail with reference to the accompanying drawings. In descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists.

In the following, the terms "first" and "second" are merely intended for a purpose of description, and shall not be understood as an indication or implication of relative importance or implicit indication of a quantity of indicated technical features. Therefore, features defined by "first" or "second" may explicitly or implicitly include one or more of the features. In addition, in the descriptions of embodiments of this application, "a plurality of" means two or more.

The term "user interface (user interface, UI)" in the following embodiments of this application is a medium interface for interaction and information exchange between an application (application, APP) or an operating system (operating system, OS) and a user, and implements conversion between an internal form of information and a form acceptable to the user. The user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphical user interface, GUI), which is a user interface displayed in a graphical manner and related to computer operations. The user interface may be a visual interface element such as a text, an icon, a button, a menu, a tab, a text box, a dialog box, a status bar, a navigation bar, or a Widget that is displayed on a display of the electronic device.

In embodiments of this application, a "home screen" may also be referred to as a "home screen theme", and includes one or more elements with a unified style. The display elements of the home screen theme may include a home screen wallpaper, a component, a window appearance, an icon, a screen saver image, a mouse pointer, a sound event, a font, a color, a control, a button, and the like. A type of the display element of the home screen theme is not limited in embodiments of this application. The display element may be represented as static, dynamic, or others. For example, the home screen wallpaper may be set to a type such as a picture, a dynamic image, a video, or a web page. The unified style may mean that the plurality of elements present a feature of a degree of identification, for example, same or similar design form, hue, or shape elements are used. The user may also customize a plurality of home screen elements and combine elements of different styles to form a personalized home screen.

For a terminal device configured with a display, the user increasingly pursues aesthetic, personalized, and diversified home screen displaying, and the like. For requirements of the user, developers design many home screens of different styles and different patterns for the user to select. For example, in a home screen theme market application, a plurality of home screens of different styles, different themes, and different patterns are listed. However, the user usually can only view, in an introduction interface for a home screen, a display effect image of the home screen provided by a designer, and cannot preview display effect in an actual use scenario. However, after the user purchases the home screen, in the actual use scenario, the display effect of the home screen may not be as expected by the user, and user experience is poor. For example, for a wearable device smart watch, the user may view, by using a watch face market in a mobile phone, a schematic picture of watch face display effect, or display effect of a watch face worn by a model, to determine whether to purchase the smart watch. Sometimes, after the user purchases a watch face, display effect of the watch face in an actual environment is not as expected by the user, and the user regrets it. In some implementations, the user may select a home screen, the mobile phone sends a data packet of the home screen to the smart watch, and the smart watch presents a preview interface. However, in this manner, an operation is complex and time-consuming. To be specific, the user needs to wait for time consumed by data packet transmission and home screen setting, and display effect cannot be displayed very quickly. In addition, the user needs to perform one-by-one selection and wait for response time to view display effect of different watch faces, and a stable connection between the mobile phone and the smart watch further needs to be maintained in a transmission process.

This application provides a preview method. The preview method may support a first device in enabling a photographing preview function, and collecting and identifying an image of a screen contour of a second device or a part on which the second device is worn. Then, the first device displays, in a photographing preview interface by using an image processing technology, a preview picture in which the second device presents a home screen selected by a user. The preview method may further support the user in switching between different home screens in an operation manner such as touch selection, a gesture, or a voice. This is not limited to home screen preview. The preview method further supports preview of virtual images corresponding to a plurality of styles of another object, for example, a wristband of a watch.

According to the method provided in this application, the foregoing problem that actual display effect of the home screen cannot be previewed is resolved. The user may preview display effect of the second device with different home screen themes in an actual environment on the first device, and the second device may display different included styles. According to the method provided in this application, human-machine interaction performance can be enhanced, a more intuitive, vivid, convenient, and interesting preview manner is provided for the user, and user experience is improved.

An example electronic device 100 provided in embodiments of this application is described below.

FIG. 1A is a schematic diagram of a hardware structure of the electronic device 100 according to an embodiment of this application. The example electronic device 100 provided in this embodiment of this application may be configured with a display apparatus, and may be but is not limited to a mobile phone, a notebook computer, a tablet computer (portable android device, PAD), a smart band, a smart watch, a digital photo frame, a personal computer (personal computer, PC), a smart television, a smart speaker, or the like, or may be a desktop computer, a laptop computer, a handheld computer, an augmented reality (augmented reality, AR) device, a virtual reality (virtual reality, VR) device, an artificial intelligence (artificial intelligence, AI) device, a vehicle head unit (vehicle-mounted device), a game console, a treadmill, a cloud host/cloud server, another intelligent wearable device, an Internet of things (Internet of things, IoT) device, a smart home device such as a smart water heater, a smart lamp, a smart air conditioner, or a smart weighing scale, or another type of electronic device. A device type is not limited in this application.

It may be understood that the structure shown in this embodiment does not constitute a specific limitation on the electronic device 100. In some other embodiments of this application, the electronic device 100 may include more or fewer components than those shown in the figure, and some hardware structures may be added or reduced, some components may be combined, some components may be split, or components may be arranged differently. The components shown in the figure may be implemented by hardware, software, or a combination of software and hardware.

Refer to FIG. 1A. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, a bone conduction sensor 180M, and the like.

The processor 110 is usually configured to control an overall operation of the electronic device 100, and may include one or more processing units. For example, the processor 110 may include a central processing unit (central processing unit, CPU), an application processor (application processor, AP), a modem processor, a graphics processing unit (graphics processing unit, GPU), an image signal processor (image signal processor, ISP), a video processing unit (video processing unit, VPU), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may generate an operation control signal based on instruction operation code and a time sequence signal, to complete control of instruction reading and instruction execution.

The digital signal processor is configured to process a digital signal, and may further process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computation processor. The NPU quickly processes input information by referring to a structure of a biological neural network, for example, by referring to a mode of transmission between human brain neurons, and may further continuously perform self-learning. Applications such as intelligent cognition of the electronic device, for example, image identification, facial identification, speech identification, and text understanding, may be implemented through the NPU.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, a serial peripheral interface (serial peripheral interface, SPI) interface, or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface.

The PCM interface may also be configured to perform audio communication, and sample, quantize, and encode an analog signal. In some embodiments, the audio module 170 may be coupled to the wireless communication module 160 through the PCM bus interface. In some embodiments, the audio module 170 may also transmit an audio signal to the wireless communication module 160 through the PCM interface. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication.

In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement an audio playing function.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, or may be configured to transmit data between the electronic device and a peripheral device. The interface may be further configured to connect to another electronic device, for example, a mobile phone, a PC, or a smart television. The USB interface may be a USB 3.0, and is configured to be compatible with a high-speed display port (display port, DP) for signal transmission, and may transmit high-speed audio and video data.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the electronic device. The charging management module 140 may further supply power to the electronic device through the power management module 141 when the battery 142 is charged.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is used for the electronic device 100 and that includes wireless communication such as a 2nd generation (2nd generation, 2G) network/3rd generation (3rd generation, 3G) network/4th generation (4th generation, 4G) network/5th generation (5th generation, 5G) network. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, quantum dot light-emitting diodes (quantum dot light-emitting diodes, QLED), or the like. In some embodiments, the electronic device 100 may include one or N displays 194, where N is a positive integer greater than 1.

In some other embodiments, the display apparatus configured to display an image may further include an optical projection apparatus that generates an optical signal and maps the optical signal (for example, a light beam) to a retina of the user. The display apparatus may be configured to present one or more virtual objects or a virtual reality scenario, and convert a real pixel image into a near-eye projected virtual image for display via one or more optical devices such as a reflection mirror, a transmitting mirror, or an optical waveguide. The user may directly see a virtual object by using an optical signal emitted by the optical apparatus, and feel a stereoscopic virtual environment. This implements virtual interaction experience, or implements interaction experience combining the virtual and the reality. In an example, the optical display apparatus may be a mini projector or the like.

The electronic device 100 may implement a photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1. The camera 193 may include but is not limited to a conventional color camera (RGB camera), a depth camera (RGB depth camera), a dynamic vision sensor (dynamic vision sensor, DVS) camera, or the like. In some embodiments, the camera 193 may be a depth camera. The depth camera may collect spatial information of a real environment.

In some embodiments, the electronic device 100 may capture a user image via the camera 193, identify different users based on faces, and correspondingly enable different user accounts. The different user accounts store information about the different users, so that it can be ensured that the different user accounts are not confused, and user data privacy is further protected.

In some embodiments, the camera 193 may collect a hand image or a body image of the user, and the processor 110 may be configured to analyze the image collected by the camera 193, to identify a hand action or a body action entered by the user. For example, the hand action of the user may be identified via the camera 193, to implement gesture control of the user.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the electronic device.

In some embodiments of this application, the internal memory 121 may be configured to store a program of one or more applications, and the program includes instructions. When the program is executed by the processor 110, the electronic device 100 generates content to be presented to the user. For example, the application may include an application used to manage the electronic device 100, such as a game application, a conference application, a video application, a home screen application, or another application.

The internal memory 121 may include one or more random access memories (random access memory, RAM) and one or more non-volatile memories (non-volatile memory, NVM).

The random access memory has features of a fast read/write speed and volatility. Volatility means that data stored in the RAM is lost upon power-off. Generally, static power consumption of the random access memory is very low, and running power consumption is relatively high. The data in the RAM is memory data, can be read at any time, and is lost upon power-off.

The non-volatile memory has features of non-volatility and data storage stability. Non-volatility means that stored data is not lost after a power failure, and the data can be stored with a long time of power failure. The data in the NVM includes application data, and can be stably stored in the NVM for a long time. The application data is content written in a running process of an application or a service process, for example, photos or videos obtained by photo-type applications and texts edited by the user in document-type applications.

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, where for example, a 5th generation DDR SDRAM is usually referred to as a DDR5 SDRAM), and the like.

The non-volatile memory may include a magnetic disk storage (magnetic disk storage) device, a flash memory (flash memory), and the like.

The magnetic disk storage device is a storage device that uses a magnetic disk as a storage medium, and has features such as a large storage capacity, a high data transmission rate, and long-term storage of stored data.

According to an operating principle, the flash memory may be classified into NOR FLASH, NAND FLASH, 3D NAND FLASH, and the like; according to potential levels of storage cells, the flash memory may be classified into a single-level storage cell (single-level cell, SLC), a multi-level storage cell (multi-level cell, MLC), a triple-level storage cell (triple-level cell, TLC), a quad-level storage cell (quad-level cell, QLC), and the like; and according to storage specifications, the flash memory may be classified into a universal flash storage (English: universal flash storage, UFS), an embedded multi media memory card (embedded multi media Card, eMMC), and the like.

The random access memory may be directly read and written by the processor 110, may be configured to store executable programs (such as machine instructions) of an operating system or another running program, and may be further configured to store data of users and applications, and the like.

The non-volatile memory may also store the executable programs, the data of the users and the applications, and the like, and may be loaded into the random access memory in advance, to be directly read and written by the processor 110.

The external memory interface 120 may be configured to connect to an external non-volatile memory, to expand a storage capability of the electronic device. The external non-volatile memory communicates with the processor 110 through the external memory interface 120, to implement a data storage function. For example, files such as music and videos are stored in the external non-volatile memory.

The electronic device 100 may implement an audio function, for example, music playing or recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device may be configured to listen to music or answer a hands-free call through the speaker 170A.

The receiver 170B, also referred to as an "earpiece", is configured to convert an audio electrical signal into a sound signal. When a call is answered or voice information is received through the electronic device, the receiver 170B may be put close to a human ear to listen to a voice.

The microphone 170C, also referred to as a "mike" or "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device. In some other embodiments, two microphones 170C may be disposed in the electronic device, to implement a noise reduction function in addition to collecting a sound signal. In some other embodiments, three, four, or more microphones 170C may alternatively be disposed in the electronic device, to collect a sound signal, reduce noise, identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The electronic device 100 may include one or more buttons 190. These buttons 190 may control the electronic device 100, and provide the user with a function of accessing the electronic device 100. The button 190 may be in a form of a mechanical button such as a button, a switch, or a dial, or may be a touch or near-touch sensing device (for example, a touch sensor). The electronic device 100 may receive a button input, and generate a button signal input related to a user setting and function control of the electronic device 100. The button 190 includes a power button, a volume button, and the like.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. For touch operations performed on different areas of the electronic device 100, the motor 191 may also correspond to different vibration feedback effect. Different application scenarios (for example, a time reminder, information receiving, an alarm clock, and a game) may also correspond to different vibration feedback effect. A touch vibration feedback effect may be further customized.

The indicator 192 may be an indicator light, and may be configured to indicate a charging status and a power change, or may be configured to indicate a message, a notification, and the like.

The electronic device 100 may further include another input/output interface, and another apparatus may be connected to the electronic device 100 through a proper input/output interface. The component may include, for example, an audio/video jack, a data connector, and the like.

The electronic device 100 is configured with one or more sensors, including but not limited to the pressure sensor 180A, the gyroscope sensor 180B, the barometric pressure sensor 180C, the magnetic sensor 180D, the acceleration sensor 180E, the distance sensor 180F, the optical proximity sensor 180G, the fingerprint sensor 180H, the temperature sensor 180J, the touch sensor 180K, the ambient optical sensor 180L, the bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed. In some embodiments, touch operations that are performed at a same touch position but have different touch operation time lengths may correspond to different operation instructions. For example, when a touch operation whose touch operation time length is less than a first time threshold is performed on the pressure sensor 180A, a confirmation instruction is executed. When a touch operation whose touch operation time length is greater than or equal to a first time threshold is performed on the pressure sensor 180A, a power-on/power-off instruction is executed.

The gyroscope sensor 180B may be configured to determine a motion posture of the electronic device 100. In some embodiments, an angular velocity of the electronic device around three axes (that is, axes x, y, and z) may be determined through the gyroscope sensor 180B. The gyroscope sensor 180B may be configured to implement image stabilization during photographing. For example, when a shutter is pressed, the gyroscope sensor 180B detects a jitter angle of the electronic device, calculates, based on the angle, a distance for which a lens module needs to compensate, and enables the lens to offset jitter of the electronic device through reverse motion, to implement image stabilization. The gyroscope sensor 180B may be further used for navigation and motion-controlled gaming scenarios. In some embodiments, the electronic device 100 may confirm, through the gyroscope sensor 180B, an instruction for switching to a previous/next display option.

The barometric pressure sensor 180C is configured to measure barometric pressure. In some embodiments, the electronic device 100 calculates an altitude based on the barometric pressure measured by the barometric pressure sensor 180C, to assist in positioning and navigation.

The magnetic sensor 180D includes a Hall sensor. The electronic device 100 may detect opening and closing of a flip cover leather case through the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect a value of acceleration of the electronic device 100 in all directions (usually on three axes), and may detect a value and a direction of gravity when the electronic device 100 is static. The acceleration sensor 180E may be further configured to identify a posture of the electronic device, and is used in an application such as switching between a landscape mode and a portrait mode or a pedometer. In some embodiments, the electronic device 100 may confirm, through the acceleration sensor 180E, an instruction for switching to a previous/next display option.

The distance sensor 180F is configured to measure a distance. The electronic device 100 may measure a distance in an infrared or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object nearby. The electronic device 100 may detect, through the optical proximity sensor 180G, that a user holds the electronic device 100 close to an ear for a call, to automatically perform screen-off for power saving. The optical proximity sensor 180G may also be used in a smart cover mode or a pocket mode to automatically perform screen unlocking or locking.

The ambient optical sensor 180L is configured to sense ambient light brightness. The electronic device 100 may adaptively adjust brightness of the display 194 based on the sensed ambient light brightness. The ambient optical sensor 180L may also be configured to automatically adjust white balance during photographing. The ambient optical sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to prevent abnormal power-off caused by a low temperature.

The touch sensor 180K is also called a "touch device". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is also compatible with different types of SIM cards. The SIM card interface 195 is also compatible with an external memory card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of this application, an Android® system with a layered architecture is used as an example to describe a software structure of the electronic device 100.

FIG. 1B is a block diagram of the software structure of the electronic device 100 according to an embodiment of this application.

In a layered architecture, software is divided into several layers, and each layer has a clear role and task. The layers communicate with each other through a software interface. In some embodiments, an Android® system may be divided into four layers: an application layer, an application frame-work layer, an Android runtime (Android® runtime) and system library, and a kernel layer from top to bottom.

The application layer may include a series of application packages.

As shown in FIG. 1B, the application packages may include applications such as Camera, Gallery, Calendar, Phone, Map, Navigation, WLAN, Bluetooth, Music, Videos, and Settings. In the application Settings, a size, a thickness, and the like of a font may be set.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, a phone book, and the like.

The view system includes visual controls such as a control for displaying a text and a control for displaying an image. The view system may be configured to construct an appli-cation. A display interface may include one or more views. For example, a display interface including an SMS message notification icon may include a text display view and an image display view.

The phone manager is configured to provide a commu-nication function, for example, management of a call status (including answering, hanging up, or the like).

The resource manager provides various resources such as a localized character string, an icon, an image, a layout file, and a video file for an application.

The notification manager enables an application to display notification information in a status bar, and may be config-ured to convey a notification message. The notification manager may automatically disappear after a short pause without requiring user interaction. For example, the notifi-cation manager is configured to notify download comple-tion, give a message notification, and the like. The notifi-cation manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, an electronic device vibrates, or an indicator light blinks.

The Android® runtime includes a kernel library and a virtual machine. The Android® runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application frame-work layer as binary files. The virtual machine is configured to implement functions such as object life cycle manage-ment, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is con-figured to implement three-dimensional graphics drawing, image rendering, composition, layer processing, and the like.

The 2D graphics engine is a drawing engine for 2D drawing.

The kernel layer is a layer between hardware and soft-ware. The kernel layer includes at least a display driver, a camera driver, an audio driver, and a sensor driver.

Herein, with reference to a photographing start scenario, a working procedure of software and hardware cooperation of the electronic device 100 is described by using an example.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, to start the camera application. Then, the camera driver is started by invoking the kernel layer, and a static image or a video is captured through the camera 193.

The foregoing descriptions of the software architecture of the electronic device 100 are merely an example. It may be understood that the software architecture shown in embodiments of the present invention does not constitute a specific limitation on this application. In some other embodiments of this application, the software architecture of the electronic device 100 may include more or fewer modules than those shown in the figure, or combine some modules, or split some modules, or have different architecture arrangements. The components shown in the figure may be implemented by hardware, software, or a combination of software and hardware.

The following describes a communication system 10 provided in embodiments of this application.

Figures 1, 2, 11A:
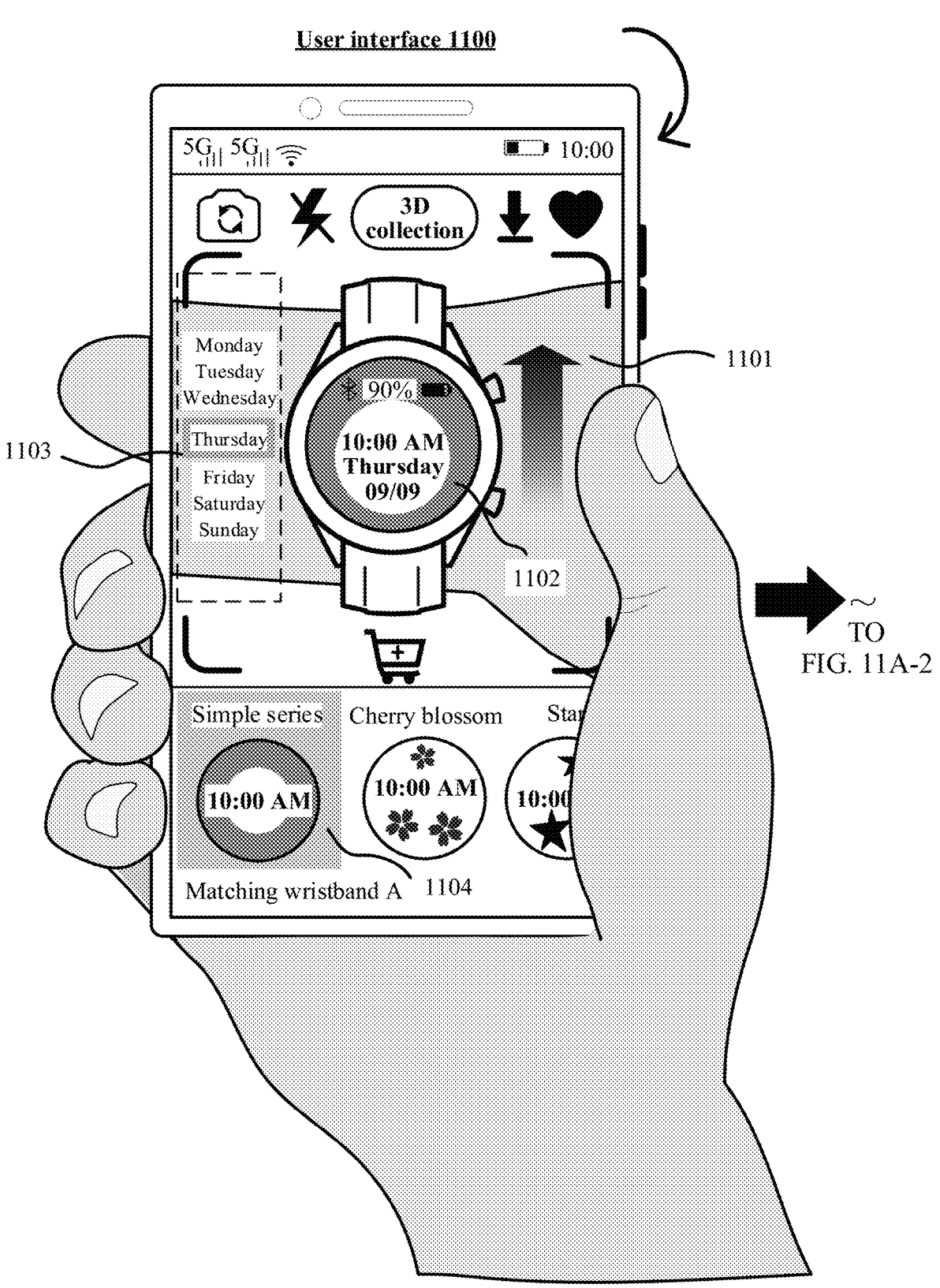
Figures 2, 11A:
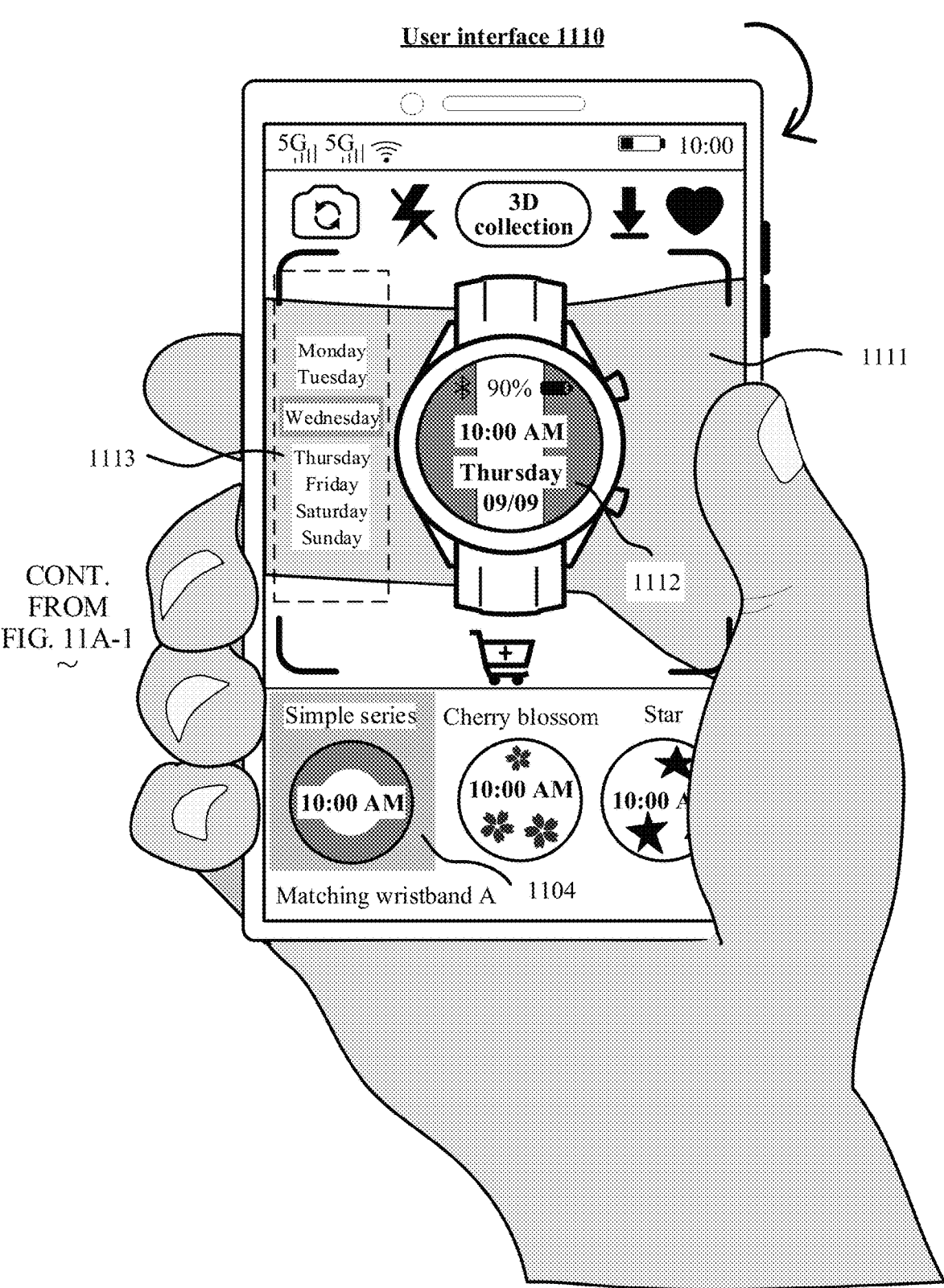

FIG. 2 shows the communication system 10 according to an embodiment of this application.

As shown in FIG. 2, the communication system 10 includes a first device and a second device. The first device and the second device may be terminal devices configured with a display apparatus. A device type of the first device or the second device may be but is not limited to a mobile phone, a notebook computer, a PAD, a smart band, a smart watch, a digital photo frame, a PC, a smart television (which may also be referred to as a smart screen, a large screen, or the like), a smart speaker, or the like, or may be a desktop computer, a laptop computer, a handheld computer, an AR device, a VR device, an AI device, a vehicle head unit (vehicle-mounted device), a game console, a treadmill, a cloud host/cloud server, another intelligent wearable device, an IoT device, a smart home device such as a smart water heater, a smart lamp, a smart air conditioner, or a smart weighing scale, or another type of electronic device. The device type of the first device or the second device is not limited in this application. For a hardware structure and a software architecture of the first device or the second device, refer to the descriptions of the electronic device 100 in the foregoing embodiments. In this embodiment, a terminal device may also be briefly referred to as a terminal. The terminal device is usually an intelligent electronic device that can provide a user interface, interact with a user, and provide a service function for the user.

In FIG. 2, an example in which the first device is a mobile phone and the second device is a smart watch is used for description. In most subsequent embodiments, the mobile phone and the smart watch are also used as an example for description. It may be understood that a plurality of embodiments described in this application by using the mobile phone and the smart watch as an example do not constitute a limitation on another embodiment. The device type of the first device and the device type of the second device may alternatively be other devices, and all solutions that can implement the inventive concept of this application fall within the protection scope of this application.

In this embodiment of this application, the first device is configured with a camera and a display apparatus, supports a photographing function, and may display an image of a real object collected by the camera. In addition, the first device has a strong image processing capability, and may synthesize a virtual image, and display a virtual object image or an image of combining a virtual object and a real object.

The second device is configured with the display apparatus, configured to display an image. The second device may support display of a plurality of home screens.

The first device and/or the second device may further support collection and identification of a user operation such as a touch, a gesture, or a voice, and convert the user operation into a corresponding instruction. For example, a display of the first device and/or a display of the second device may identify a touch operation, and when a flick-left, flick-right, flick-up, or flick-down user operation on a touchscreen is detected, an image may be correspondingly switched to for display. Alternatively, the first device and/or the second device may detect a device status via one or more sensors such as an acceleration sensor, a gravity sensor, and a gyroscope sensor, for example, tilting leftward, tilting rightward, tilting upward, and tilting downward, and may correspondingly switch to an image for display. Alternatively, the first device and/or the second device may further detect a user gesture via a camera or another sensor, or collect a user voice via a microphone, or the like, convert the foregoing operation into an instruction for switching to an image for display, and respond to the instruction.

In some embodiments, the first device may enable a photographing preview function, and collect and identify an image of a screen contour of the second device or a user wearing part. Then, the first device displays, in a photographing preview interface by using an image processing technology, a preview picture in which the second device presents a home screen selected by the user.

A first connection may be established between the first device and the second device. In some embodiments, the user may browse and select a home screen on the first device, and then the first device sends a configuration file of the home screen to the second device, and the second device displays, based on the configuration file, the home screen selected by the user. In some other embodiments, the second device may alternatively store some home screens for the user to select, and the user may select and configure a home screen on the second device. For descriptions of more specific embodiments, refer to the following embodiments.

The first connection between the first device and the second device may be a wired connection or a wireless connection. This is not limited in this embodiment. Data or instructions may be transmitted between the first device and the second device through the established first connection.

The first connection may be a short-range communication connection, for example, a wired connection such as a universal serial bus (universal serial bus, USB) connection, a high definition multimedia interface (high definition multimedia interface, HDMI) connection, or a display port (display port, DP) connection; or a wireless connection such as a Bluetooth (Bluetooth, BT) connection, a wireless fidelity (wireless fidelity, Wi-Fi) connection, a hotspot connection, near field communication (near field communication, NFC), or ZigBee, used to implement communication between the first device and the second device when there is no account or different accounts. The wireless connection has no cable restriction, and the user has more freedom to move. A type of the first connection is not limited in this embodiment of this application.

A Bluetooth (Bluetooth, BT) module and/or a wireless local area network (wireless local area network, WLAN) module may be configured in the first device or the second device. The Bluetooth module may provide a Bluetooth communication solution including one or more of classic Bluetooth (Bluetooth 2.1) or Bluetooth low energy (Bluetooth low energy, BLE). The WLAN module may provide a WLAN communication solution including one or more of a wireless fidelity peer-to-peer (wireless fidelity peer-to-peer, Wi-Fi P2P) connection, a wireless fidelity local area network (wireless fidelity local area network, Wi-Fi LAN), or a wireless fidelity software access point (wireless fidelity software access point, Wi-Fi softAP). In some embodiments, Wi-Fi P2P means that devices in a wireless network are allowed to be connected to each other in a peer-to-peer manner without using a wireless router. In an Android® system, Wi-Fi P2P may also be referred to as wireless fidelity direct (wireless fidelity direct, Wi-Fi direct). Devices that establish a Wi-Fi P2P connection may exchange data directly over Wi-Fi (which needs to be in a same frequency band) without connecting to a network or hotspot, to implement peer-to-peer communication, for example, transmitting data such as a file, an image, and a video. Compared with Bluetooth, Wi-Fi P2P has advantages such as a faster search speed, a faster transmission speed, and a longer transmission range.

The first connection may alternatively be a long-range communication connection. The long-range communication connection may include but is not limited to a long-range communication connection of a mobile network that is based on 2G, 3G, 4G, 5G, and a subsequent standard protocol. Alternatively, the first device and the second device log in to a same account (for example, a Huawei account), or login accounts of the first device and the second device belong to a same group (for example, a same family account), to implement a connection and communication via a server/the Internet (Internet). The first device and the second device may alternatively log in different accounts, but are connected in a binding manner. For example, the mobile phone and the smart watch may log in different accounts. In a device management application, the smart watch is bound to the mobile phone. Then, the mobile phone and the smart watch are connected through the device management application.

In addition, the first device and the second device in the communication system 10 may alternatively be connected to and communicate with each other in combination with the foregoing several manners. This is not limited in this embodiment of this application. For example, the first connection between the mobile phone and the smart watch may be a combination of a plurality of connections. For example, the mobile phone or the smart watch establishes a connection to a router through Wi-Fi to access a network, or establishes a connection to a base station through a cellular signal to access a network, and the mobile phone and the smart watch communicate with each other through the network. For example, the mobile phone sends information to a cloud server through the network, and the cloud server sends the information to the smart watch through the network.

In some embodiments, when the first device and the second device are mutually trusted devices, or established a trust relationship, for example, the two terminal devices have been matched, paired, or connected before, and are to be connected again, the two terminal devices automatically establish a communication connection, and then perform data exchange, and the user does not need to manually perform a connection or matching operation again, saving time and effort, for example, an electronic device that has been paired with Bluetooth, or an electronic device that has been connected to a shared hotspot or has established a Wi-Fi P2P connection. This is not limited in this embodiment.

An Android® system, a Windows® system, iOS®, macOS®, a Linux® system, HarmonyOS, or another type of operating system may be installed on the first device or the second device. Operating systems of the first device and the second device may be the same or may be different. This is not limited in this application.

It should be noted that the communication system 10 shown in FIG. 2 is merely used to assist in describing the technical solutions provided in embodiments of this application, and does not constitute a limitation on another embodiment of this application. In an actual service scenario, the communication system 10 may include more or fewer terminal devices. A terminal device type, a quantity of terminal devices, a connection manner, and the like in the communication system 10 are not limited in this application.

The following describes the technical solutions of this application with reference to related application scenarios and example user interfaces provided in some embodiments.

In the following embodiments provided in this application, an example in which the first device is a mobile phone and the second device is a smart watch is used for description. It may be understood that a plurality of embodiments described in this application by using the mobile phone and the smart watch as an example do not constitute any limitation on another embodiment. A device type of the first device and a device type of the second device may alternatively be other devices, and all solutions that can implement the inventive concept of this application fall within the protection scope of this application.

It may be understood that user interfaces described in the following embodiments of this application are merely example interfaces, and do not constitute a limitation on another embodiment of this application. In another embodiment, in the user interface, different interface layouts may be used, more or fewer controls may be included, and another function option may be added or reduced. The following example interface may also be migrated to another type of device. All technical solutions based on a same inventive concept provided in this application fall within the protection scope of this application.

Both the mobile phone and the smart watch are configured with a display, and support the user in customizing a home screen. The mobile phone and the smart watch may further separately or jointly provide functions related to exercise and health for the user, for example, exercise amount statistics, heart rate monitoring, and sleep monitoring. Data may be synchronized between the mobile phone and the smart watch.

After establishing a communication connection, the mobile phone and the smart watch may mutually send an instruction, data, and the like through the communication connection. The communication connection may be a short-range communication connection or a long-range communication connection, for example, a USB connection, a Bluetooth connection, a Wi-Fi P2P connection, a WLAN connection, a radio frequency identification (radio frequency identification, REID) connection, or a ZigBee connection. This is not limited in this embodiment. The mobile phone and the smart watch may log in a same account, or login accounts of the mobile phone and the smart watch belong to a same group (for example, a same family account), or may be different accounts. This is not limited in this embodiment.

In embodiments of this application, a "home screen" of the smart watch may be referred to as a "watch face". In some descriptions, the watch face may indicate a watch face theme, including a series of elements such as a wallpaper, an application icon, a screen saver image, and a font. In some descriptions, the watch face may be understood as a watch face wallpaper in a narrow sense, and may be specifically determined with reference to a context.

In some embodiments, the user may browse and select a watch face in a watch face market provided by the mobile phone, and then the mobile phone obtains a configuration file of the watch face from a cloud server, and sends the configuration file of the watch face to the watch; or the mobile phone reports, to the cloud server, a watch face option selected by the user, and the cloud server delivers the configuration file of the watch face to the smart watch, or the like. After obtaining the configuration file of the watch face, the smart watch may display, based on the configuration file, an interface of the watch face selected by the user. In some other embodiments, the smart watch may alternatively locally store some watch faces for the user to select, and the user may directly select and configure a watch face on the smart watch.

Figure 3:
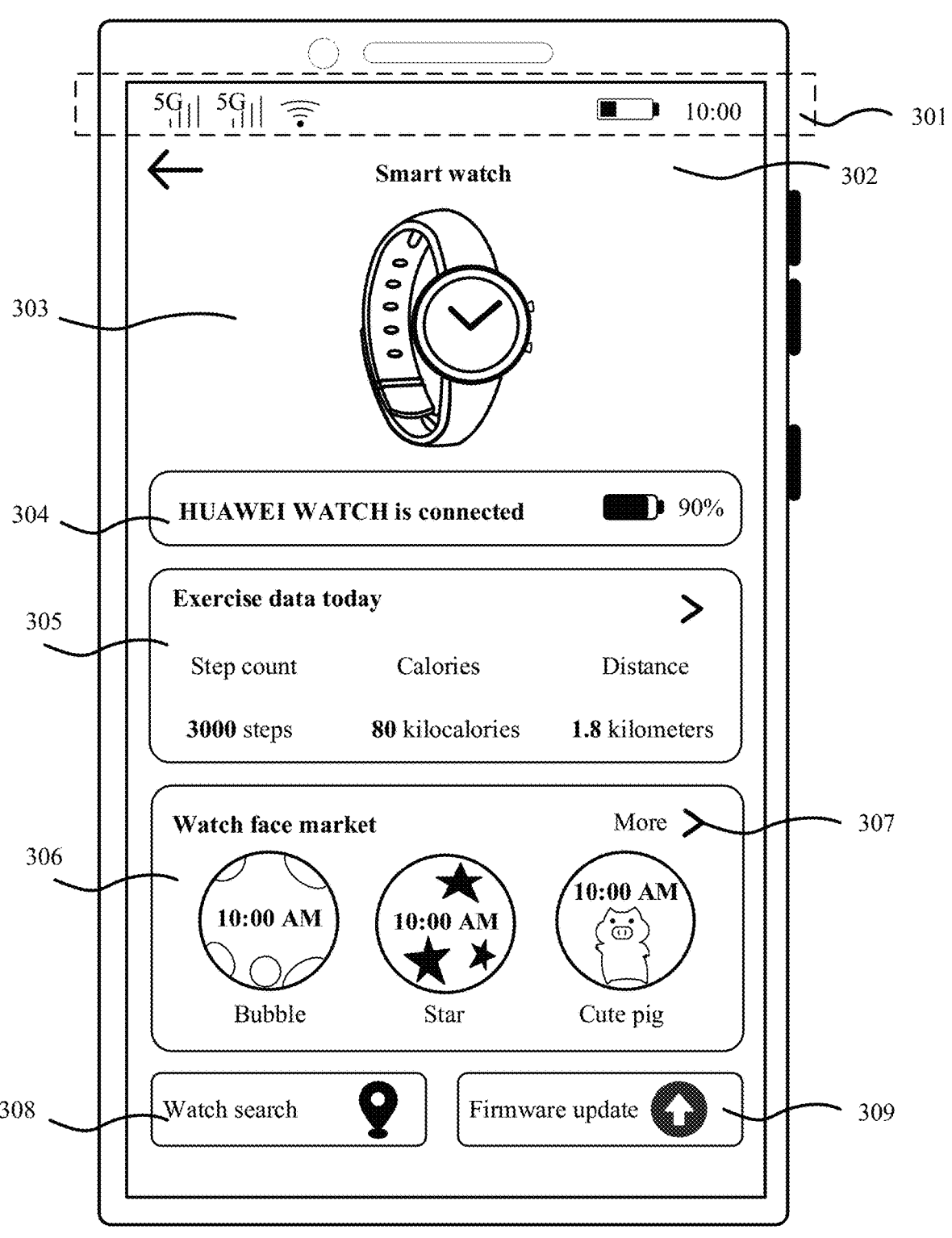
FIG. 3 is a schematic diagram of a user interface according to an embodiment of this application.

Refer to a user interface 300 shown in FIG. 3. FIG. 3 shows a function interface of a smart watch associated with a mobile phone. A user may enter the function interface of the smart watch through an exercise and health application. The user may view, in the interface, user data detected by the smart watch, and the user may further manage some functions of the smart watch by using the interface. The user interface 300 may include a watch face market entrance.

As shown in FIG. 3, the user interface 300 may include a top status bar 301, a title bar 302, a schematic device picture 303, a device status bar 304, an exercise data statistics bar 305, a watch face market entrance 306, a watch search control 308, a firmware update control 309, and the like.

The top status bar 301 may include one or more signal strength indicators of a mobile communication signal (which may also be referred to as a cellular signal), one or more signal strength indicators of a wireless network signal, a battery status (for example, a battery level) indicator, a time indicator, and the like.

The title bar 302 may include a title of a current page, that is, a title of the smart watch, and a return control used to return to a previous page.

The schematic device picture 303 may be used to display a schematic picture of a device currently associated with the mobile phone, for example, a schematic picture of the smart watch shown in FIG. 3.

The device status bar 304 may include a name (for example, HUAWEI WATCH) of an associated device, a communication connection status (for example, connected or disconnected), and a battery status (for example, a battery level) indicator of the associated device (that is, the smart watch).

The exercise data statistics bar 305 is used to display exercise data of the user today detected by an electronic device 200. The exercise data of the user today may include a step count, consumed calories, and an exercise distance.

The watch face market entrance 306 is an entrance control of a watch face market application. In the user interface 300, the watch face market entrance 306 may display one or more watch face options and a more control 307. The user may tap a watch face option listed in the watch face market entrance 306 to quickly change a watch face. The user may further tap the more control 307, to trigger the mobile phone to display a user interface 400 shown in FIG. 4. The user interface 400 is a watch face market application function interface. The watch face market entrance 306 shown herein is not limited to a unique entrance of the watch face market application. For example, the user may further enter the watch face market application interface from an entrance such as a leftmost screen, a pull-up tool bar, a pull-down notification bar, a pull-left/pull-right shortcut icon bar, a setting interface, a home screen shortcut, or a home screen widget of the mobile phone. A manner of entering the watch face market application interface is not limited in this embodiment.

The watch search control 308 may be used by the mobile phone to view positioning information of the smart watch.

The firmware update control 309 may be used to trigger system update.

Figure 4:
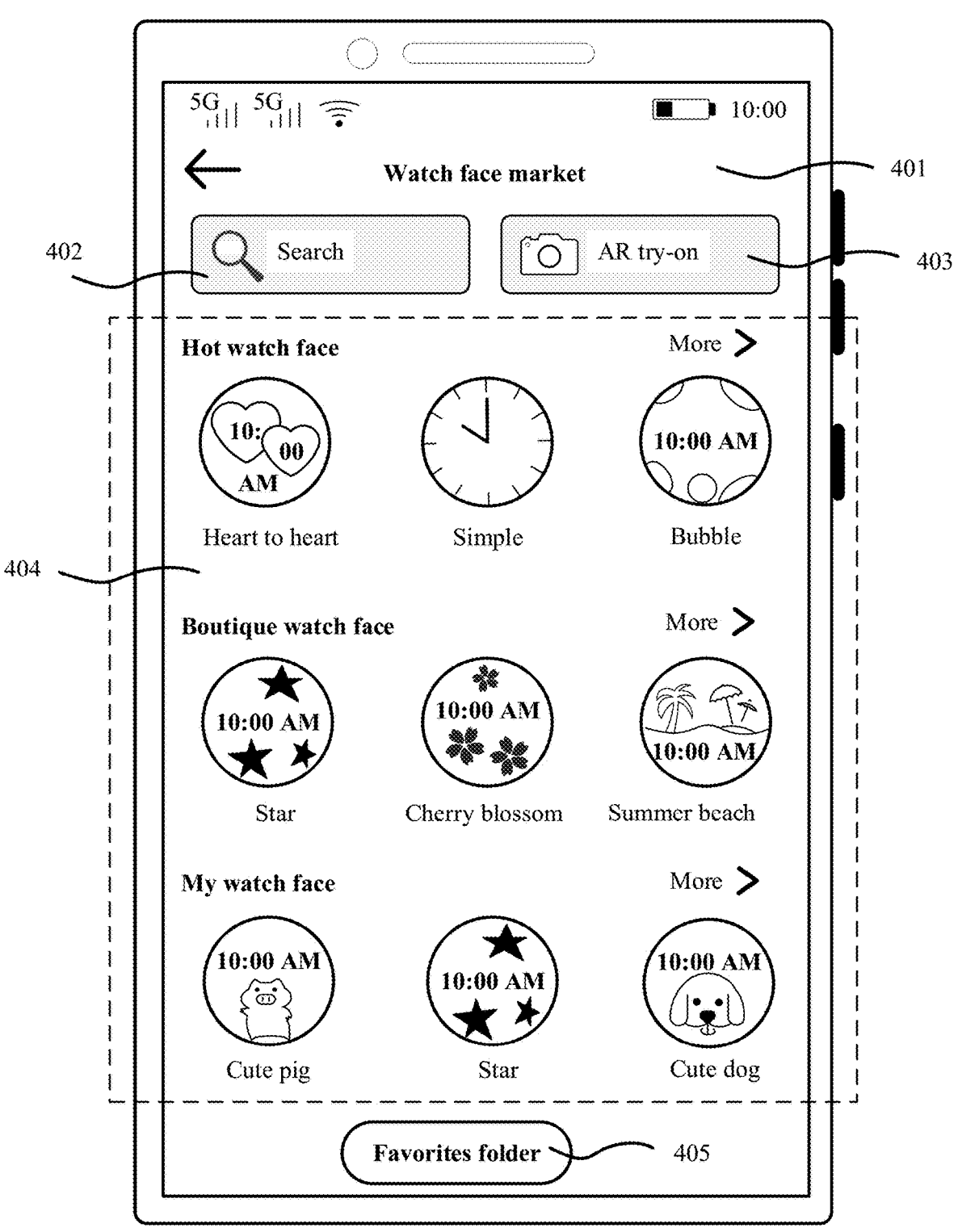
FIG. 4 is a schematic diagram of a user interface according to an embodiment of this application.

When detecting that the more control 307 in the watch face market entrance 306 is tapped by the user, the mobile phone may display the user interface 400 shown in FIG. 4. The user interface 400 is the watch face market application function interface.

For example, the user interface 400 may include a title bar 401, a search control 402, an AR try-on control 403, a watch face display area 404, a favorites folder control 405, and the like.

The title bar 401 is used to indicate a theme of a current interface, and may include a title of a current page, that is, a watch face market title, and a return control used to return to a previous page.

The search control 402 may be used by the user to search for a watch face. The user may enter a keyword in the search bar to search for the watch face. In response to a search operation, the mobile phone may display zero, one, or more watch face search results. In some other embodiments, the search control 402 may further support voice search.

The AR try-on control 403 is an entrance control of a watch face try-on function. The AR try-on control 403 is tapped, and the mobile phone may display a user interface 600 shown in FIG. 6A and FIG. 6B. The user interface 600 may display an image in which the user tries on the watch face. For specific descriptions, refer to subsequent descriptions.

The watch face display area 404 is used to display one or more watch face options. Optionally, the watch face display area 404 may include one or more watch face classification categories. For example, as shown in FIG. 4, the watch face display area 404 may be divided into classification areas such as a hot watch face, a boutique watch face, and my watch face. The hot watch face is a watch face selected by a large quantity of users, for example, including a heart-to-heart watch face, a simple watch face, and a bubble watch face. The boutique watch face is a watch face with a beautiful design, for example, including a star watch face, a cherry blossom watch face, and a summer beach watch face. My watch face is a watch face already owned by the user, for example, including a cute pig watch face, the star watch face, and a cute dog watch face.

Figure 14:
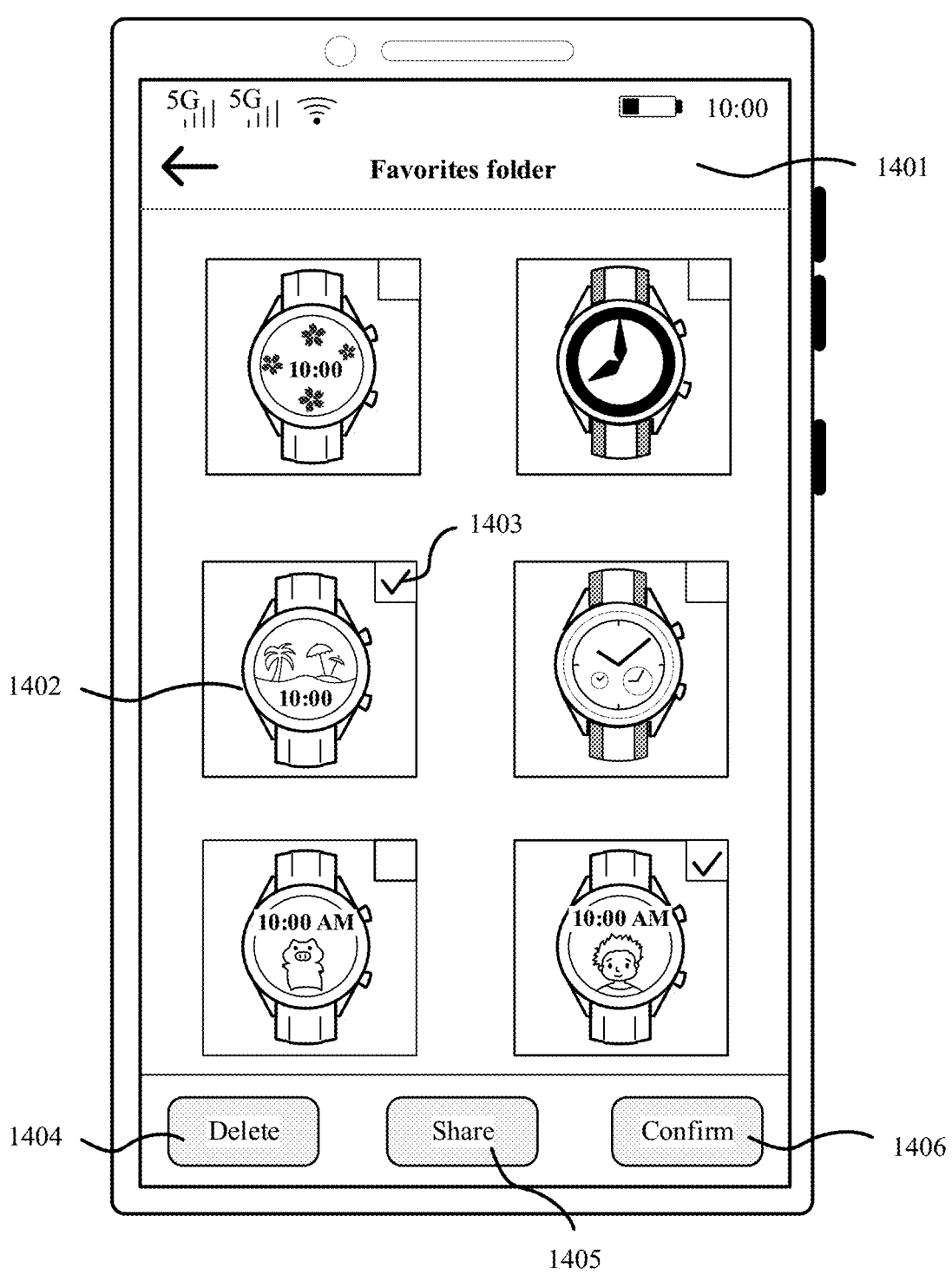
FIG. 14 is a schematic diagram of a user interface according to an embodiment of this application.

The favorites folder control 405 may be used to trigger the mobile phone to display a favorites interface, for example, a user interface 1400 shown in FIG. 14. The user interface 1400 displays zero, one, or more watch face options that are favored by the user. For specific descriptions, refer to subsequent descriptions.

In response to a watch face option selected by the user, the mobile phone may display detailed information of the watch face option.

Figure 5:
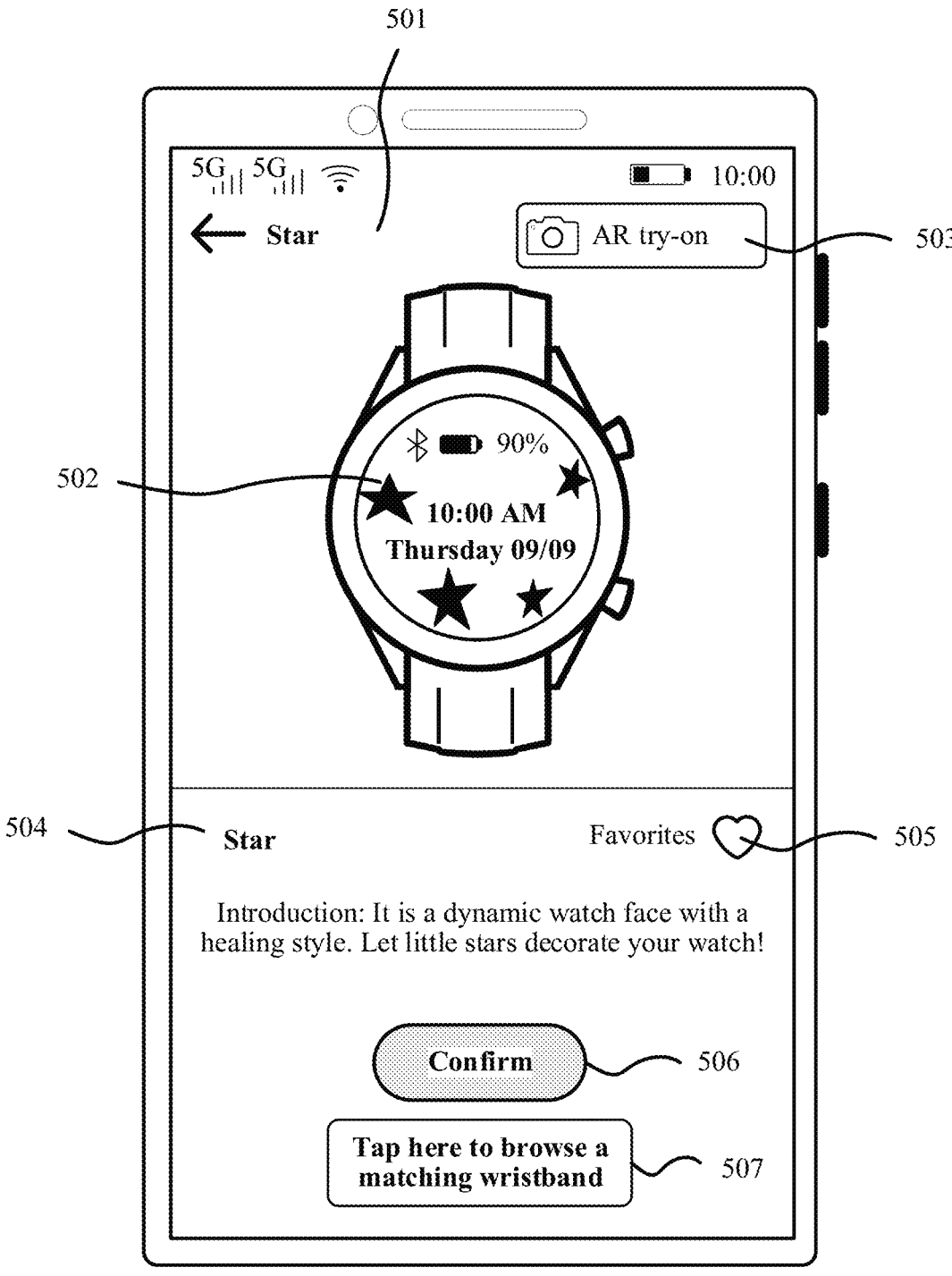
FIG. 5 is a schematic diagram of a user interface according to an embodiment of this application.

For example, the user selects a star watch face option in the watch face display area 404, and the mobile phone may display a user interface 500 shown in FIG. 5. The user interface 500 displays related detailed information of the star watch face.

As shown in FIG. 5, the user interface 500 may display a title bar 501, a watch face diagram 502, an AR try-on control 503, a watch face name 504, a favorites control 505, a confirm control 506, a wristband browsing control 507, and the like.

The title bar 501 is used to indicate a theme of a current interface, and may include a title of a current page, that is, a title star, and a return control used to return to a previous page.

The watch face diagram 502 may display a schematic diagram of a current watch face. As shown in FIG. 5, a plurality of stars are displayed in the schematic diagram of the star watch face.

The AR try-on control 503 is an entrance control of the watch face try-on function. The AR try-on control 503 is tapped, and the mobile phone may display an interface of trying on the current star watch face, for example, a user interface 600 shown in FIG. 6A and FIG. 6B. The user interface 600 may display an image in which the user tries on the star watch face. For specific descriptions, refer to subsequent descriptions.

The watch face name 504 may be used to display a name of the current watch face. For example, as shown in FIG. 5, when the watch face displayed in the user interface 500 is the star watch face, the displayed watch face name 504 is "star". An introduction to the current watch face may be further displayed below the watch face name 504.

The favorites control 505 may be used to add the watch face to favorites or delete the watch face from favorites. The star watch face is used as an example. When the star watch face is not added to the favorites, the mobile phone may add the star watch face to the favorites folder in response to a favorites operation (for example, a tap operation) performed on the favorites control 505. When the star watch face has been added to the favorites, the mobile phone may delete the star watch face from the favorites folder in response to a favorites deletion operation (for example, a tap operation) performed on the favorites control.

The confirm control 506 may be used to trigger the mobile phone to confirm selection of the current watch face. Confirming selection of the current watch face may be purchasing the current watch face. In this case, a purchase page or a payment page is jumped to and displayed. Alternatively, confirming selection of the current watch face may be confirming configuration of the current watch face, so that the smart watch obtains a configuration file of the watch face and applies the configuration file for display, or the like.

The wristband browsing control 507 may be used to trigger the mobile phone to display a wristband option matching the current watch face. A wristband matching the current watch face may have the same or similar design element or design style as the current watch face.

The mobile phone is configured with a camera and a display. The camera may be configured to capture and collect an image, and the display may display an image of a real object collected by the camera. In addition, the mobile phone has a strong image processing capability, and may synthesize a virtual image and display a virtual object image or an image of combining a virtual object and a real object.

Embodiments of this application provide a novel interaction manner of previewing the watch face, the user can be provided with a faster and more convenient preview interface and easier-to-operate, more user-friendly, and nicer interaction experience. In embodiments of this application, the mobile phone may enable a photographing preview function, and collect and identify an image of a screen contour of the smart watch or a wrist position of the user, and then the mobile phone uses an image processing technology to display, in a photographing preview interface, a virtual image of a home screen selected by the user to the smart hand. Embodiments of this application do not constitute any limitation on a used image processing algorithm provided that the preview function described in embodiments can be implemented.

The mobile phone and/or the smart watch may further support collection and identification of a user operation such as a touch, a gesture, or a voice, use the user operation as an input parameter, and convert the input parameter into a corresponding instruction. For example, the display of the mobile phone and/or the display of the smart watch may identify a touch operation, and when a flick-left, flick-right, flick-up, or flick-down user operation on the touchscreen is detected, a watch face image may be correspondingly switched to for display. Alternatively, the mobile phone and/or the smart watch may detect a device status via one or more sensors such as an acceleration sensor, a gravity sensor, and a gyroscope sensor, for example, tilting leftward, tilting rightward, tilting upward, and tilting downward, and may correspondingly switch to a watch face image for display. Alternatively, the mobile phone and/or the smart watch may further detect a user gesture via a camera or another sensor, or collect a user voice via a microphone, or the like, convert the foregoing operation into an instruction for switching to a watch face image for display, and respond to the instruction.

The following describes the preview function provided in this embodiment by using examples with reference to application scenarios, example interfaces, and interaction operations shown in FIG. 6A and FIG. 6B to FIG. 22A and FIG. 22B.

Figures 6A, 6B:
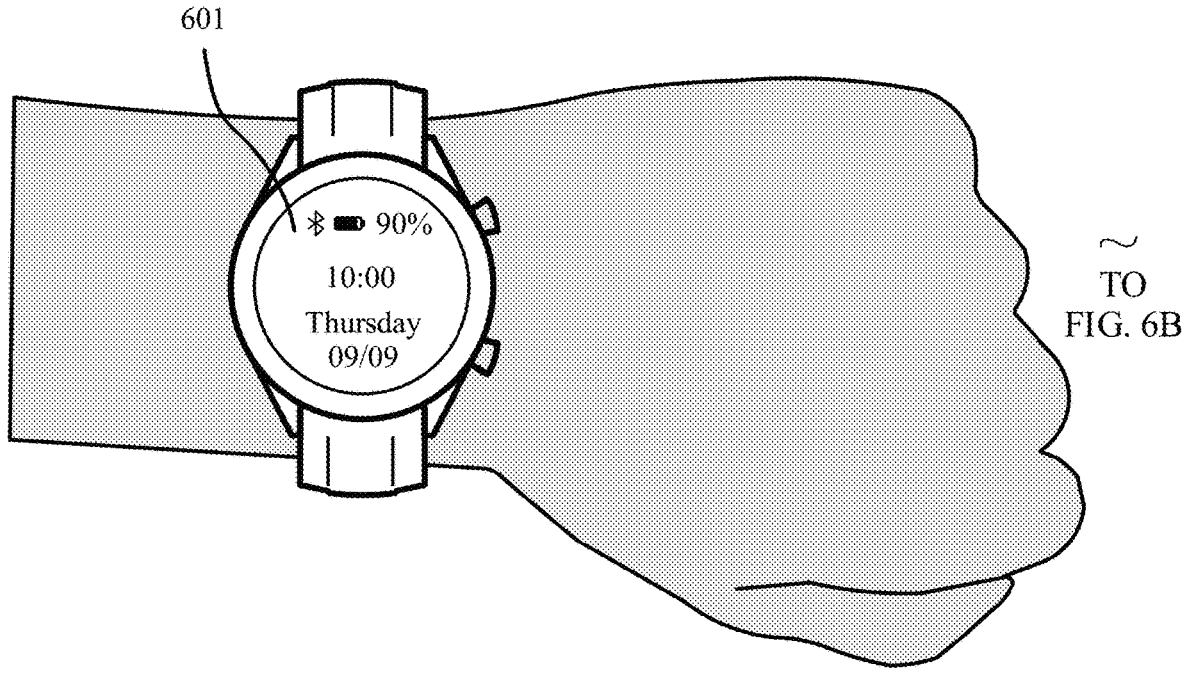
FIG. 6A and FIG. 6B are a schematic diagram of an application scenario according to an embodiment of this application.
Figure 6B:
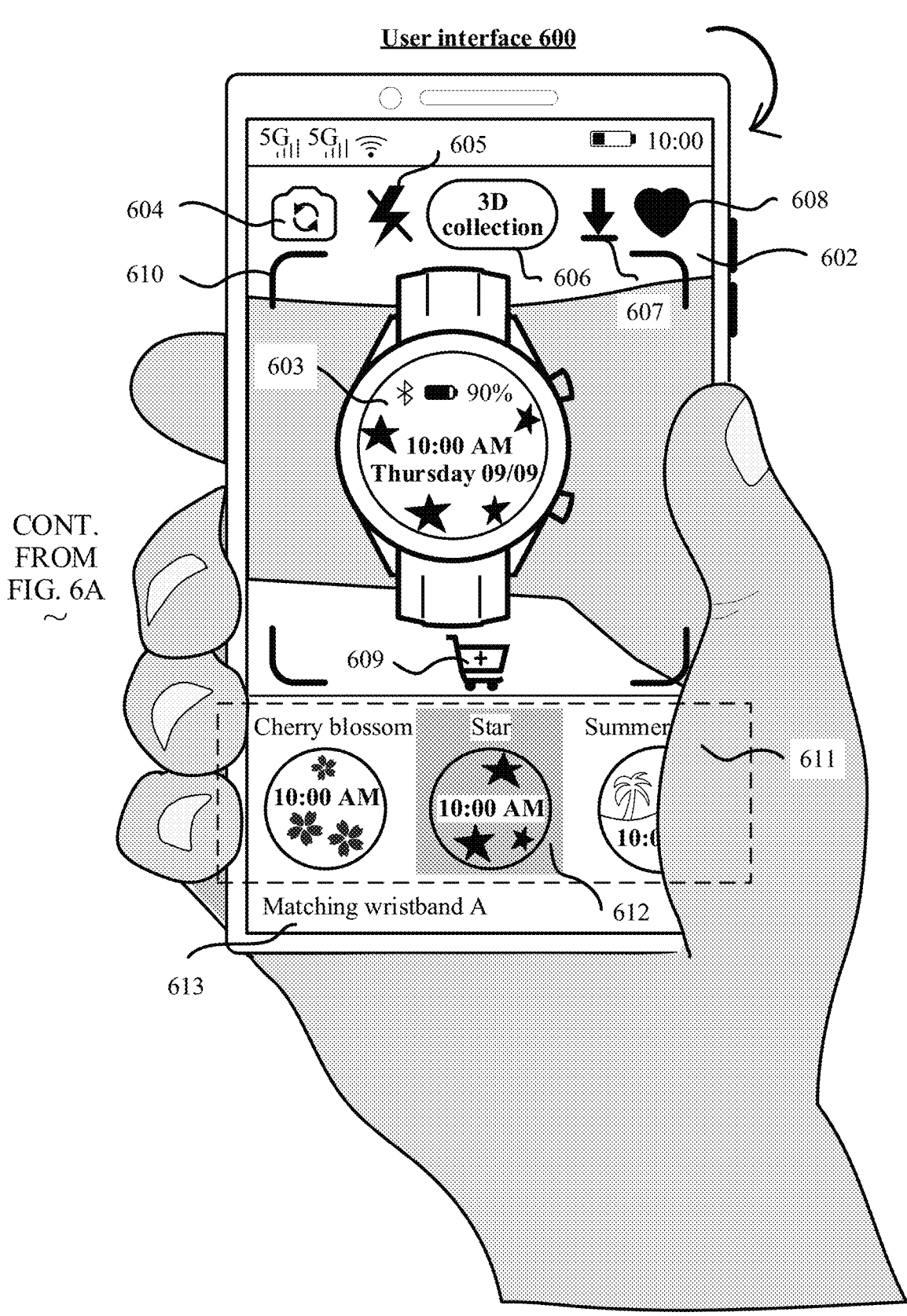

FIG. 6A and FIG. 6B show a scenario in which a user previews virtual watch face try-on.

For example, when detecting that the user taps an AR try-on control 503, a mobile phone may display an interface for trying on a current star watch face, for example, a user interface 600 shown in FIG. 6A and FIG. 6B. The user interface 600 may display an image in which the user tries on the star watch face.

As shown in FIG. 6A and FIG. 6B, the user wears a smart watch on a left hand and holds a mobile phone on a right hand, and a watch face of the smart watch on the left hand is a watch face interface 601. The user holds the mobile phone and aligns a camera with the smart watch on the left hand, to collect an image of the smart watch in real time. When the user selects the star watch face, the mobile phone may display, in a viewfinder frame 610 in real time, a try-on interface in which a star watch face interface 603 covers the original watch face interface 601.

The user interface 600 may include an image preview area 602, a watch face style selection area 611, and the like. The image preview area 602 may display an image collected by the camera of the mobile phone. The image preview area 602 may include the viewfinder frame 610. The viewfinder frame 610 is used to determine a range in which a virtual watch face image is generated by using an image processing technology. The user needs to align the camera with the smart watch. When the image of the smart watch is displayed in the range specified by the viewfinder frame 610, the mobile phone may identify an area (for example, a watch face contour) of the original watch face interface 601 of the smart watch, and cover the area of the original watch face interface with a virtual image of a watch face selected by the user. The viewfinder frame 610 displays an image in which the user wears the virtual watch face selected by the user.

The watch face style selection area 611 includes one or more watch face options. For example, as shown in FIG. 6A and FIG. 6B, the watch face style selection area 611 displays three watch face options: a cherry blossom watch face option, a star watch face option 612, and a summer beach watch face option. The star watch face option 612 is selected by the user. The star watch face option 612 may be displayed with a distinctive identifier, to distinguish the star watch face option 612 from an unselected watch face option. For example, a dark filling identifier or a highlight identifier may be added to the star watch face option 612, to indicate that the star watch face option is selected.

In response to the operation that the star watch face option 612 is selected by the user, the viewfinder frame 610 displays an image in which the watch face of the smart watch worn by the user is the star watch face interface 603 corresponding to the star watch face option 612.

In this embodiment of this application, the watch face image may be a static image, or may be a dynamic image. A representation form of the watch face is not limited in this embodiment. When the watch face image is a static image, the image in which the user tries on the watch face and that is displayed in the viewfinder frame 610 may be a static image. When the watch face image is a dynamic image, the image in which the user tries on the watch face and that is displayed in the viewfinder frame 610 may be a dynamic image.

The user interface 600 may further include a lens switching control 604, a flash control 605, a 3D collection control 606, an image saving control 607, a favorites control 608, a shopping cart control 609, a wristband browsing control 613, and the like.

The lens switching control 604 may be used to switch a lens. In the scenario shown in FIG. 6A and FIG. 6B, the user uses a rear-facing camera to collect the image of the smart watch. In some other embodiments, if a product previewed by the user is jewelry such as a necklace, a front-facing camera is used for photographing, which is more convenient for the user to view try-on effect. The mobile phone may quickly switch the lens from the rear-facing camera to the front-facing camera in response to an operation that the user selects the lens switching control 604. A type of the switched camera is not limited herein. Cameras may include the front-facing camera, the rear-facing camera, a wide-angle camera, a depth camera, and other types.

The flash control 605 may be used by the user to control to turn on or off a flash. For example, the mobile phone may turn on or off the flash in response to an operation performed on the flash control 605. In some embodiments, when the flash control 605 is in an on state, the mobile phone may determine, based on detected external environment light, whether to turn on the flash. For example, when detecting that luminance of the external environment light is less than or equal to a first luminance threshold, the mobile phone determines to turn on the flash. When detecting that luminance of the external environment light is greater than a first luminance threshold, the mobile phone determines not to turn on the flash. In this way, when the external environment light is insufficient, for example, at night or in a dark room, the flash may be used to supplement light, to increase luminance of an image collected by the mobile phone.

In some embodiments, the 3D collection control 606 may be used to trigger the mobile phone to enable a function of collecting an image of a user body part, establishing a three-dimensional model, and synthesizing a virtual image on the three-dimensional model, for example, collecting a hand image of the user, establishing a 3D model, and synthesizing and displaying, on the 3D hand image, a virtual watch face selected by the user. For details, refer to the embodiments shown in FIG. 16 to FIG. 22A and FIG. 22B. Details are not described herein.

The image saving control 607 may be used by the user to save, in a gallery, an image of currently wearing the watch face.

The favorites control 608 may be used by the user to add a previewed watch face to a favorites folder or delete a previewed watch face from a favorites folder. For example, when the watch face does not exist in the favorites folder, the mobile phone adds the previewed watch face to the favorites folder in response to a tap operation performed on the favorites control 608, and the heart-shaped favorites control 608 corresponding to the watch face added to the favorites folder may be in a filled and selected state. When the watch face exists in the favorites folder, the mobile phone deletes the previewed watch face from the favorites folder in response to a tap operation performed on the favorites control 608, and the heart-shaped favorites control 608 corresponding to the watch face that is not added to the favorites folder may be in a hollow and unselected state.

The shopping cart control 609 may be used by the user to add a previewed watch face to a shopping list, and subsequently the user may select a desired watch face in the shopping list for purchase.

The wristband browsing control 613 may be used to trigger the mobile phone to display, in the viewfinder frame 610, an image in which the user wears a virtual wristband. For details, refer to the embodiment shown in FIG. 13A, FIG. 13B, and FIG. 13C.

In this embodiment of this application, the mobile phone may switch a previewed watch face in response to a user operation performed on the mobile phone or the smart watch. The user operation that triggers watch face switching may include any one or more of the following: a flick operation, a tap operation, a voice input operation, a gesture operation, and the like. The user operation that triggers watch face switching is not limited in this embodiment.

FIG. 7A and FIG. 7B and FIG. 8A and FIG. 8B each show a manner of switching a watch face option. The mobile phone may trigger previewed watch face switching in response to a flick operation (for example, flick-left or flick-right) of the user in the image preview area 602.

For example, as shown in the user interface 600, a previous watch face option of the star watch face is a cherry blossom watch face, and a next watch face option of the star watch face is a summer beach watch face. The mobile phone may switch a previewed watch face to a previous watch face or a next watch face in response to a flick or tap user operation, or the mobile phone may receive and respond to a switching operation detected by the smart watch, and switch a previewed watch face to a previous watch face or a next watch face.

Figures 7A, 7B:
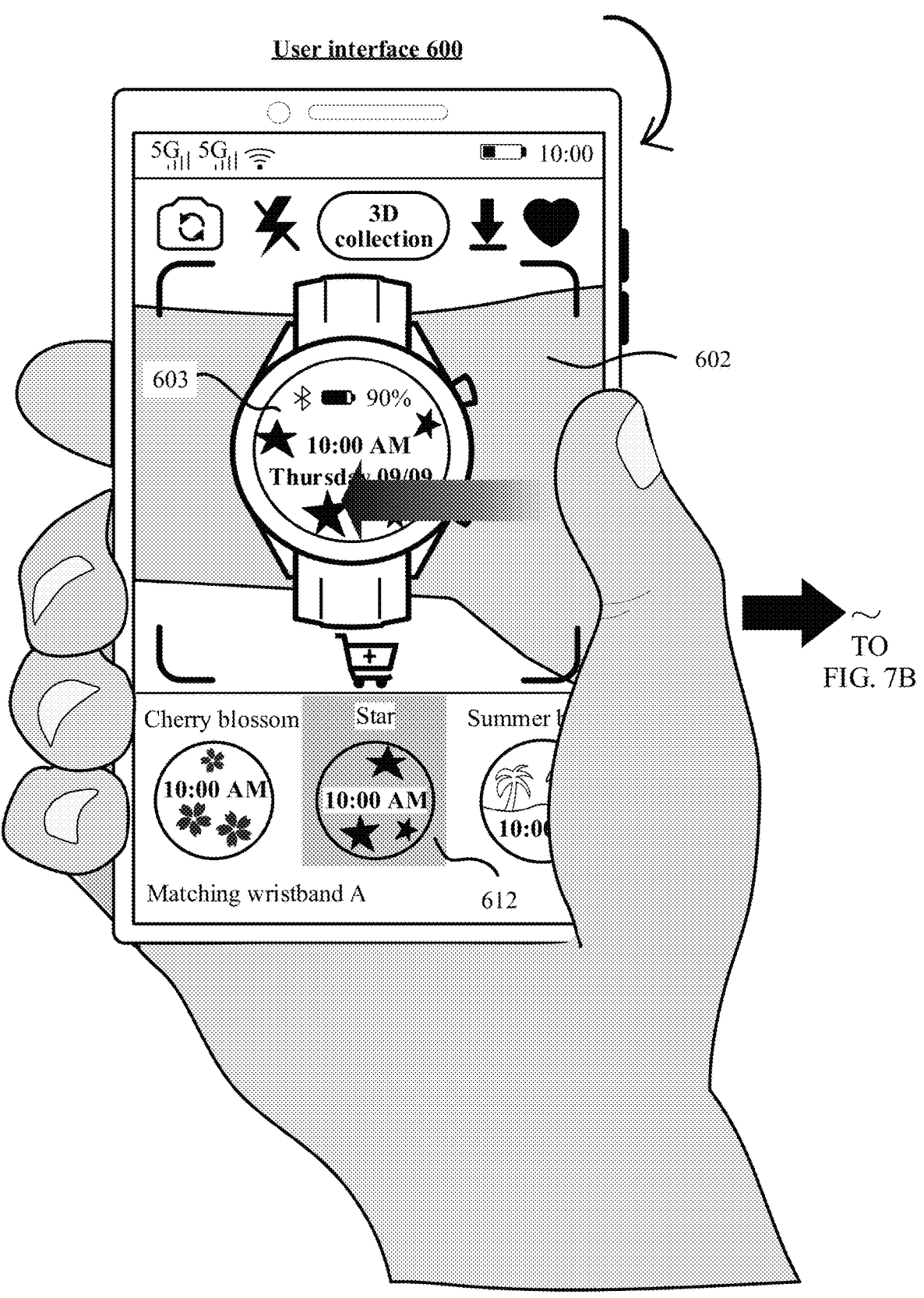
FIG. 7A and FIG. 7B are a schematic diagram of an interaction interface according to an embodiment of this application.
Figures 7A, 7B:
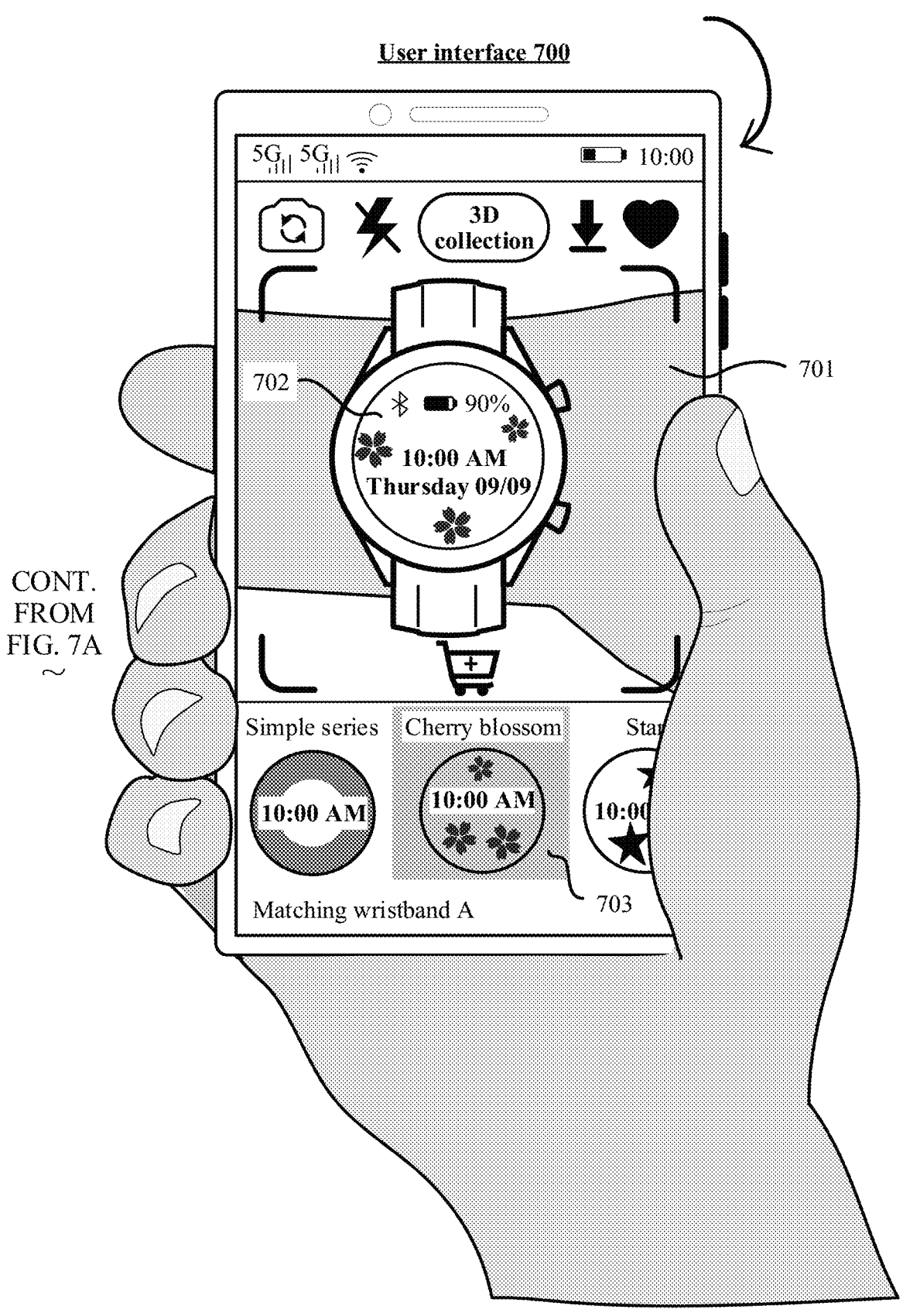

In an example, as shown in FIG. 7A and FIG. 7B, when the mobile phone detects a flick-left touch operation performed on the image preview area 602 of the user interface 600, the mobile phone displays a user interface 700. The user interface 700 is an example interface of a previous watch face option or a left-side watch face option. The watch face previewed in the user interface 600 is the star watch face, and a watch face previewed in the user interface 700 is a previous watch face option or a left-side watch face option of the star watch face, that is, the cherry blossom watch face. In other words, in response to the flick-left operation of the user in the image preview area 602, the mobile phone displays, in an image preview area 701, an image in which the user tries on a cherry blossom watch face interface 702, and the cherry blossom watch face is the previous watch face option or the left-side watch face option of the star watch face. In this case, selection of a cherry blossom watch face option 703 is displayed in the watch face style selection area.

Figure 8A:
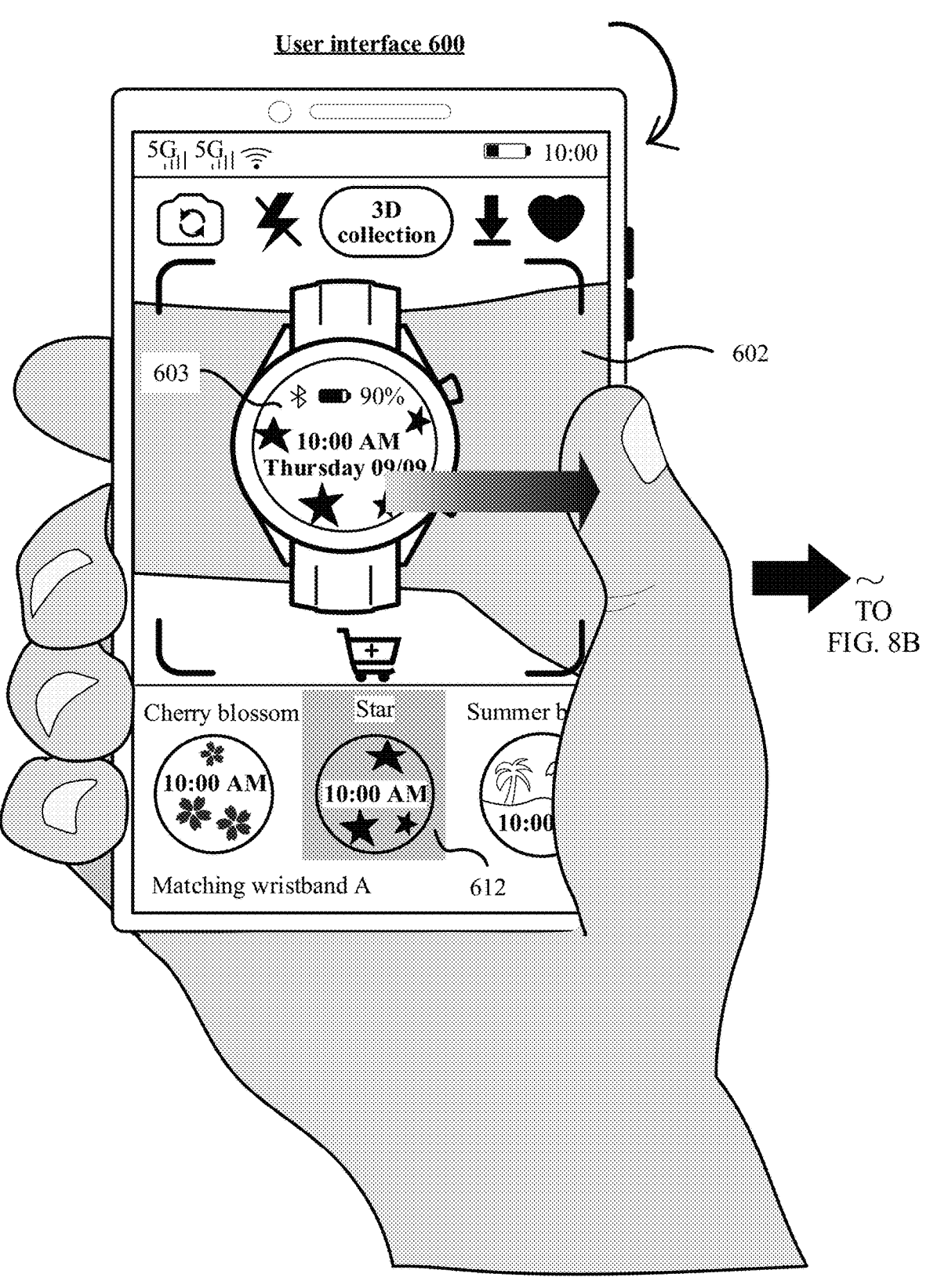
FIG. 8A and FIG. 8B are a schematic diagram of an interaction interface according to an embodiment of this application.
Figures 8A, 8B:
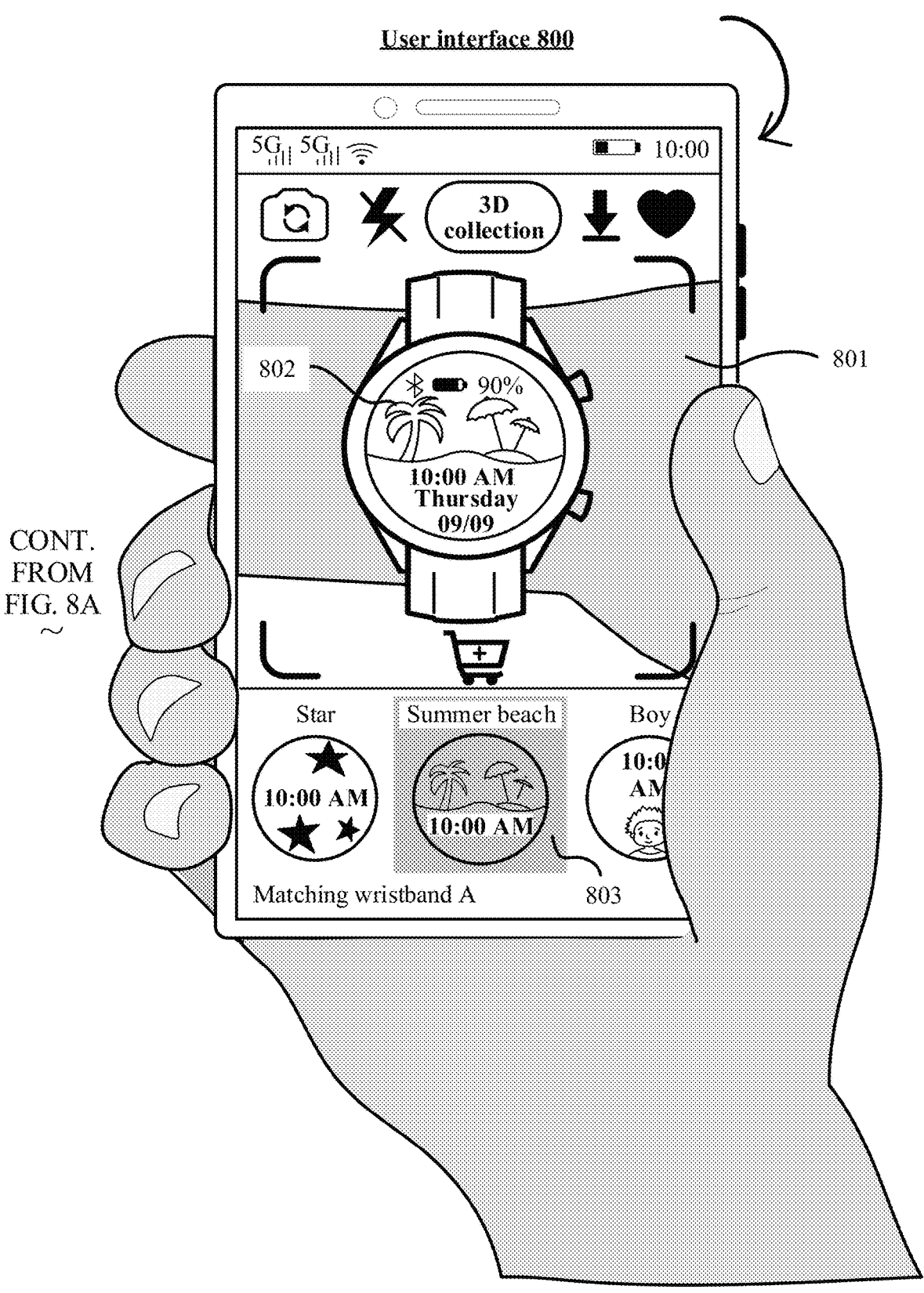

As shown in FIG. 8A and FIG. 8B, when the mobile phone detects a flick-right touch operation performed on the image preview area 602 of the user interface 600, the mobile phone displays a user interface 800. The user interface 800 is an example interface of a next watch face option or a right-side watch face option. The watch face previewed in the user interface 600 is the star watch face, and a watch face previewed in the user interface 800 is a next watch face option or a right-side watch face option of the star watch face, that is, the summer beach watch face. In other words, in response to the flick-right operation of the user in the image preview area 602, the mobile phone displays, in an image preview area 801, an image in which the user tries on a summer beach watch face interface 802. The summer beach watch face is the next watch face option or the right-side watch face option of the star watch face. In this case, selection of a summer beach watch face option 803 is displayed in the watch face style selection area.

In another embodiment, the user operation that triggers watch face switching is not limited to flick-left or flick-right. In a possible implementation, the trigger operation may alternatively be flick-down, flick-up, a flick operation in another direction, or the like.

In some embodiments, the mobile phone may alternatively switch the previewed watch face in response to an operation that the user selects a watch face option in the watch face style selection area 611. For example, if the user selects the cherry blossom watch face option 703 in the watch face style selection area 611, the mobile phone may switch the previewed watch face from the star watch face interface 603 to the cherry blossom watch face interface 702, as shown in the user interface 700. If the user selects the summer beach watch face option 803 in the watch face style selection area 611, the mobile phone may switch the previewed watch face from the star watch face interface 603 to the summer beach watch face interface 802, as shown in the user interface 800.

In some other embodiments, the mobile phone may alternatively switch the previewed watch face in response to a voice input of the user. For example, the mobile phone may identify a specific voice in which a voice instruction of the user is "switching to previous one" or "switching to next one", and switch a previewed watch face to a previous watch face or switch a previewed watch face to a next watch face.

In some other embodiments, the mobile phone may alternatively switch the previewed watch face in response to a gesture input of the user for the mobile phone. The mobile phone may identify that a gesture image of the user is a specific gesture for switching to previous one or next one, for example, a left movement gesture, a right movement gesture, an up movement gesture, or a down movement gesture, and switch the previewed watch face to a previous watch face or switch the previewed watch face to a next watch face.

In some other embodiments, the mobile phone may alternatively determine, by detecting a status of the mobile phone or the smart watch, to switch the previewed watch face. For example, the mobile phone detects a device status of the mobile phone or the smart watch via one or more sensors such as an acceleration sensor, a gravity sensor, and a gyroscope sensor, for example, tilting leftward, tilting rightward, tilting upward, or tilting downward, and may correspondingly switch to a previous or next watch face image for display. Refer to the embodiments shown in FIG. 12A-1, FIG. 12A-2, and FIG. 12A-3 to FIG. 12D-1, FIG. 12D-2, and FIG. 12D-3.

In this embodiment of this application, the previewed watch face may be a theme watch face including a plurality of different interfaces. The theme watch face may include a series of interfaces such as a main interface, an icon interface, a screen-off interface, a lock screen interface, and a password input interface. The series of interfaces may include a same or similar design element or design style.

For example, when the previewed watch face is a theme watch face, the mobile phone may switch to another interface of the theme watch face for display in response to a flick touch operation (for example, a flick-up operation or a flick-down operation) performed by the user on the image preview area 602.

Figure 9A:
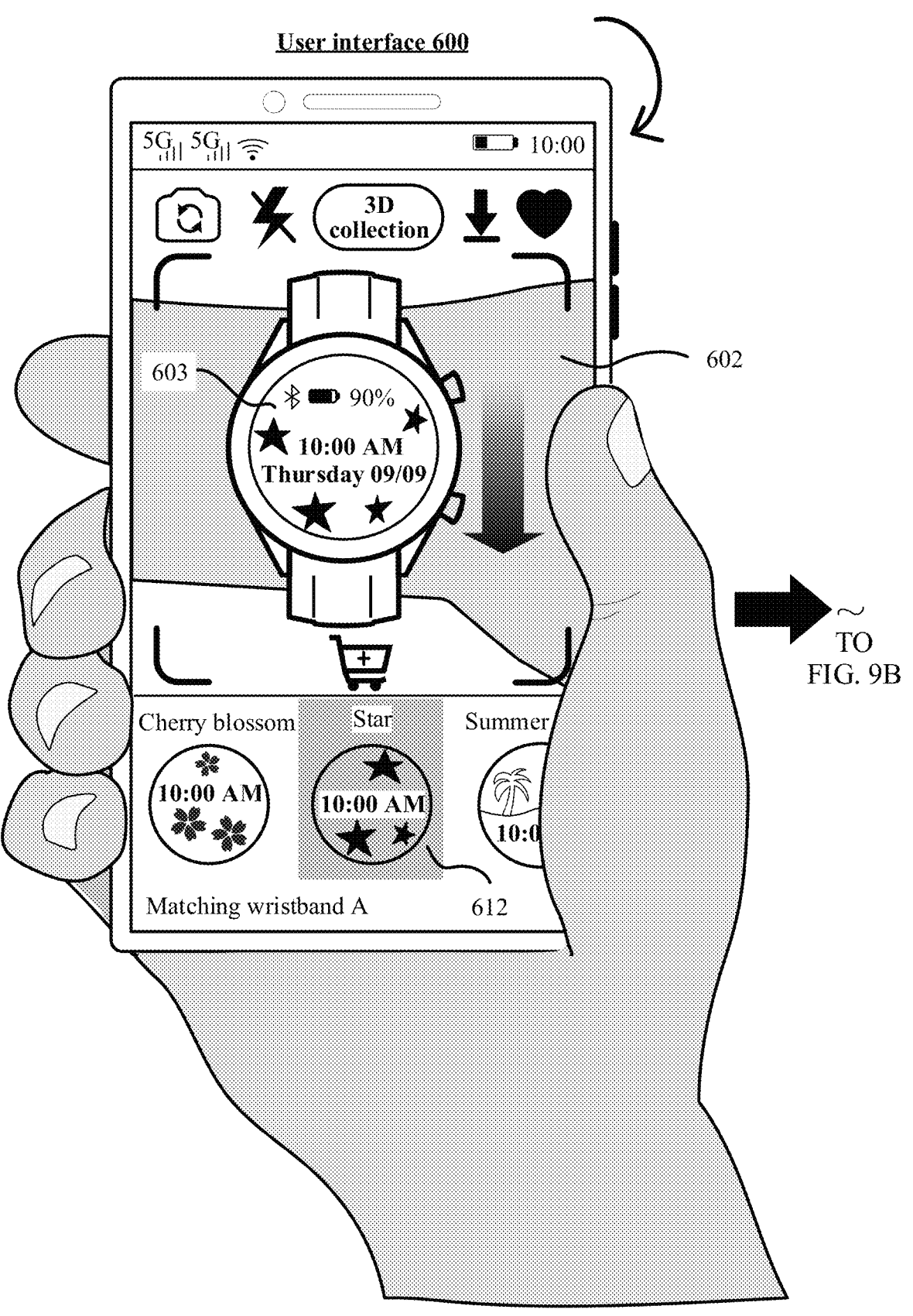
FIG. 9A and FIG. 9B are a schematic diagram of an interaction interface according to an embodiment of this application.
Figures 9A, 9B:
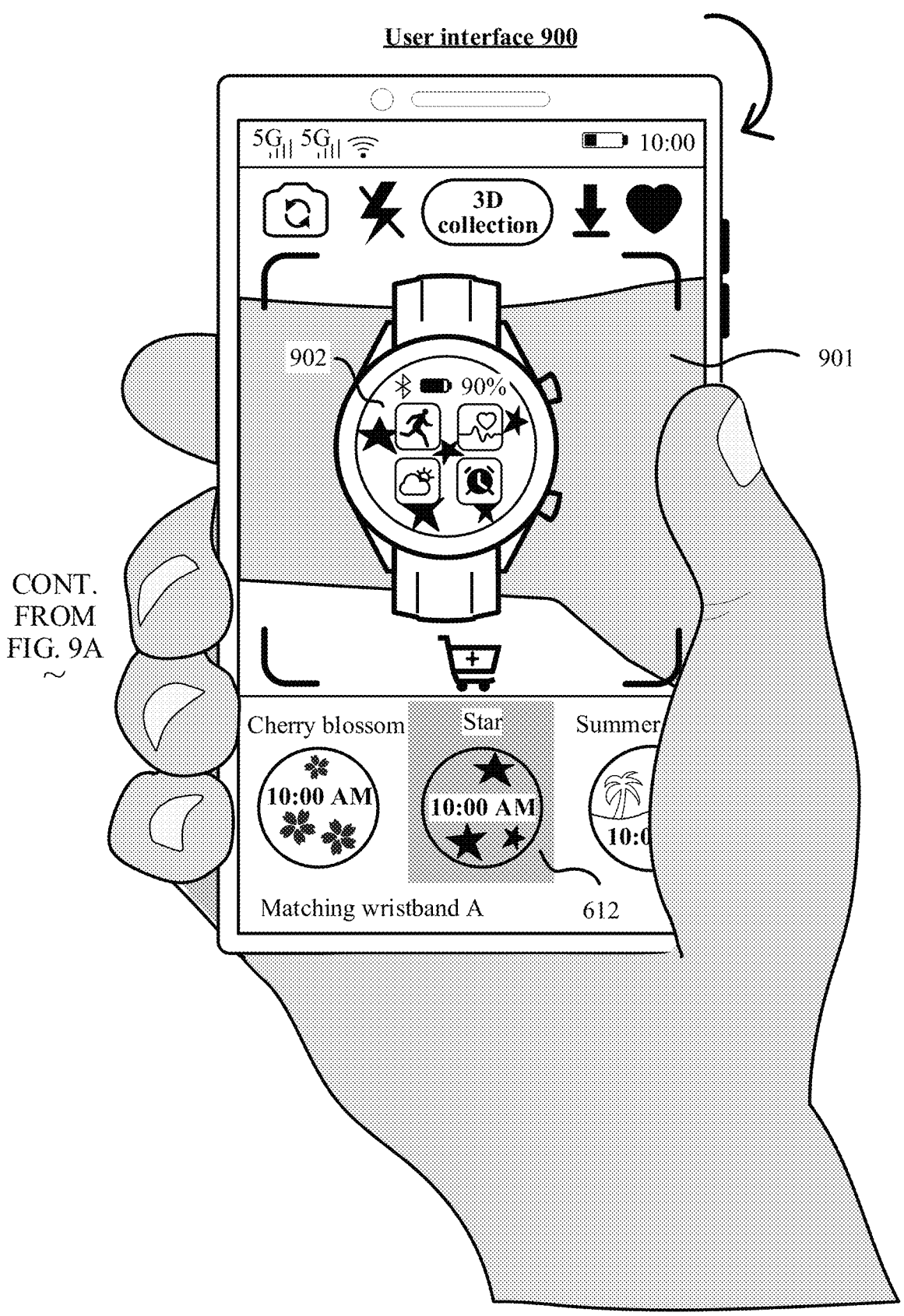

For example, as shown in FIG. 9A and FIG. 9B, the previewed theme watch face is the star watch face, and the star watch face main interface 603 is displayed in the user interface 600. The main interface may include time, date information, a star image wallpaper, and the like. When the mobile phone detects a flick-down touch operation performed on the image preview area 602 of the user interface 600, the mobile phone switches to a user interface 900 for display, and an image preview area 901 of the user interface 900 displays an icon interface 902 in the star watch face theme. The icon interface 902 includes a plurality of application icons, such as an exercise application icon, a health application icon, a weather application icon, and an alarm clock application icon that are shown in the user interface 900. The icon interface 902 also includes a star element.

Figure 10A:
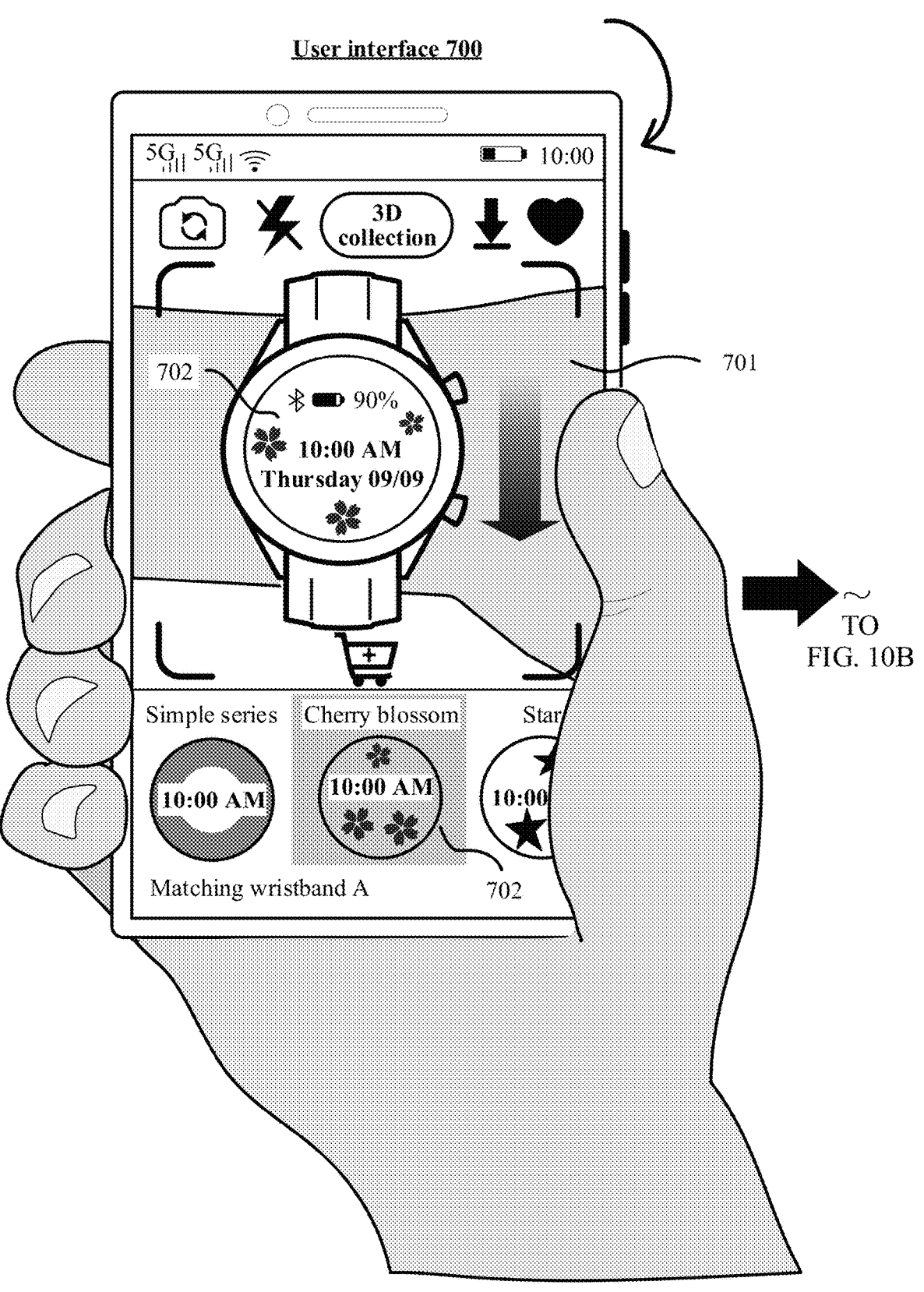
FIG. 10A and FIG. 10B are a schematic diagram of an interaction interface according to an embodiment of this application.
Figures 10A, 10B:
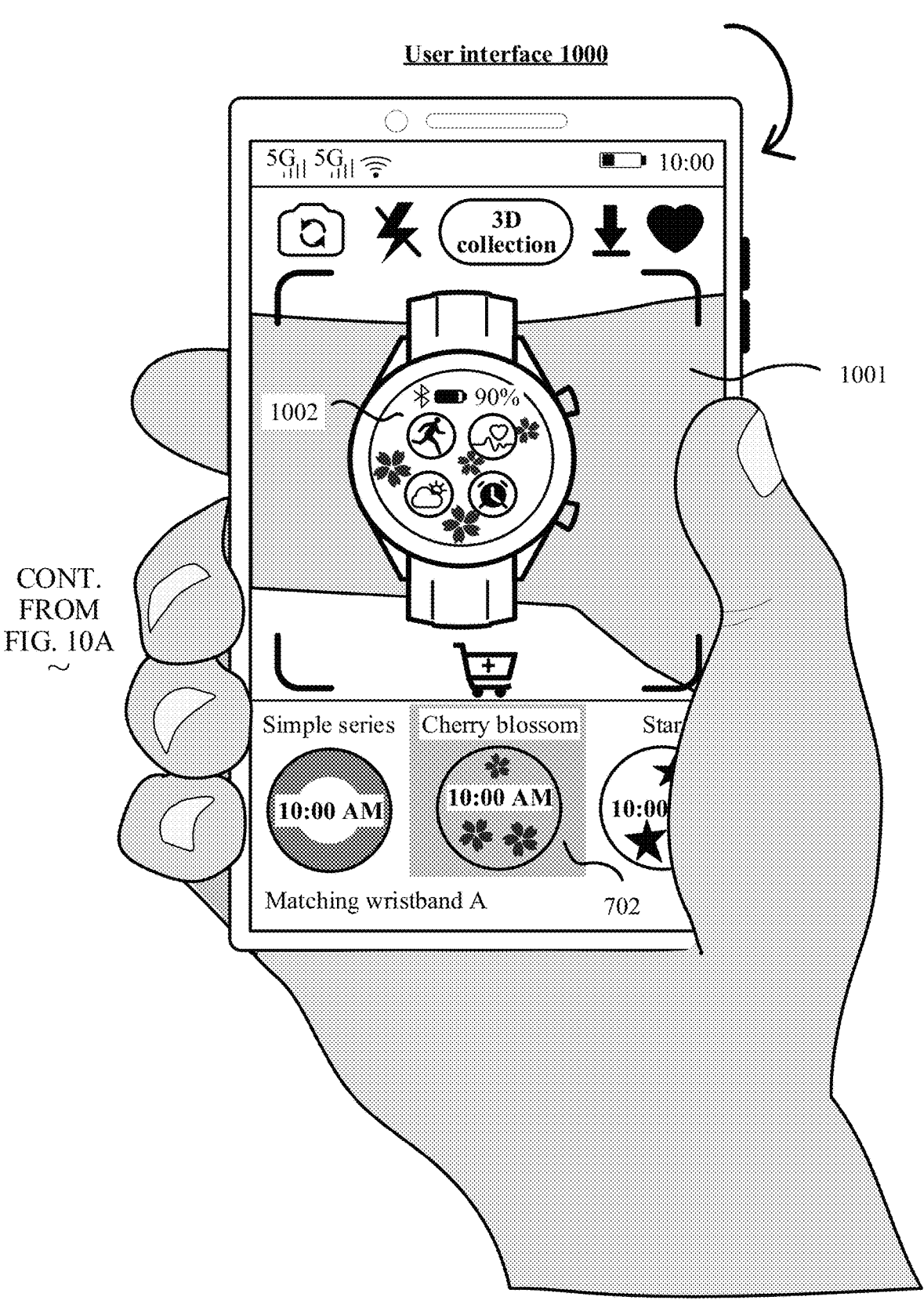

Similarly, as shown in FIG. 10A and FIG. 10B, the previewed theme watch face is the cherry blossom watch face, and the cherry blossom watch face main interface 702 is displayed in the user interface 700. The main interface may include time, date information, a cherry blossom image wallpaper, and the like. When the mobile phone detects a flick-down touch operation performed on the image preview area 701 of the user interface 700, the mobile phone switches to a user interface 1000 for display, and an image preview area 1001 of the user interface 1000 displays an icon interface 1002 in the cherry blossom watch face theme. The icon interface 1002 also includes a cherry blossom element, and the icon interface 1002 also includes a plurality of application icons, which are of the same types as the application icons of the icon interface 902. Because watch face themes are different, appearances of wallpapers or application icons in icon interfaces may also be different. For example, the application icon shown in the icon interface 902 is square, and the wallpaper includes a star pattern; and the application icon shown in the icon interface 1002 is circular, and the wallpaper includes a cherry blossom pattern.

In this embodiment of this application, a flick direction of the flick operation may not be limited to flick-down or flick-up. In a possible implementation, the flick operation may alternatively be flick-left, flick-right, or the like. It should be noted that the operations of switching between different functional interfaces of the theme watch face described in FIG. 9A and FIG. 9B and FIG. 10A and FIG. 10B are different from the operations of switching between different previewed watch faces shown in FIG. 7A and FIG. 7B and FIG. 8A and FIG. 8B, and may be distinguished. For example, when the operations of switching between different previewed watch faces shown in FIG. 7A and FIG. 7B and FIG. 8A and FIG. 8B are flick-right and flick-left, the operations of switching between different functional interfaces of the theme watch faces shown in FIG. 9A and FIG. 9B and FIG. 10A and FIG. 10B may be flick-down or flick-up.

In this embodiment of this application, the previewed watch face may alternatively be series watch faces, and the series watch faces may include a plurality of theme watch faces whose styles are similar or alike. For example, series watch faces may include seven watch faces with similar styles. In a week, one of the series watch faces is displayed every day, and a watch face displayed every day in the week is different.

For example, as shown in FIG. 11A-1 and FIG. 11A-2, selection of a simple series watch face option 1104 is displayed in a watch face style selection area of a user interface 1100. The simple series watch face option 1104 may include seven different watch faces with similar styles, corresponding to seven days in a week, and one of the watch faces in the series may be displayed every day in the week.

The user interface 1100 further displays a date selection bar 1103. The date selection bar 1103 may be used to select a date, including seven date options from Monday to Sunday. When detecting an operation of selecting a date in the date selection bar 1103, the mobile phone may display a watch face pattern corresponding to the selected date in the series watch faces. For example, as shown in FIG. 11A-1 and FIG. 11A-2, a date selected in the date selection bar 1103 is Thursday, and a simple series watch face image 1102 corresponding to Thursday is displayed in an image preview area 1101.

The mobile phone may switch between different watch faces in the series watch faces for display when detecting a switching operation. The switching operation may be an operation of selecting (for example, tapping) a date in the date selection bar 1103, may be a flick-up or flick-down operation performed on the touchscreen, or may be a voice operation, a gesture operation, or the like. The switching operation may trigger the previewed watch face to switch to a watch face of a previous date or a watch face of a next date. A type of the switching operation is not limited in this embodiment.

In some embodiments, the mobile phone may switch the previewed watch face to the watch face of the previous date or the watch face of the next date when detecting the flick-up or flick-down operation on the touchscreen.

For example, as shown in FIG. 11A-1 and FIG. 11A-2, the date selected in the date selection bar 1103 in the user interface 1100 is Thursday, and the simple series watch face image 1102 corresponding to Thursday is displayed in the image preview area 1101. In response to the flick-up operation performed on the image preview area 1101, the mobile phone displays a user interface 1110. In the user interface 1110, a date selected in a date selection bar 1113 is Wednesday, and a simple series watch face image 1112 corresponding to Wednesday is displayed in an image preview area 1111.

Figures 1, 11B:
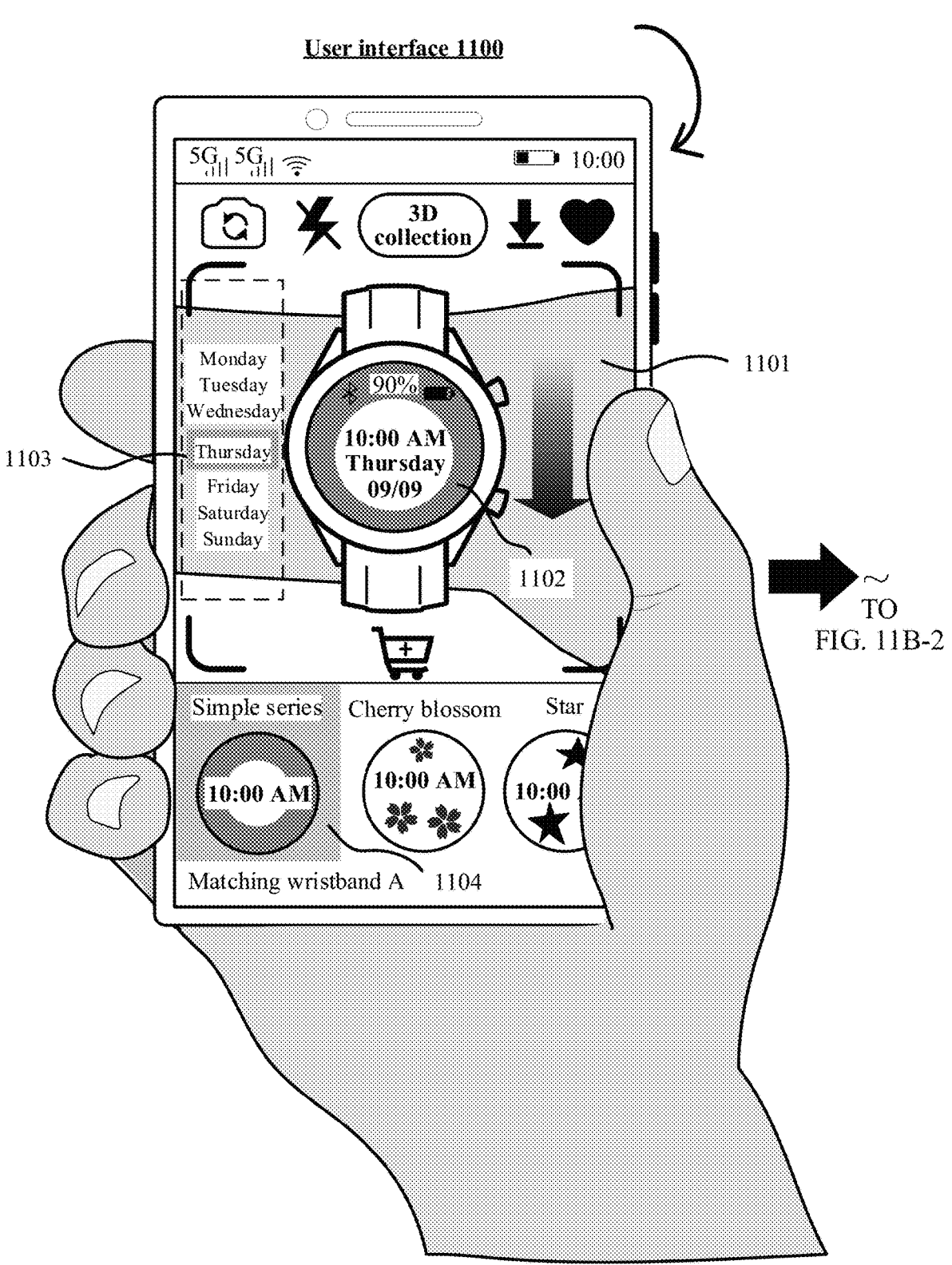
Figures 1, 2, 11B:
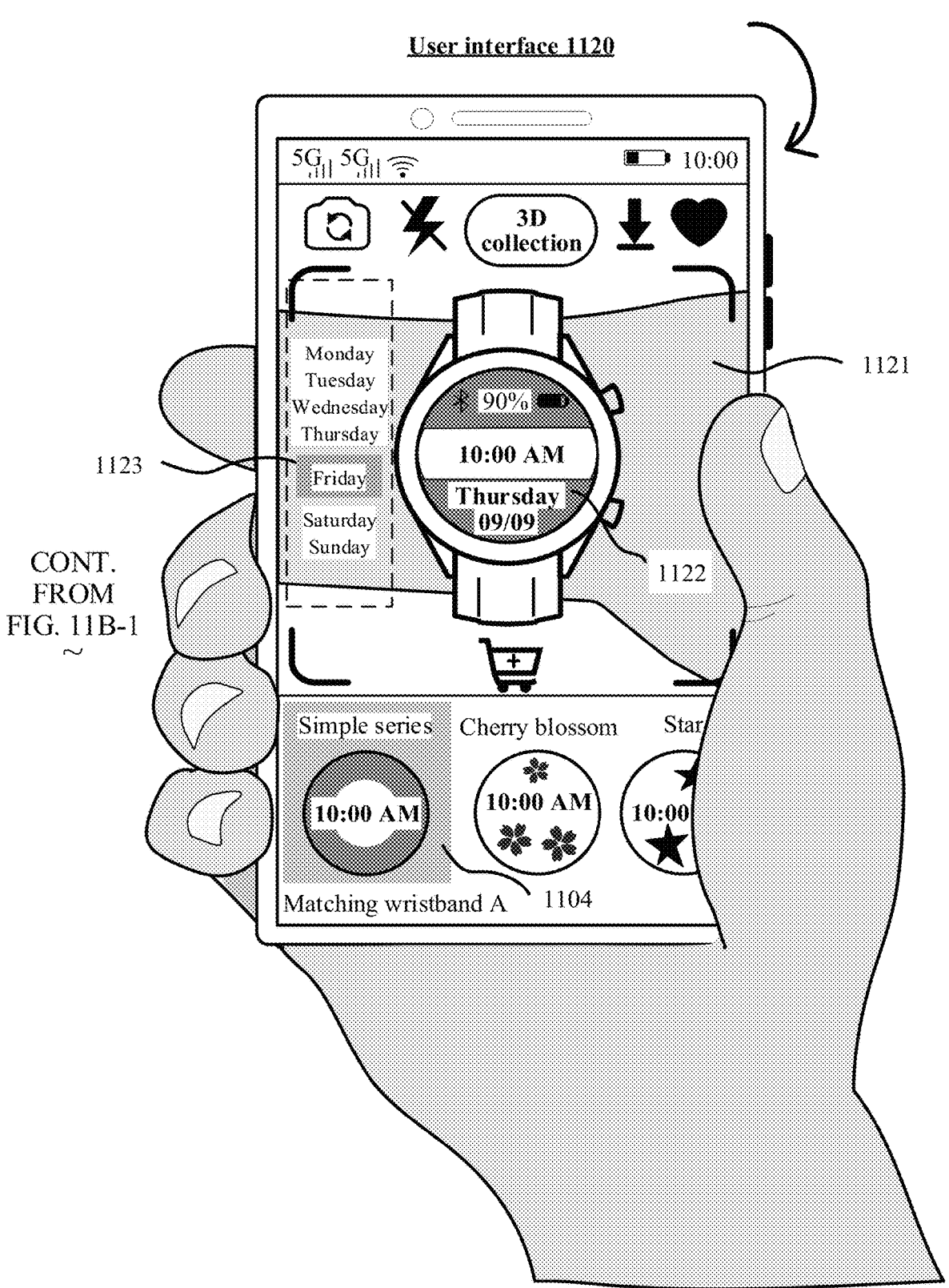
Figures 1, 2, 12A:
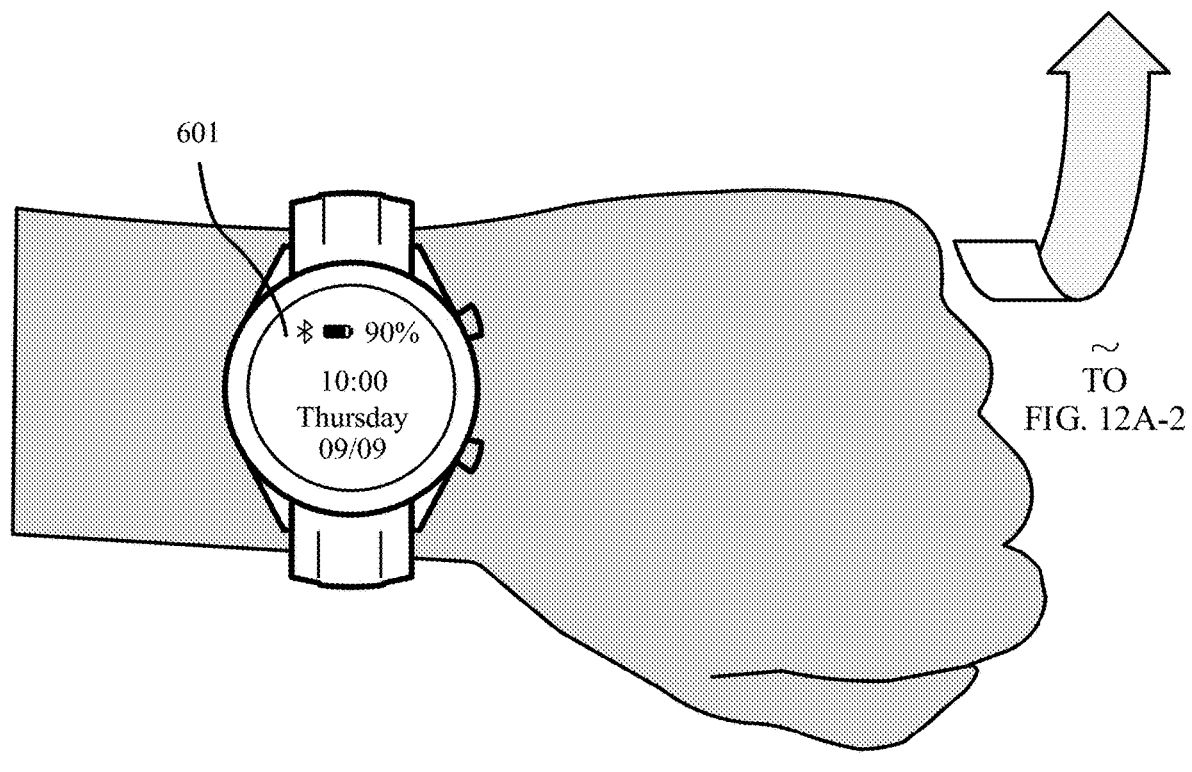
Figures 2, 12A:
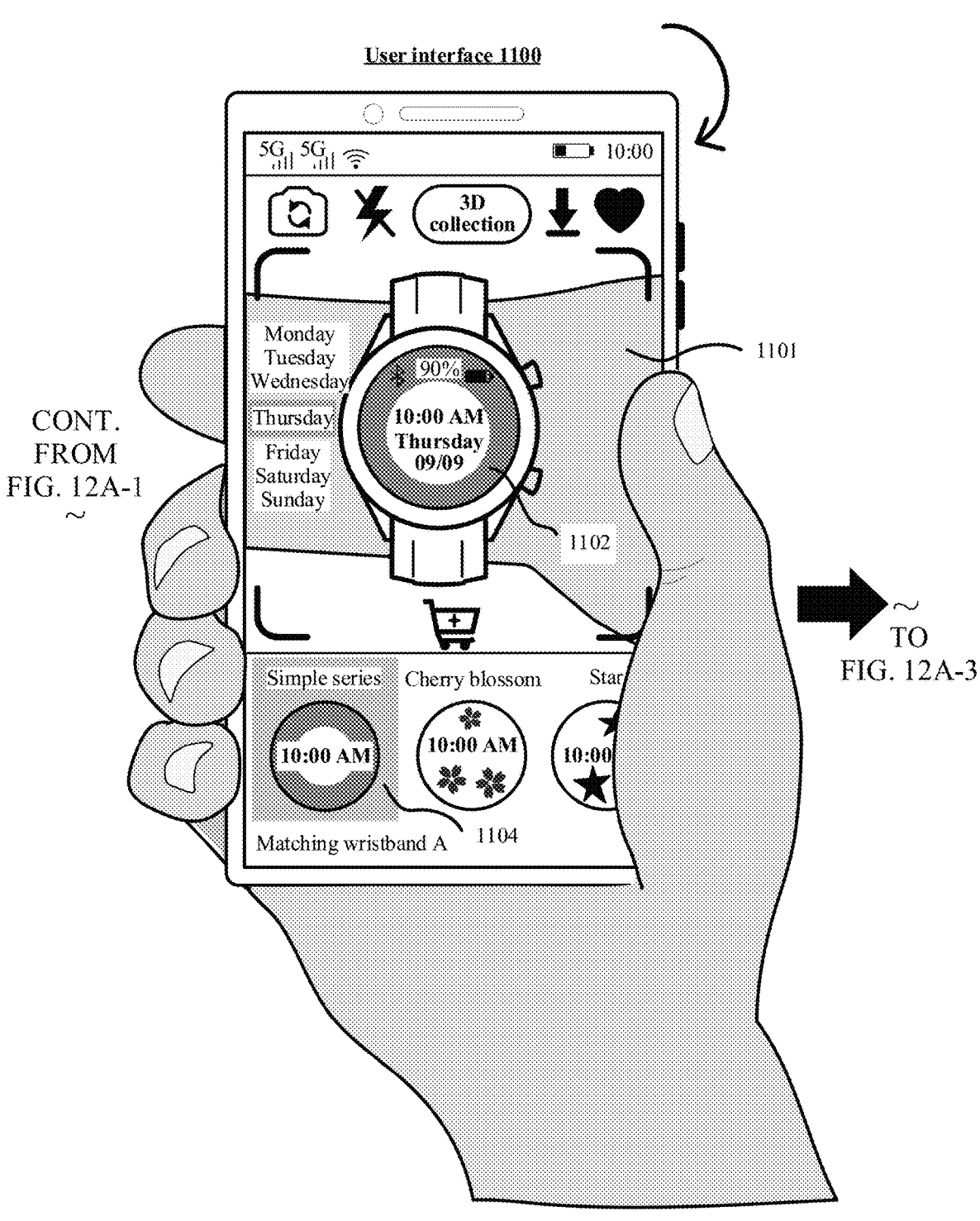
Figures 2, 3, 12A:
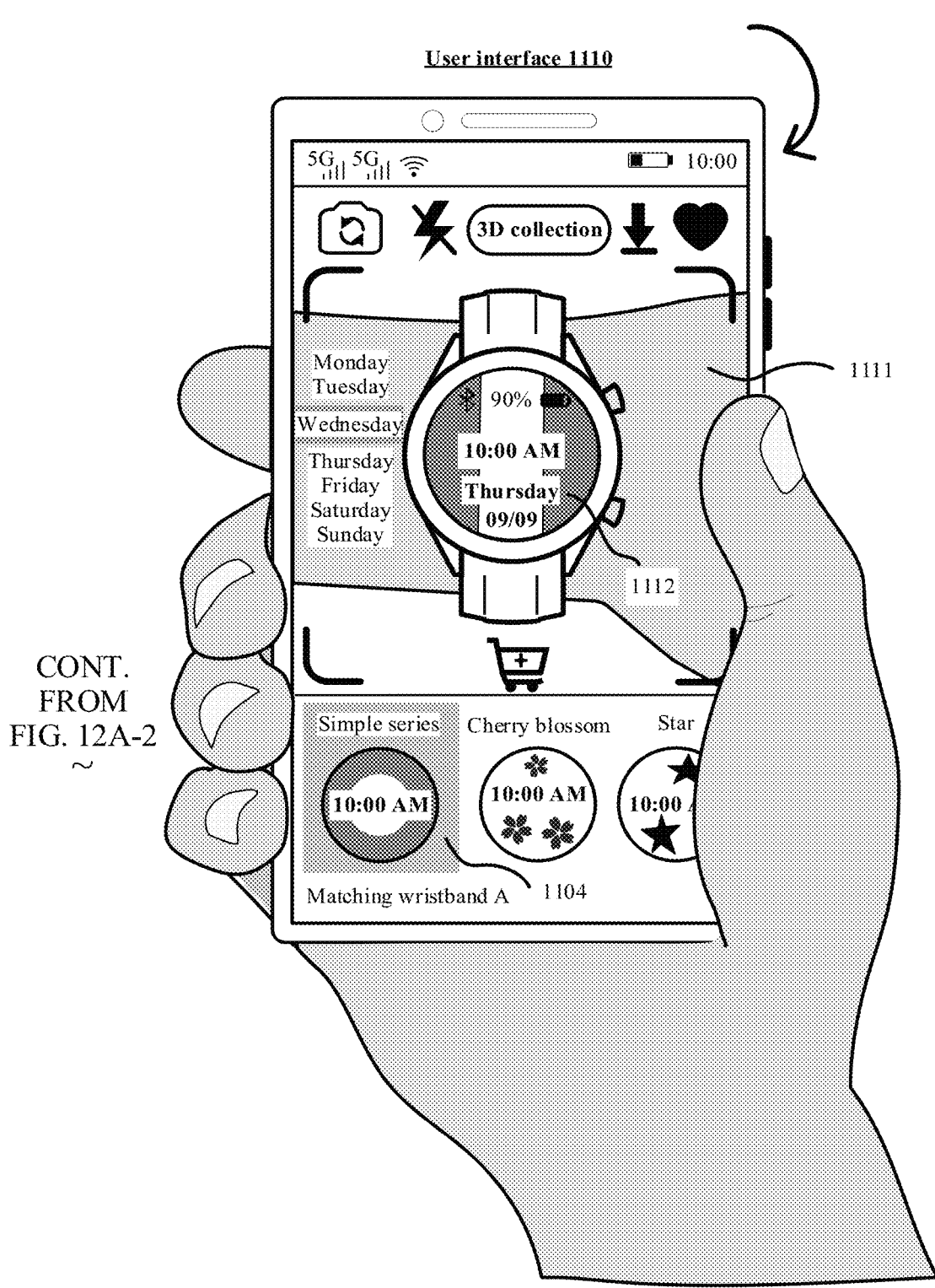
Figures 1, 2, 12B:
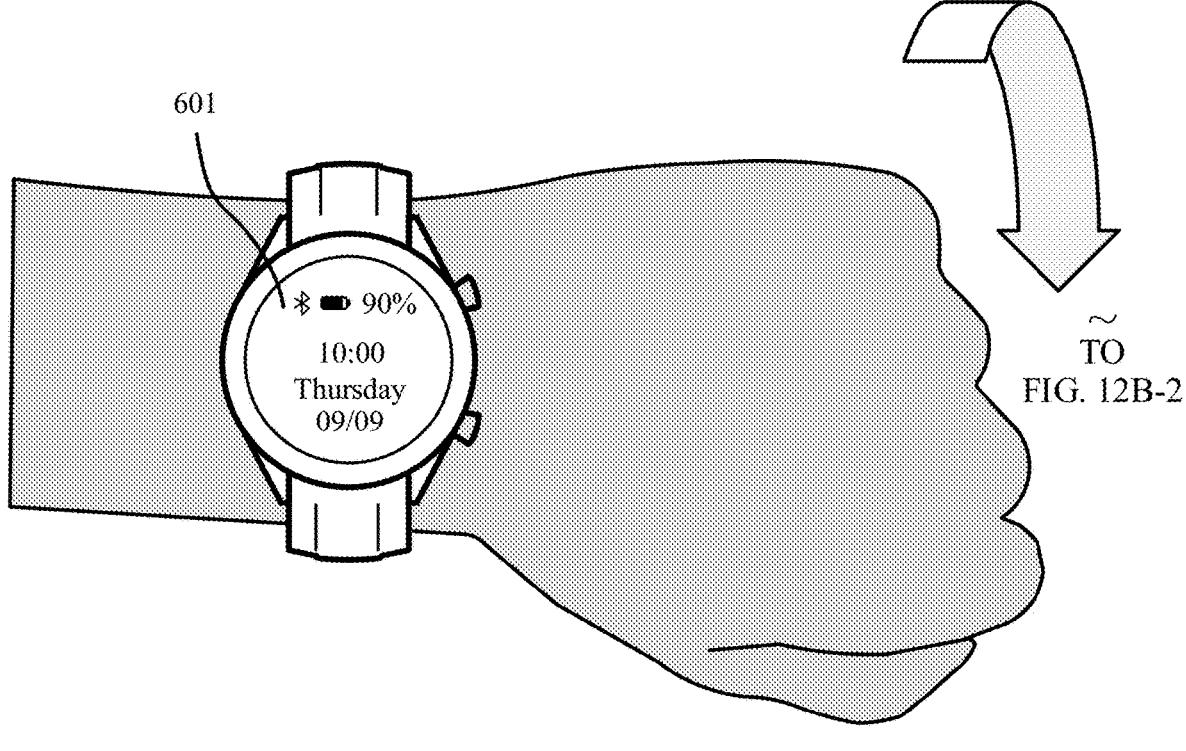
Figures 1, 2, 3, 12B:
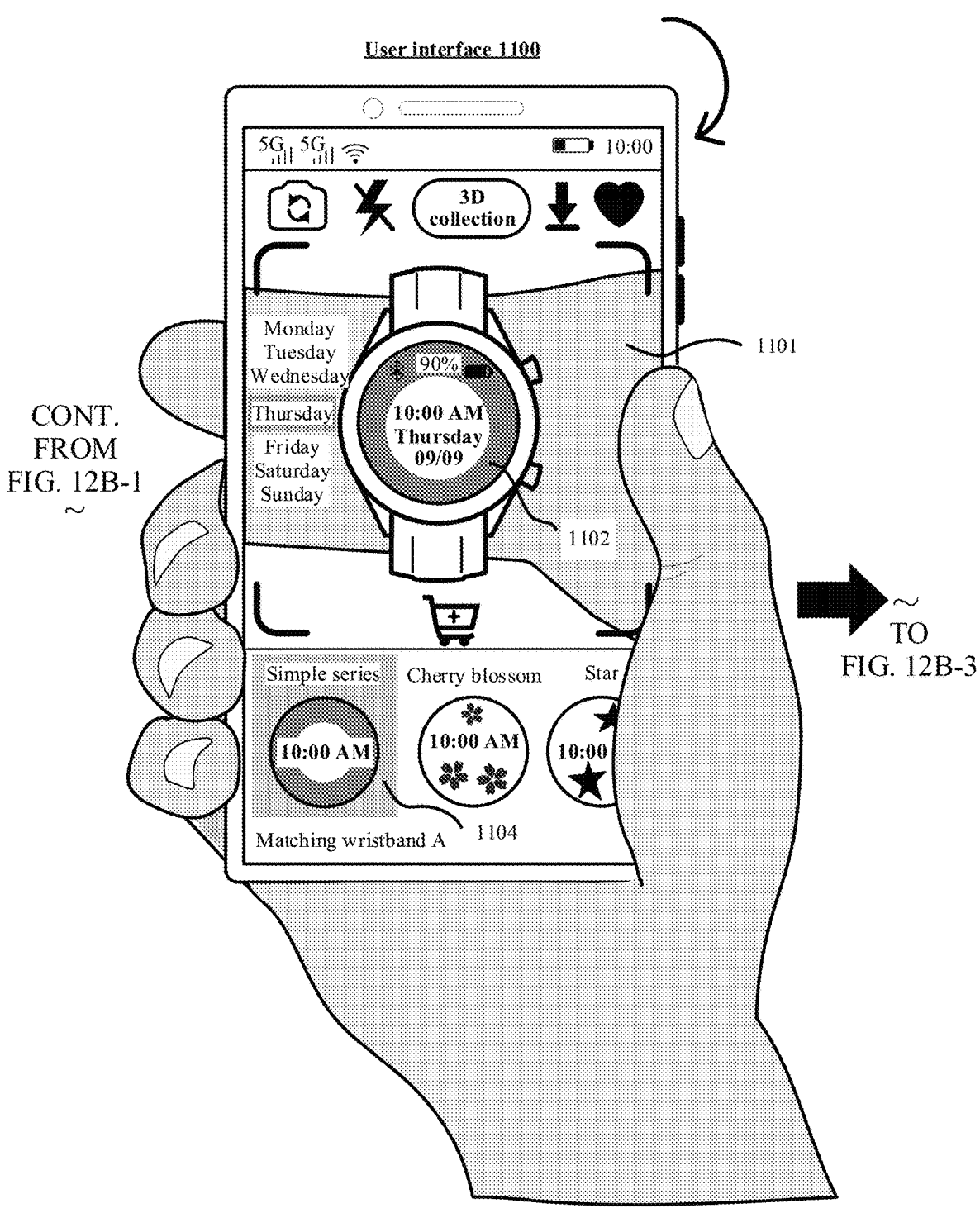
Figures 2, 3, 12B:
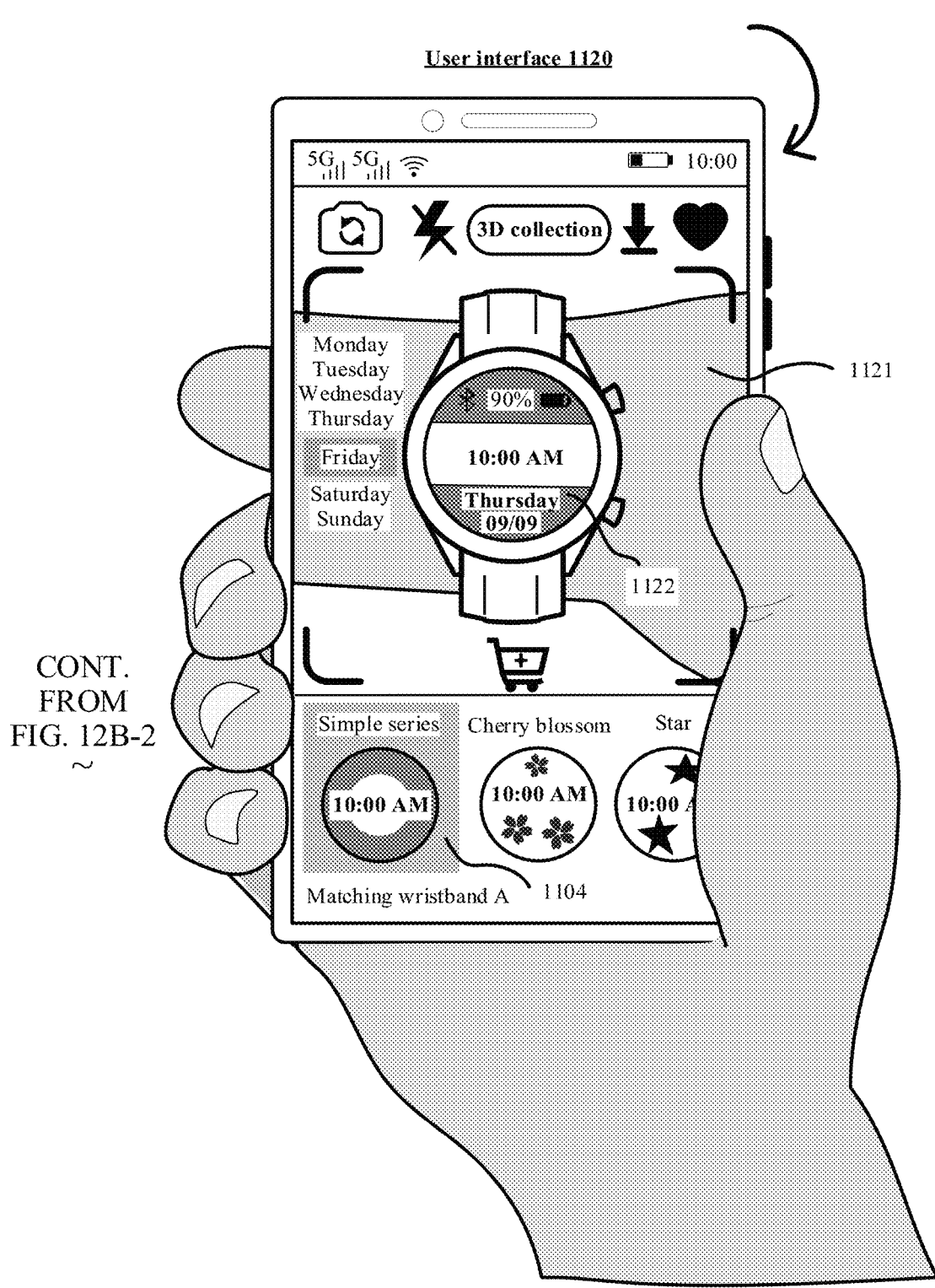
Figures 1, 2, 12C:
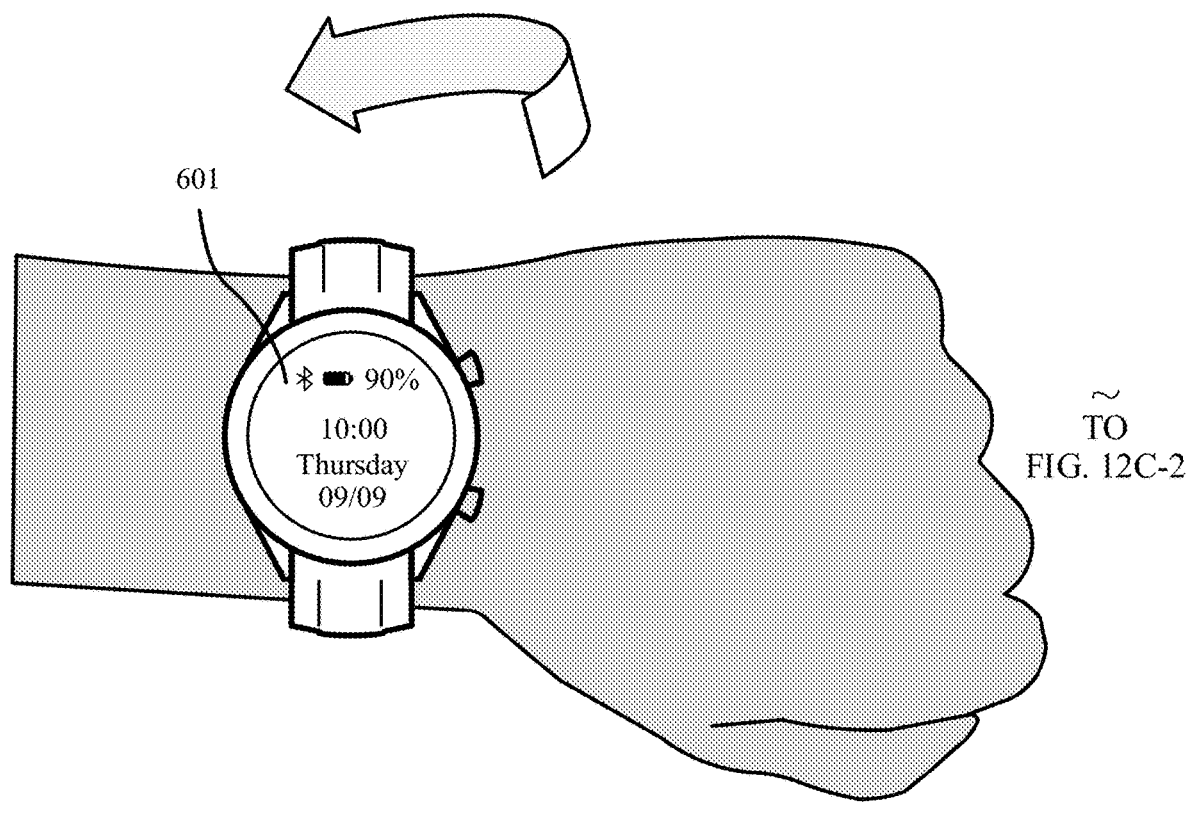
Figures 2, 12C:
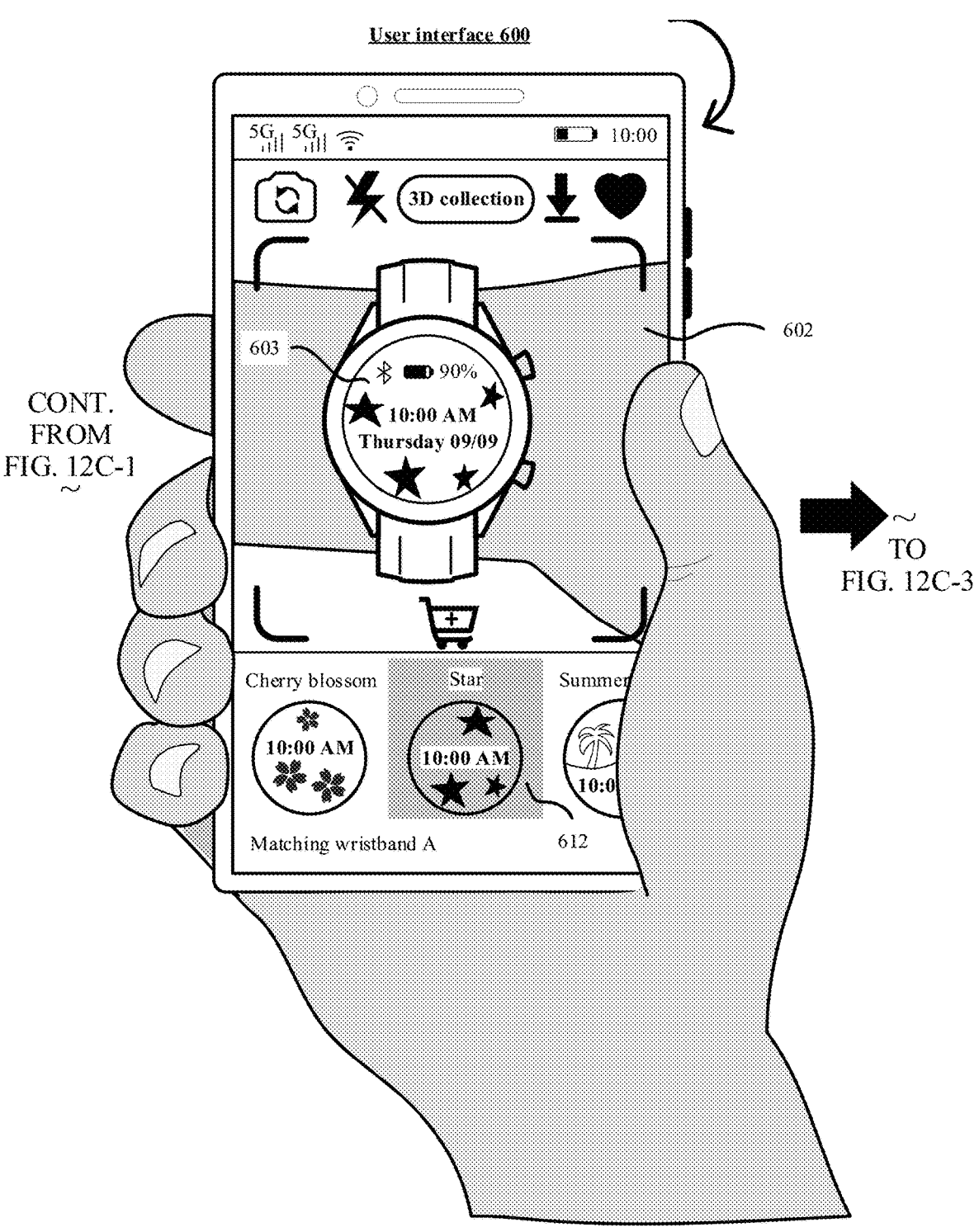
Figures 3, 12C:
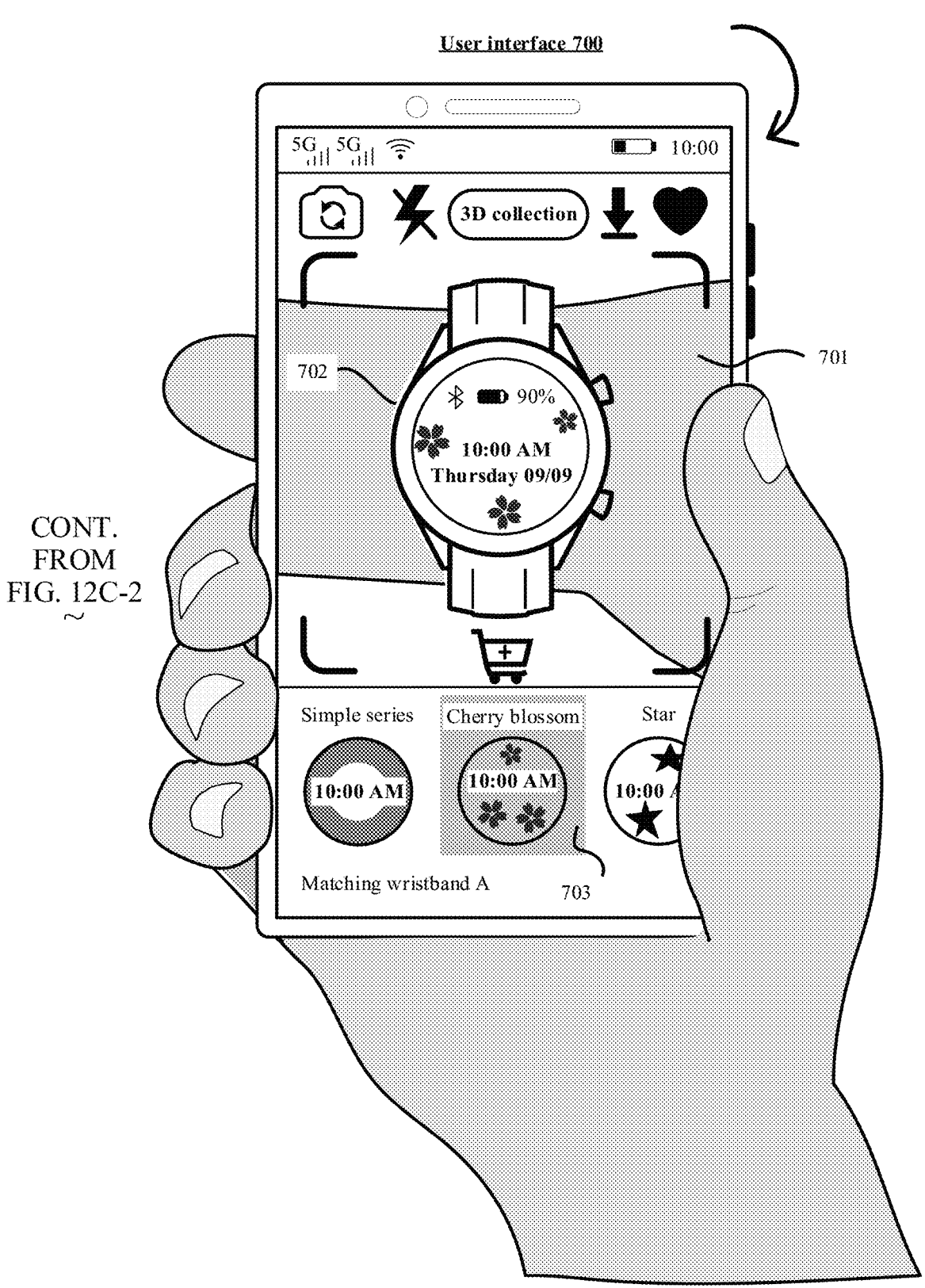
Figures 1, 2, 12D:
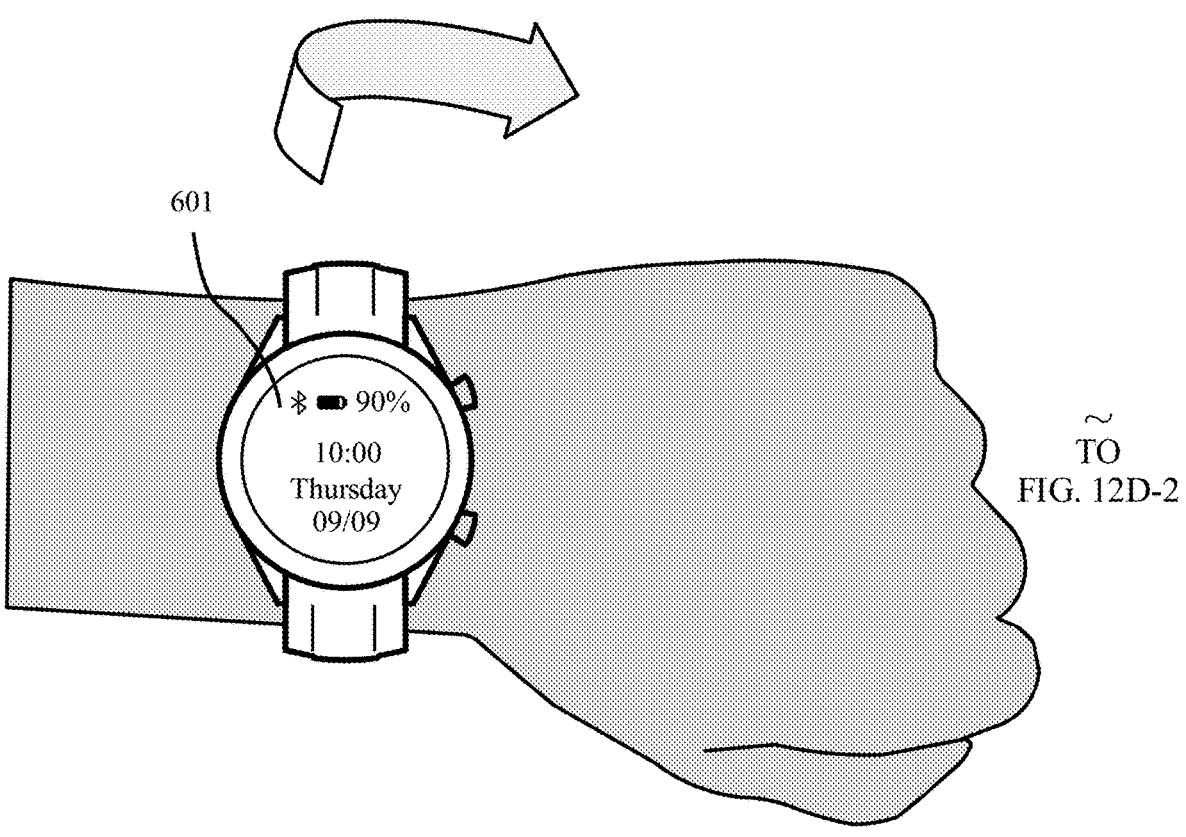
Figures 2, 12D:
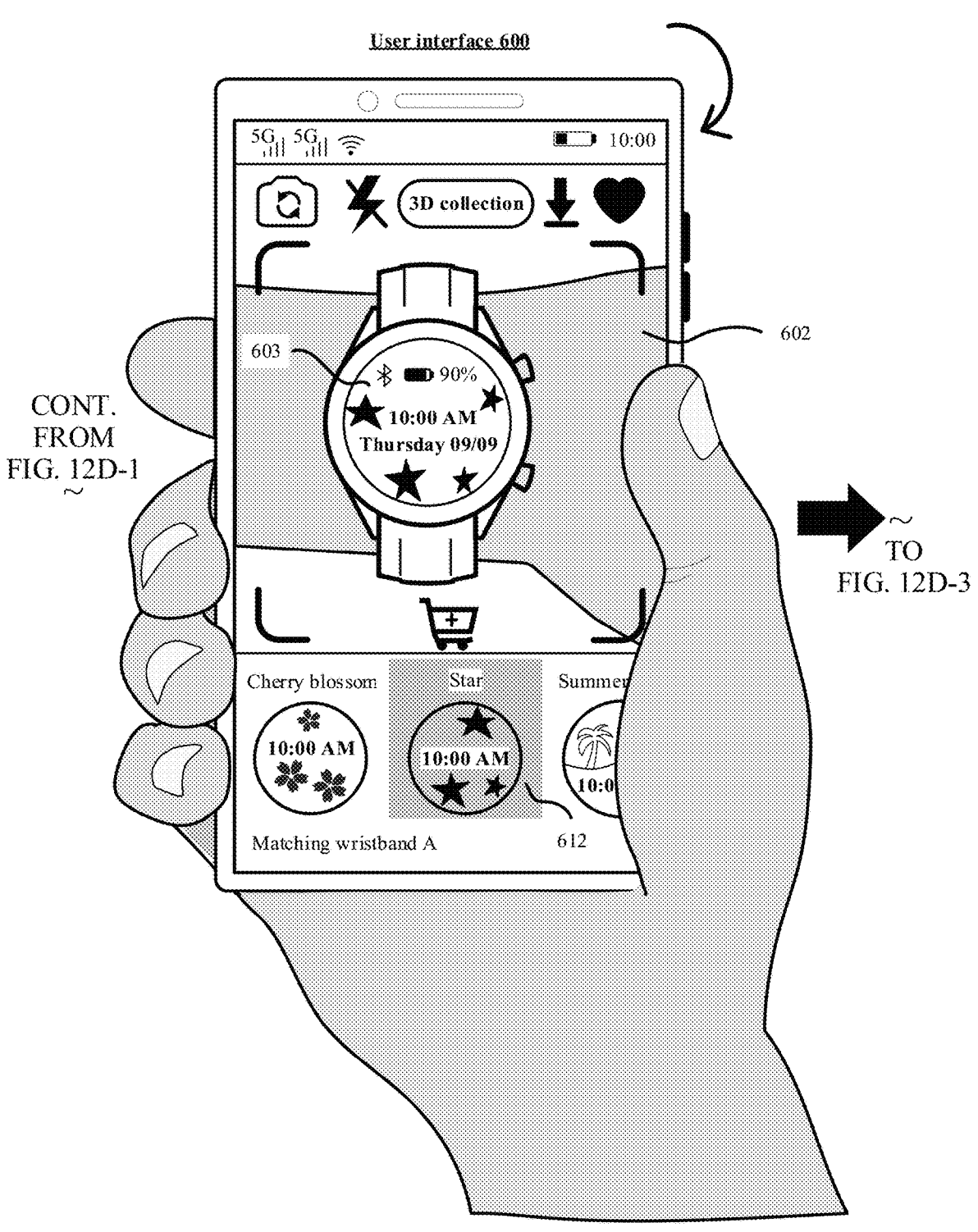
Figures 2, 3, 12D:
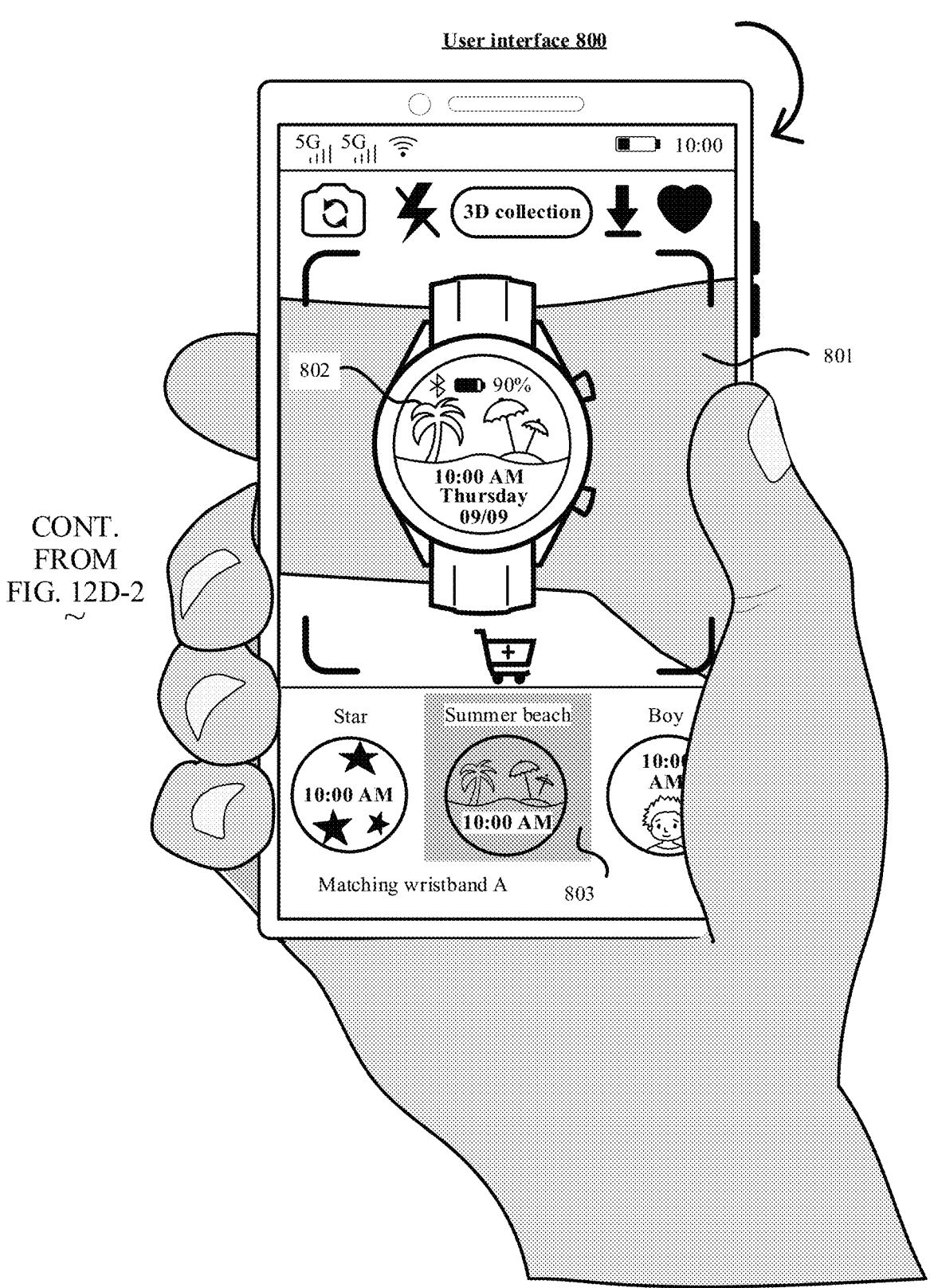

For example, as shown in FIG. 11B-1 and FIG. 11B-2, a date selected in the date selection bar 1103 in the user interface 1100 is Thursday, and the simple series watch face image 1102 corresponding to Thursday is displayed in the image preview area 1101. In response to the flick-down operation performed on the image preview area 1101, the mobile phone displays a user interface 1120. In the user interface 1120, a date selected in a date selection bar 1123 is Friday, and a simple series watch face image 1122 corresponding to Friday is displayed in an image preview area 1121.

In some embodiments, if a currently displayed watch face is a last watch face in the series watch faces, when an operation of indicating to display next one is detected, a first watch face in the series watch faces may be returned. For example, when displaying a simple series watch face corresponding to Sunday, after detecting a flick-down operation of the user, the mobile phone may display a simple series watch face corresponding to Monday. When displaying the simple series watch face corresponding to Monday, after detecting a flick-up operation of the user, the mobile phone may display the simple series watch face corresponding to Sunday, where watch face options of Monday and Sunday may be linked.

In some other embodiments, if a currently displayed watch face is a last watch face in the series watch faces, when an operation of indicating to display next one is detected, a next watch face of the series watch faces may be displayed, where the watch face is a theme watch face different from a theme of the series watch faces. For example, when displaying a simple series watch face corresponding to Sunday, after detecting a flick-down operation of the user, the mobile phone may display a cherry blossom watch face.

In another embodiment, a flick direction of the flick operation may not be limited to flick-down or flick-up. In a possible implementation, the flick operation may alternatively be flick-left, flick-right, another operation, or the like.

In some other embodiments, the foregoing switching instruction such as switching between different previewed watch faces, switching between different functional interfaces of a theme watch face, or switching between different watch faces in series watch faces for display may be that the mobile phone sets automatic switching that is performed at an interval of a first time threshold (for example, two seconds), to save the user operation. For example, in the example of the simple series watch faces, the mobile phone switches to a watch face of a next date for display at an interval of two seconds.

In some embodiments provided in this application, the mobile phone may alternatively determine, by detecting a status of the mobile phone or the smart watch, to switch the previewed watch face. For example, the mobile phone detects a device status of the mobile phone or the smart watch via one or more sensors such as an acceleration sensor, a gravity sensor, and a gyroscope sensor, for example, tilting leftward, tilting rightward, tilting upward, or tilting downward, and may correspondingly switch to a previous or next watch face image for display.

Refer to the examples shown in FIG. 12A-1, FIG. 12A-2, and FIG. 12A-3, FIG. 12B-1, FIG. 12B-2, and FIG. 12B-3, FIG. 12C-1, FIG. 12C-2, and FIG. 12C-3, and FIG. 12D-1, FIG. 12D-2, and FIG. 12D-3. The examples describe that the smart watch may generate a switching instruction by detecting a different wrist action of the user, and then the mobile phone switches a previewed watch face after receiving the switching instruction.

As shown in FIG. 12A-1, FIG. 12A-2, and FIG. 12A-3, the mobile phone displays the user interface 1100, and the simple series watch face image 1102 corresponding to Thursday in the simple series watch faces is displayed in the interface. The smart watch detects an operation of rotating a wrist of the user upward, and sends an instruction 1 to the mobile phone, where the instruction 1 may instruct the mobile phone to switch to a previous watch face for display in the current series watch faces. The mobile phone receives and responds to the instruction 1, to display the user interface 1110, and displays, in the user interface 1110, the simple series watch face image 1112 corresponding to Wednesday in the simple series watch faces.

As shown in FIG. 12B-1, FIG. 12B-2, and FIG. 12B-3, the mobile phone displays the user interface 1100, and the simple series watch face image 1102 corresponding to Thursday in the simple series watch faces is displayed in the interface. The smart watch detects an operation of rotating the wrist of the user downward, and sends an instruction 2 to the mobile phone, where the instruction 2 may instruct the mobile phone to switch to a next watch face in the current series watch faces for display. The mobile phone receives and responds to the instruction 2, to display the user interface 1120, and displays, in the user interface 1120, the simple series watch face image 1122 corresponding to Friday in the simple series watch faces.

As shown in FIG. 12C-1, FIG. 12C-2, and FIG. 12C-3, the mobile phone displays the user interface 600, and a star watch face image 603 is displayed in the interface. The smart watch detects an operation of swinging the wrist of the user leftward, and sends an instruction 3 to the mobile phone, where the instruction 3 may instruct the mobile phone to switch to a previous theme watch face of the current previewed watch face for display. The mobile phone receives and responds to the instruction 3, to display the user interface 700, and displays, in the user interface 700, a previous watch face option of the star watch face option 612, that is, a cherry blossom watch face image 702 corresponding to the cherry blossom watch face option 703.

As shown in FIG. 12D-1, FIG. 12D-2, and FIG. 12D-3, the mobile phone displays the user interface 600, and a star watch face image 603 is displayed in the interface. The smart watch detects an operation of swinging the wrist of the user rightward, and sends an instruction 4 to the mobile phone, where the instruction 4 may instruct the mobile phone to switch to a next theme watch face of the current previewed watch face for display. The mobile phone receives and responds to the instruction 4, to display the user interface 800, and displays, in the user interface 800, a next watch face option of the star watch face option 612, that is, a summer beach watch face image 802 corresponding to the summer beach watch face option 803.

The foregoing descriptions are merely examples, and the wrist action that triggers watch face switching is not limited to the wrist rotation and swing actions described in the examples, and may alternatively be another action. This is not limited in this embodiment.

Certainly, this is not limited to detecting the wrist action. The smart watch may alternatively generate a switching instruction by detecting another operation performed on the smart watch, for example, a flick operation (flick-up, flick-down, flick-left, flick-right, or the like) performed on the touchscreen of the smart watch, a watch crown rotation operation performed on a watch crown in different directions, a tap operation performed on the touchscreen of the smart watch, a voice input operation or a gesture input operation (movement of a hand in a direction such as leftward, rightward, upward, or downward) performed on the smart watch, or the like.

For example, the smart watch may send the switching instruction to the mobile phone in response to the flick operation performed by the user on the display of the smart watch. In this embodiment of this application, a flick direction of the flick operation may be flick-left or flick-right. In a possible implementation, the flick operation may alternatively be flick-down, flick-up, or the like. For example, the smart watch sends, to the mobile phone in response to a flick-right operation of the user on the display of the smart watch, an instruction of "switching to previous one". The mobile phone receives and responds to the instruction, and switches a previewed watch face to a previous watch face.

For example, the smart watch may send the switching instruction to the mobile phone in response to the tap operation of the user on the smart watch. For example, in response to a tap operation performed by the user on the display of the smart watch, the smart watch sends an instruction of "switching to next one" to the smart watch. The mobile phone receives and responds to the instruction, and switches a previewed watch face to a next watch face.

In some embodiments, the smart watch may alternatively send the switching instruction to the mobile phone in response to the voice input of the user on the smart watch. For example, after identifying that the voice input of the user is "previous", the smart watch sends an instruction of "switching to previous one" to the mobile phone. The mobile phone receives and responds to the instruction, and switches a previewed watch face to a previous watch face.

In some other embodiments, when detecting the gesture input operation of the user, for example, movement of the hand of the user in the direction such as leftward, rightward, upward, or downward, the smart watch may further send a watch face switching instruction to the mobile phone.

It should be noted that the foregoing switching operations such as switching between different previewed watch faces, switching between different functional interfaces of the theme watch face, or switching between different watch faces in the series watch faces for display may be the same or may be different. The watch face switching may alternatively be implemented with reference to one or more user operations described above. For example, when the mobile phone detects the flick-up operation performed on the screen of the mobile phone, or the smart watch detects the operation of rotating the wrist of the user upward, switching to the previous watch face may be triggered.

In this embodiment provided in this application, the user may preview the try-on image of the watch face, and may also preview a try-on image of a wristband.

Figure 13A:
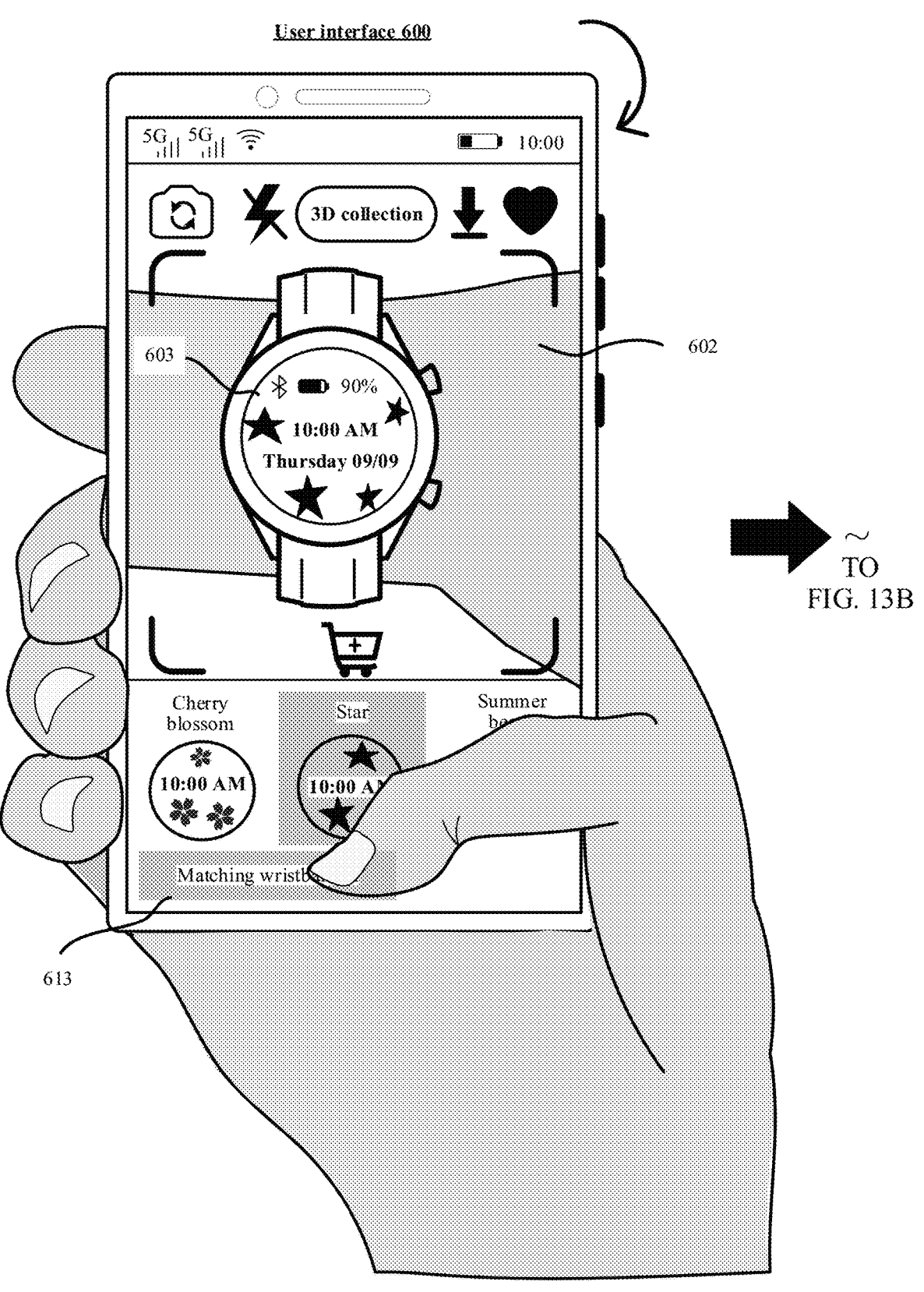
FIG. 13A, FIG. 13B, and FIG. 13C are a schematic diagram of an interaction interface according to an embodiment of this application.
Figures 13A, 13B, 13C:
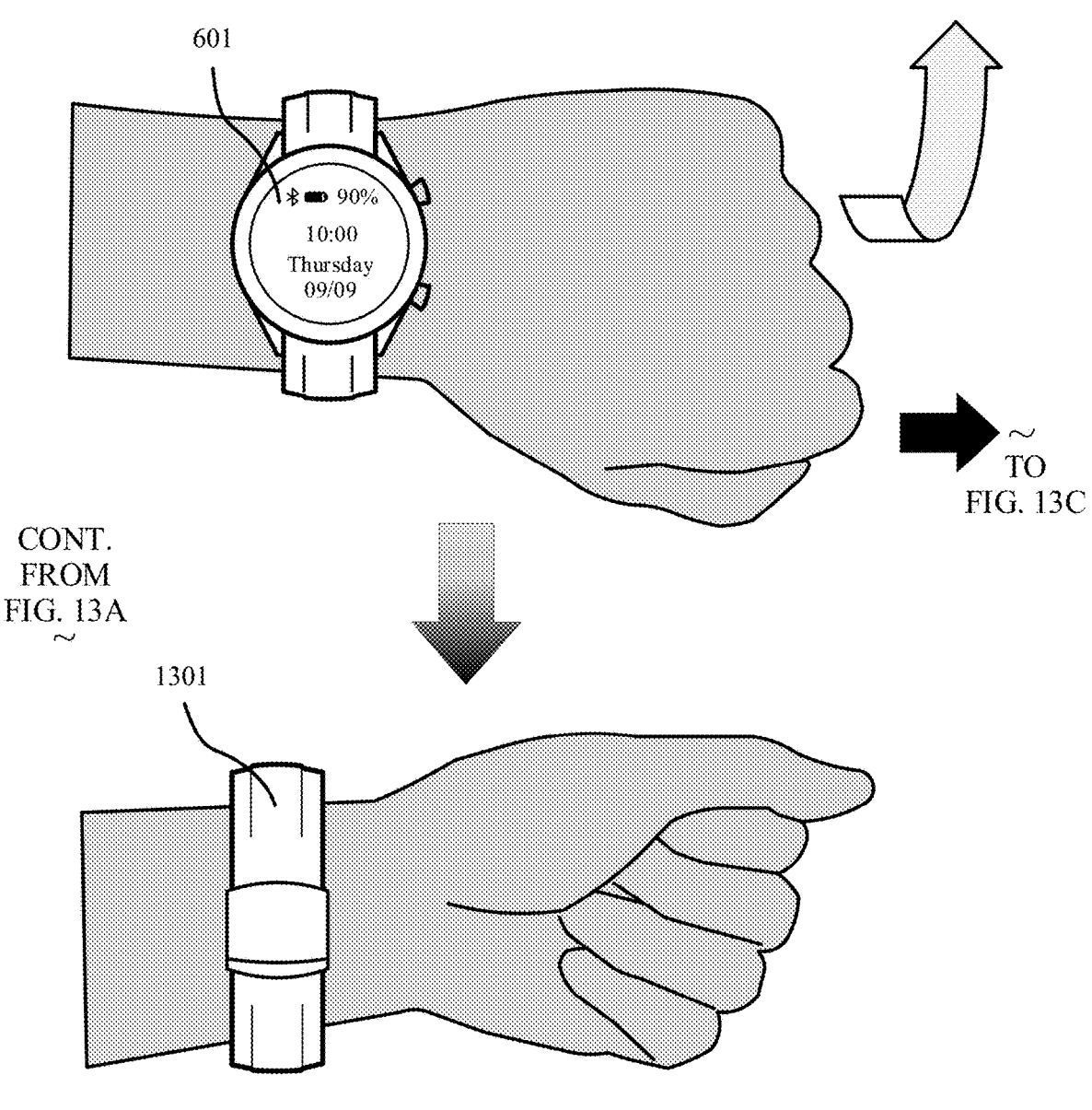
Figure 13C:
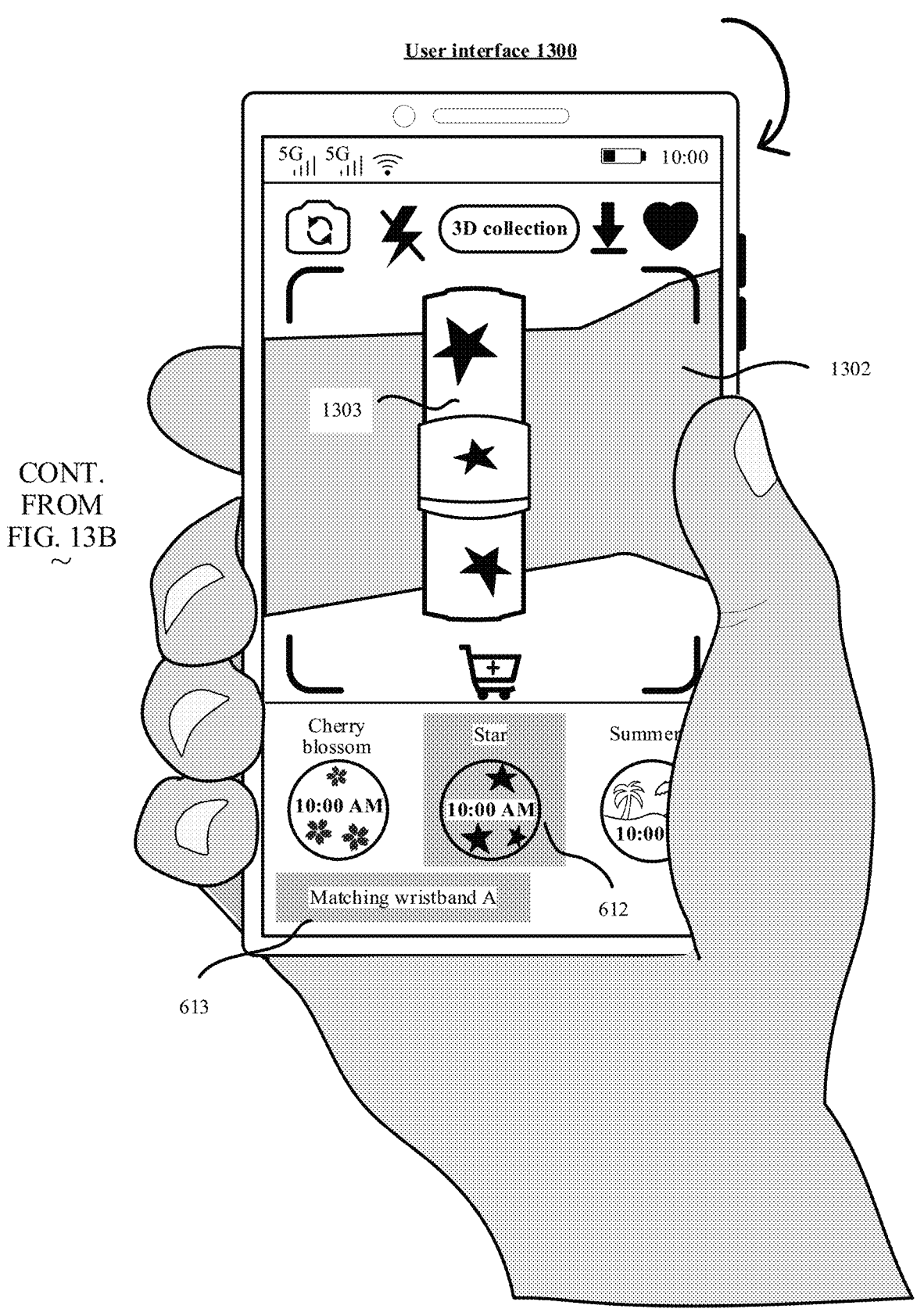

For example, as shown in FIG. 13A, FIG. 13B, and FIG. 13C, the user may select the wristband browsing control 613 in the user interface 600. When the user rotates the wrist to align a smart watch wristband 1301 with the viewfinder frame 610, the mobile phone may display a user interface 1300. The user interface 1300 may be used to display a virtual image in which a wristband that matches the watch face is worn on the wrist of the user.

As shown in FIG. 13A, FIG. 13B, and FIG. 13C, after collecting an image on an inner side of the wrist of the user, the mobile phone identifies a wristband contour of the smart watch, and covers an original wristband image of the smart watch with a virtual wristband image, to obtain an image in which the user tries on the wristband. FIG. 13A, FIG. 13B, and FIG. 13C show that the smart watch wristband 1301 without a pattern is worn on the left hand of the user, and the user interface 1300 displayed in real time on the mobile phone aligned with the smart watch wristband 1301 displays an image in which a star wristband 1303 matching the star watch face is tried on the wrist of the user.

FIG. 14 shows a favorites folder interface, that is, a user interface 1400 that displays one or more watch face options favored by the user, so that the user can compare a plurality of watch faces. In some embodiments, the mobile phone may display the user interface 1400 in response to an operation of tapping the favorites folder control 405. Alternatively, the mobile phone may display the user interface 1400 in response to a touch-and-hold operation performed on the favorites control 608.

For example, as shown in FIG. 14, the user interface 1400 may include one or more watch face options, a favorites folder title bar 1401, a delete control 1404, a share control 1405, a confirm control 1406, and the like.

The delete control 1404 may be used to trigger the mobile phone to delete one or more selected watch face options from the favorites folder.

The share control 1405 may be used to trigger the mobile phone to share one or more selected watch face options.

The confirm control 1406 may be used to trigger the mobile phone to confirm purchase of a selected watch face, or configure the selected watch face.

Each watch face option may display a thumbnail image of the watch face and a selection box. For example, a selection box 1403 is provided in an upper right corner of a summer beach watch face option 1402, and the user may tap the selection box 1403 to indicate selection or cancellation of selection. A tick mark is displayed in the selection box 1403, and may indicate that the summer beach watch face option 1402 is selected. If the selection box is blank, it indicates that the watch face option is not selected.

If the user taps a non-selection box area in a watch face option, a detailed description page of the watch face option may be jumped to and displayed, for example, the user interface 500 shown in FIG. 5.

In some embodiments, the user may not wear the smart watch. The mobile phone captures an image of the wrist part of the user, identifies a contour of the wrist part of the user, synthesizes a virtual watch face image based on the image of the wrist part, covers the wrist of the user with the virtual watch face image, to obtain an image in which the user tries on this watch face, and displays the image in a preview interface. Refer to the embodiments shown in FIG. 15A and FIG. 15B.

The mobile phone may synthesize a virtual watch face or wristband image in real time based on different wrist parts of the user. If the mobile phone identifies that a currently photographed wrist part of the user is a back part of a hand, the watch face image is added to cover the back part of the hand. If the mobile phone identifies that a currently photographed wrist part of the user is an inner part of the wrist, the wristband image is added to cover the inner part of the wrist. When the user rotates the wrist, the virtual smart watch image displayed on the mobile phone also changes accordingly.

Figure 15A:
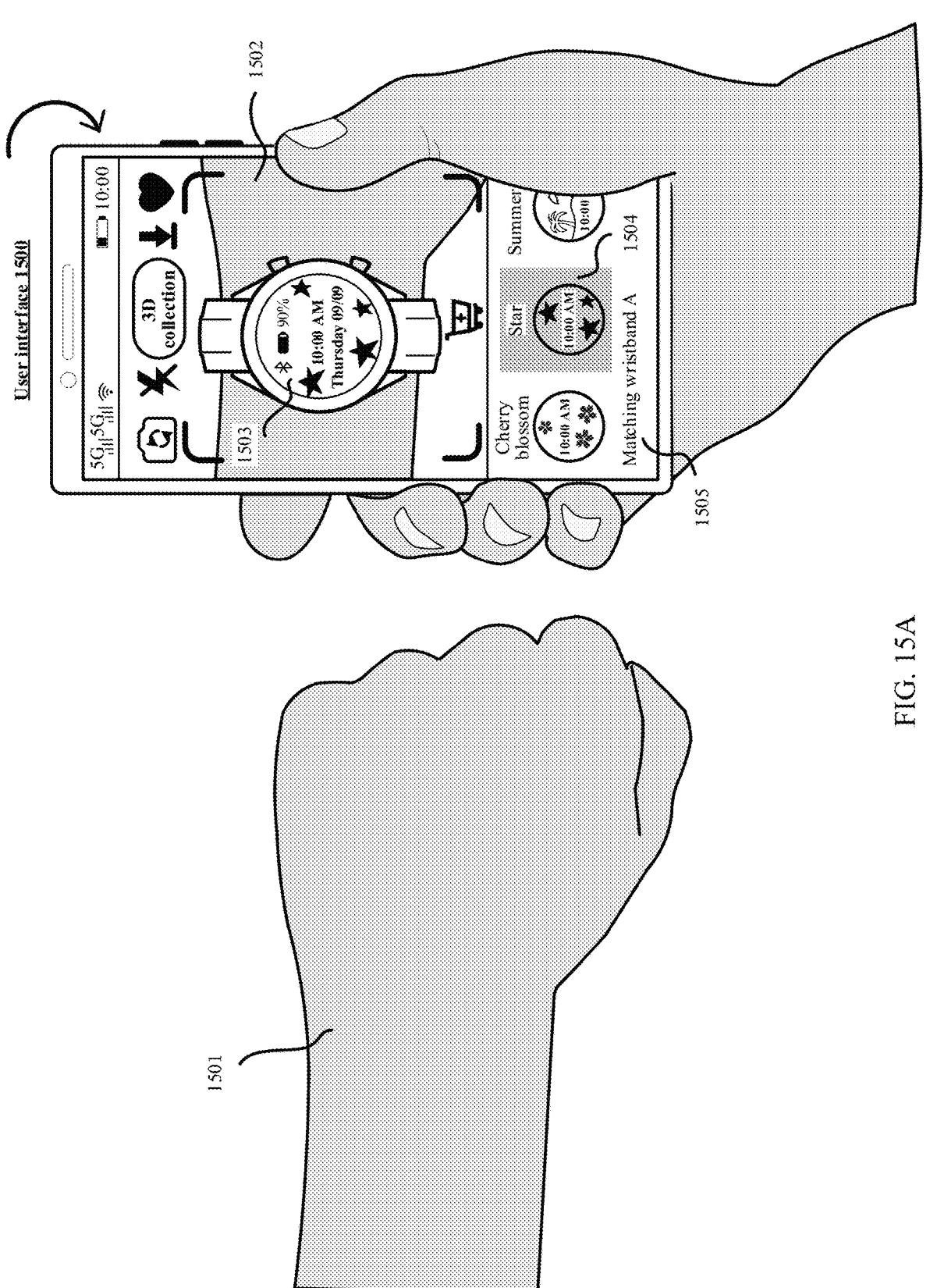
FIG. 15A is a schematic diagram of an interaction interface according to an embodiment of this application.

In FIG. 15A, the user does not wear the smart watch or another accessory on the left hand, and the user holds the mobile phone with the right hand and aligns a camera with a back part 1501 of the left hand of the user, to collect a hand image of the user in real time. When the user selects a star watch face option 1504, the mobile phone may display, in an image preview area 1502 in real time, an image of trying on a star watch face 1503.

Figure 15B:
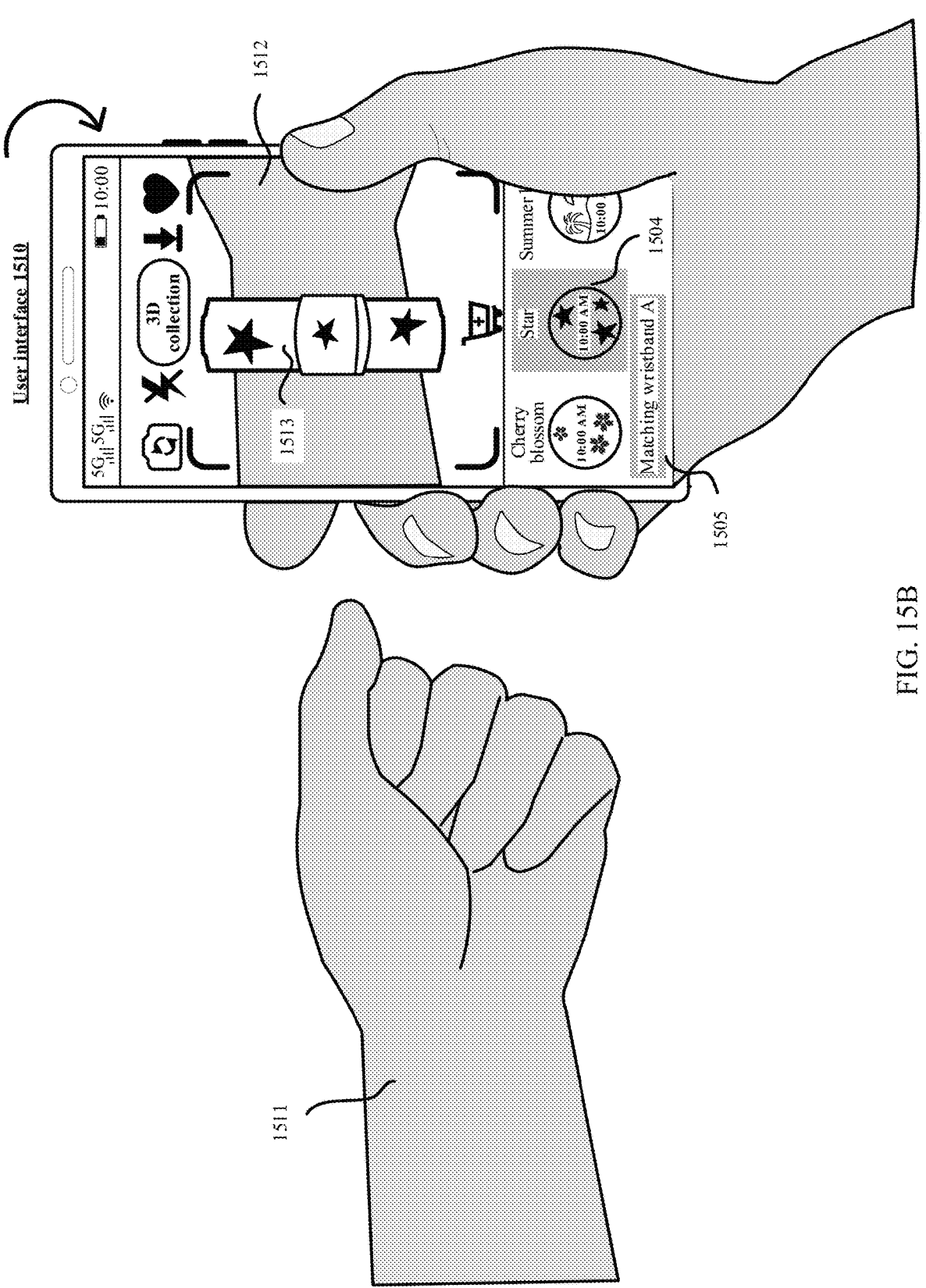
FIG. 15B is a schematic diagram of an interaction interface according to an embodiment of this application.

In FIG. 15B, the user does not wear the smart watch or another accessory on the left hand, and the user holds the mobile phone with the right hand and aligns the camera with an inner part 1511 of the left wrist of the user, to collect a hand image of the user in real time. When the user selects the star watch face option 1504 and a matching wristband option 1505, the mobile phone may display, in an image preview area 1512 in real time, an image of trying on a star wristband 1513.

In some embodiments, the user may further select a style of the smart watch, for example, a circular watch face or a square watch face.

Similarly, the mobile phone may switch a previewed watch face in response to a user operation performed on the mobile phone. The user operation that triggers watch face switching may include any one or more of the following: a flick operation, a tap operation, a voice input operation, a gesture operation, and the like. The user operation that triggers watch face switching is not limited in this embodiment. For specific descriptions of the previewed watch face switching function, refer to the embodiments in FIG. 6A and FIG. 6B to FIG. 14. Details are not described herein again.

This application further provides a solution of previewing images of different watch faces and wristbands based on a three-dimensional model of a hand. The mobile phone may first collect a 3D image of a wrist part of the user (which may include the smart watch, or may not include the smart watch), that is, hand images at a plurality of angles, construct a three-dimensional model of the wrist part of the user based on the 3D image, and then synthesize, by using an image processing technology, an image of trying on the watch face or the wristband and the three-dimensional model of the wrist of the user, to generate a virtual image in which the smart watch with the selected virtual watch face is worn on the hand of the user.

In this solution, in an entire try-on process, the wrist of the user does not need to be in a camera collection range of the mobile phone, which frees one hand of the user, the entire try-on process is easier and more convenient, and it is more convenient for the user operation. For specific descriptions, refer to the embodiments shown in FIG. 16 to FIG. 22A and FIG. 22B.

Figure 16:
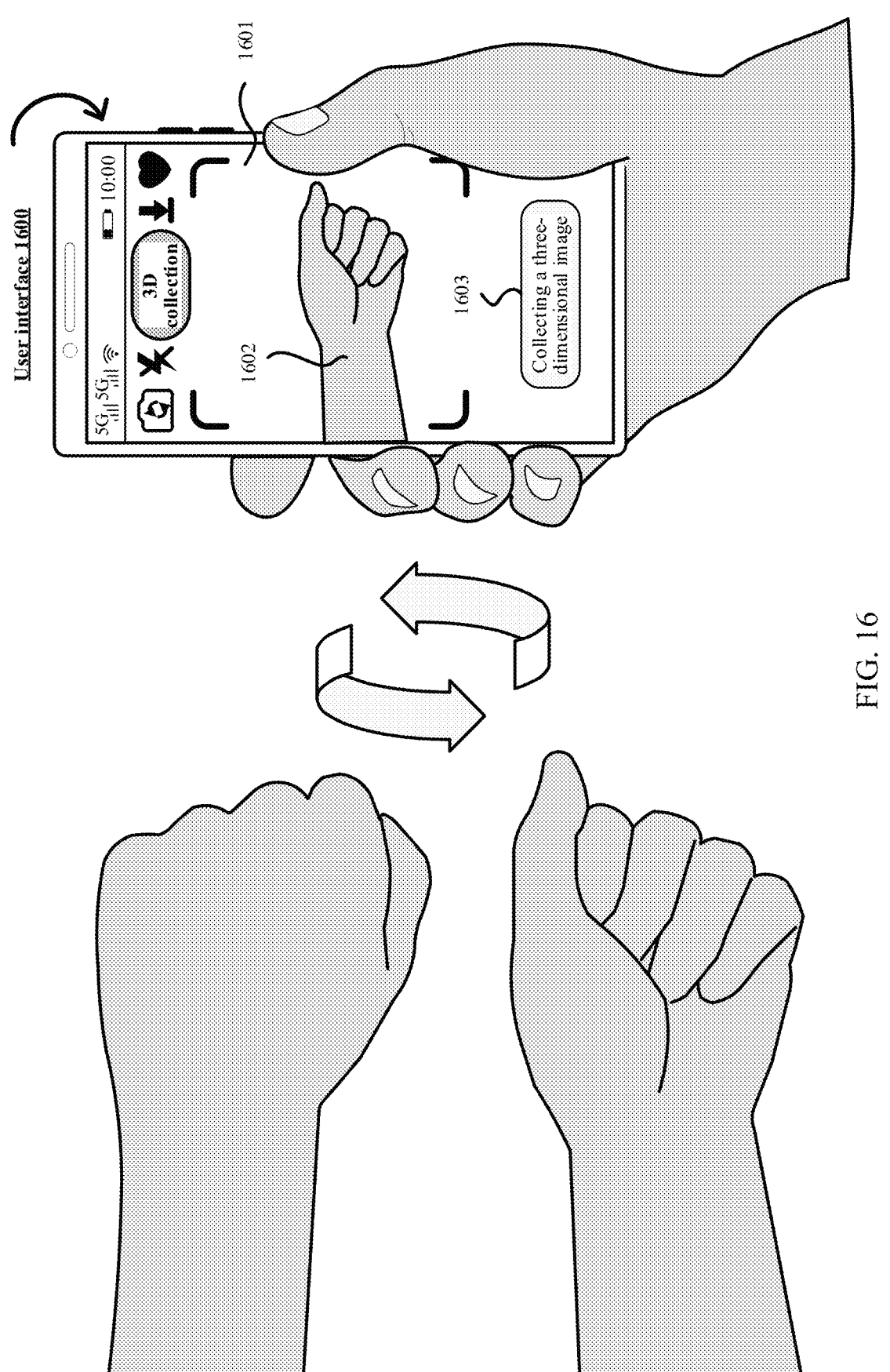
FIG. 16 is a schematic diagram of an interaction interface according to an embodiment of this application.

In some embodiments, if the user selects a 3D collection control 606, the mobile phone may display a user interface 1600 shown in FIG. 16. The user interface 1600 is an interface for collecting a three-dimensional image of a body part of the user.

For example, the user interface 1600 may include an image preview area 1601, a collection control 1603, and the like. The image preview area 1601 may be used to display, in real time, an image collected by the mobile phone. The collection control 1603 may be used to trigger the mobile phone to start to collect a 3D image of the wrist part of the user. As shown in FIG. 16, the user may rotate the wrist part in front of the camera of the mobile phone, to ensure that the 3D image collected by the mobile phone is complete and clear. A hand image 1602 of the user is displayed in the image preview area 1601 in real time. In a collection process, the collection control 1603 may display prompt information "collecting a three-dimensional image".

Certainly, this solution is also applicable to preview of another device, another product, and another user part. For example, when jewelry such as a necklace is previewed, the mobile phone may also collect a 3D image of the neck of the user and synthesize a virtual image of the necklace. For example, when a computer desktop is previewed, the mobile phone may also collect a 3D image of a computer and synthesize a virtual image of the desktop.

Figure 17:
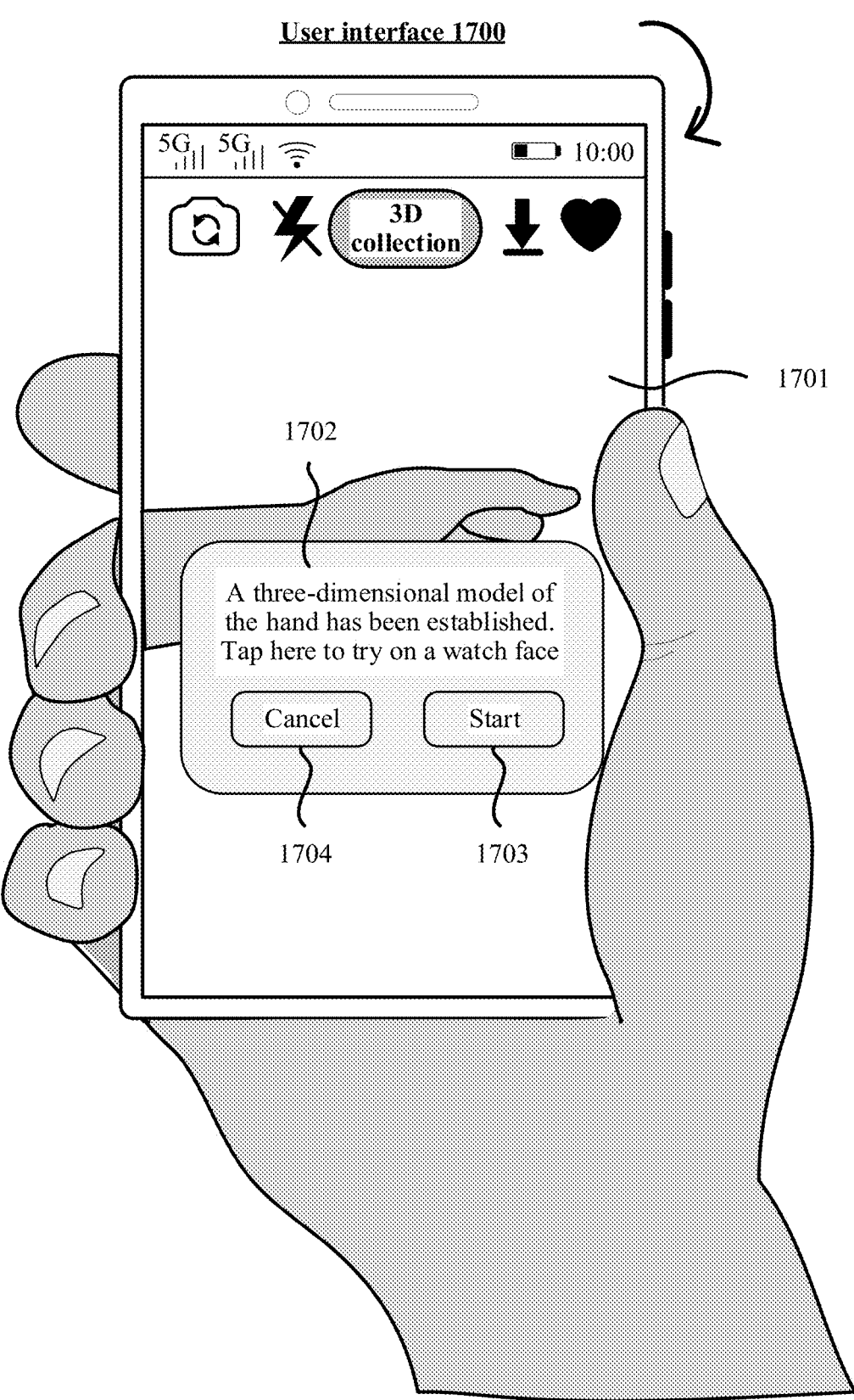
FIG. 17 is a schematic diagram of a user interface according to an embodiment of this application.

After the 3D image of the wrist part of the user is collected, the mobile phone may establish the three-dimensional model, and then the mobile phone may display a user interface 1700 shown in FIG. 17. The user interface 1700 may be used to inform the user that the three-dimensional model has been established.

As shown in FIG. 17, the user interface 1700 may include an image preview area 1701 and a prompt box 1702. The image preview area 1701 may be used to display the three-dimensional model of the wrist part, and the three-dimensional model is established based on the 3D image collected by the mobile phone. The prompt box 1702 may be used to inform the user that the 3D model has been established, and inform the user that a next operation may be started.

For example, as shown in FIG. 17, a prompt text, a start control 1703, a cancel control 1704, and the like are displayed in the prompt box 1702 of the user interface 1700. The prompt text is used to inform the user that the 3D model of the hand has been established, and inform the user that the user may start to try on a watch face. The mobile phone may return to the user interface 1600 for display in response to an operation performed on the cancel control 1704. In this way, when the user is not satisfied with the currently collected 3D image, the mobile phone may return to the user interface 1600 to re-collect the 3D image of the wrist part. Alternatively, the mobile phone may display a user interface 1800 in response to an operation performed on the start control 1703, and the user interface 1800 may be used to select a try-on watch style.

Figure 18:
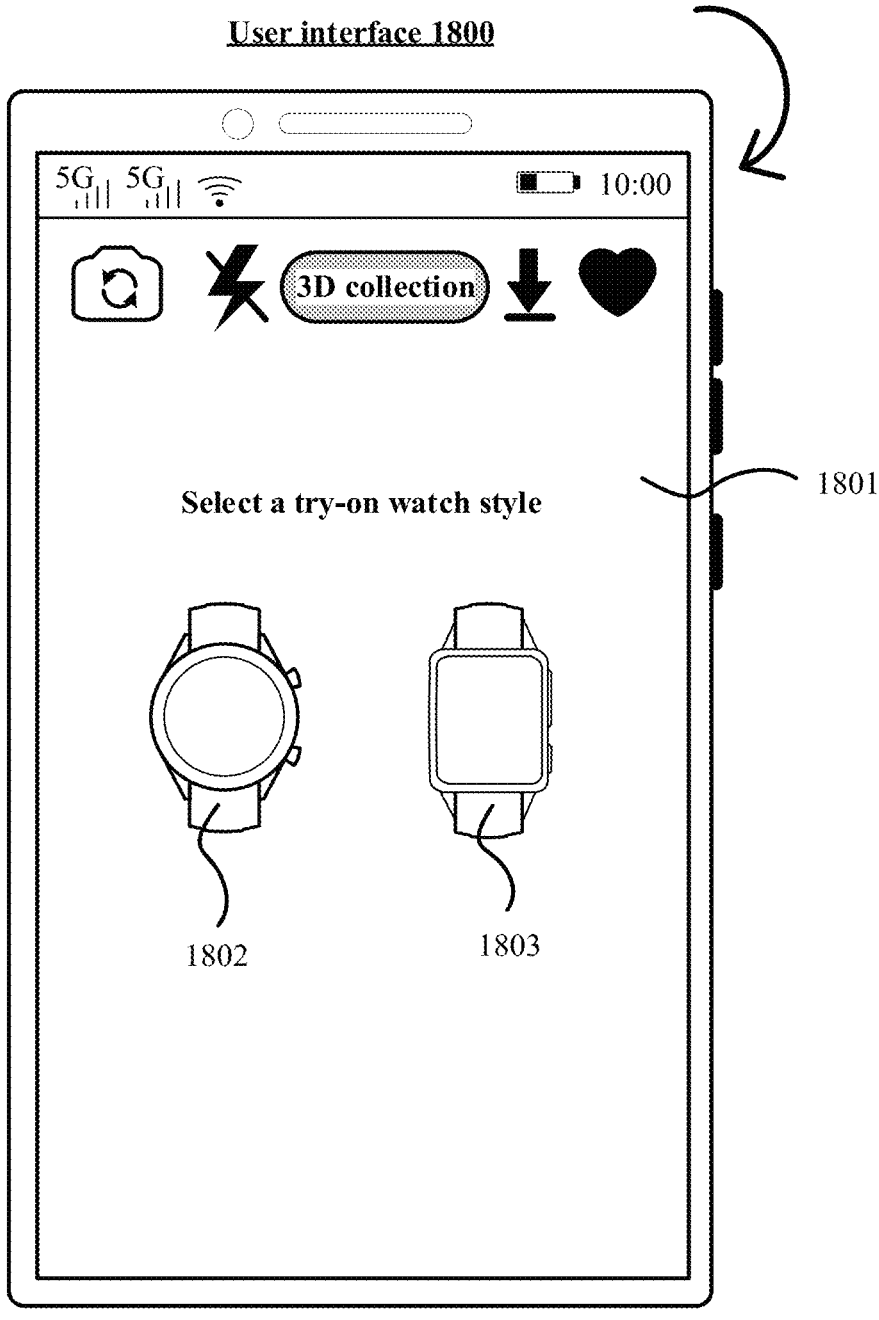
FIG. 18 is a schematic diagram of a user interface according to an embodiment of this application.

For example, as shown in FIG. 18, the user interface 1800 may include a prompt 1801 and images of one or more try-on watch styles. The prompt 1801 displays "select a try-on watch style". The user interface 1800 in FIG. 18 displays images of two different try-on watch styles, which are respectively a circular watch face watch option 1802 and a square watch face watch option 1803.

In some examples, the user selects the circular watch face watch option 1802. The mobile phone may display a user interface 1900 shown in FIG. 19A and FIG. 19B, and the user interface 1900 displays an image in which a circular watch face watch is worn on the wrist of the user. The mobile phone may generate, based on the watch face option selected by the user, a virtual image that is obtained by synthesizing an image of the smart watch with the selected watch face and the wrist of the user, and display the virtual image in an image preview area 1901.

In this embodiment provided in this application, in response to a user operation performed on the screen of the mobile phone, the mobile phone may further adjust an image displayed in the image preview area. The adjustment may include one or more of the following: a size, a position, a direction, and the like of the watch displayed in the image.

Figure 19A:
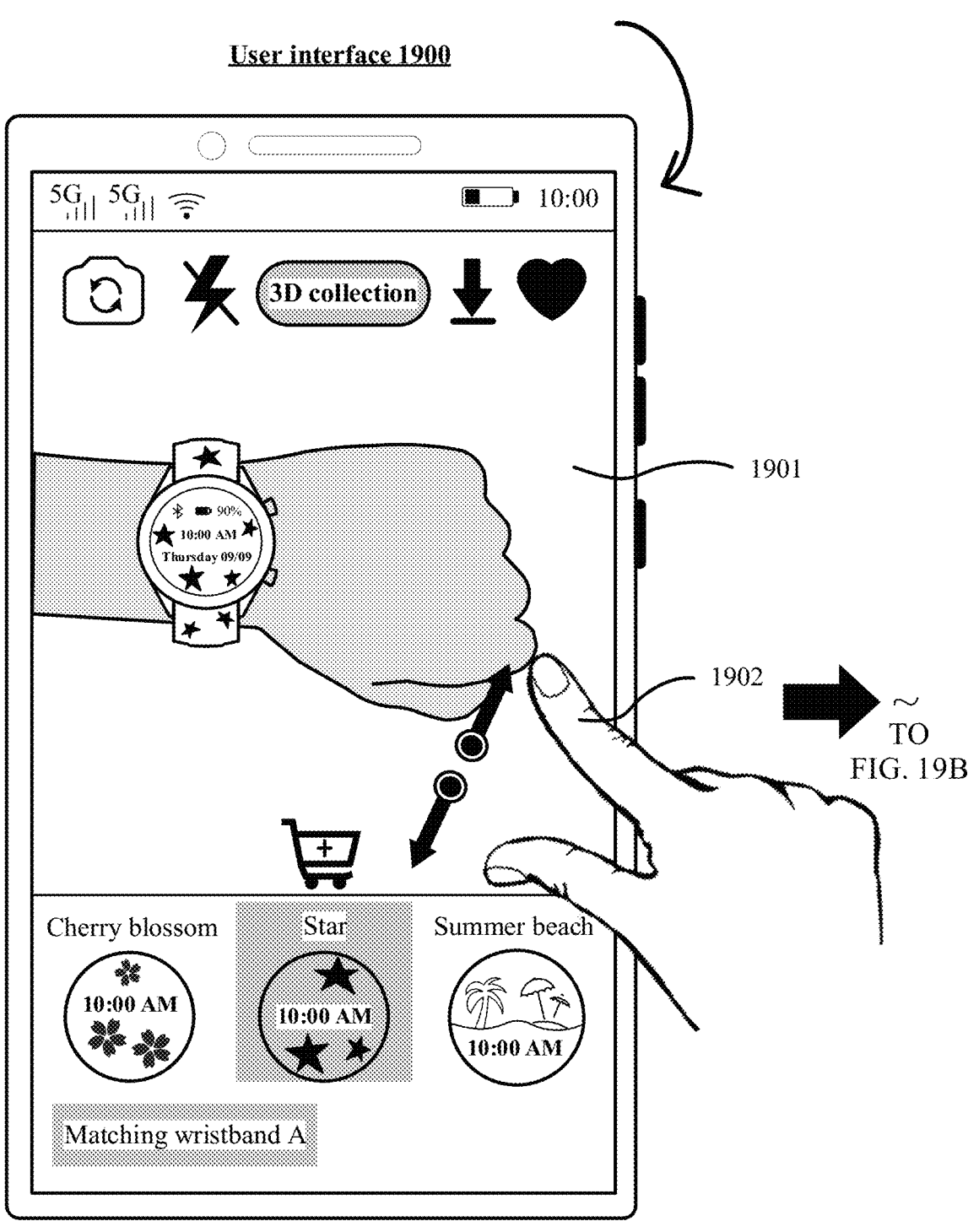
FIG. 19A and FIG. 19B are a schematic diagram of a user interface according to an embodiment of this application.
Figures 19A, 19B:
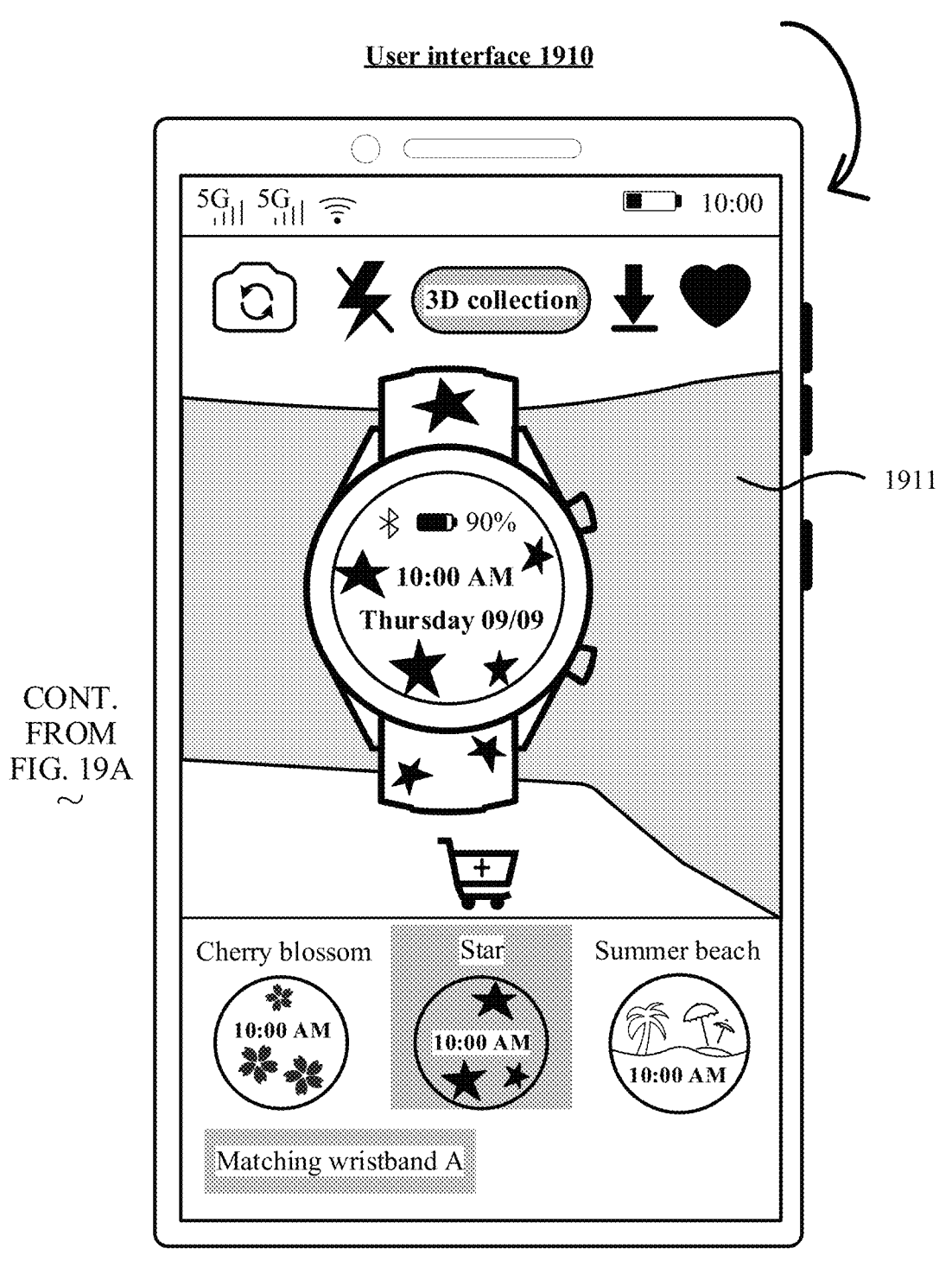

For example, as shown in FIG. 19A and FIG. 19B, the user may adjust a size of the displayed watch image. The mobile phone displays the user interface 1900, and an image in which the user tries on the star watch face is displayed in the image preview area 1901 of the user interface 1900. In response to a zoom-in operation 1902 performed by the user on the screen of the mobile phone, the mobile phone may display a user interface 1910, and a zoomed-in image in which the user tries on the star watch face is displayed in an image preview area 1911 of the user interface 1910. The zoom-in operation 1902 may be an operation of swiping two fingers in opposite directions on the screen of the mobile phone shown in FIG. 19A and FIG. 19B, and a larger distance between the two fingers in a swiping process indicates a larger zoom-in multiple of the watch image. Zooming in on the image for viewing makes it easier to observe details.

Figure 20A:
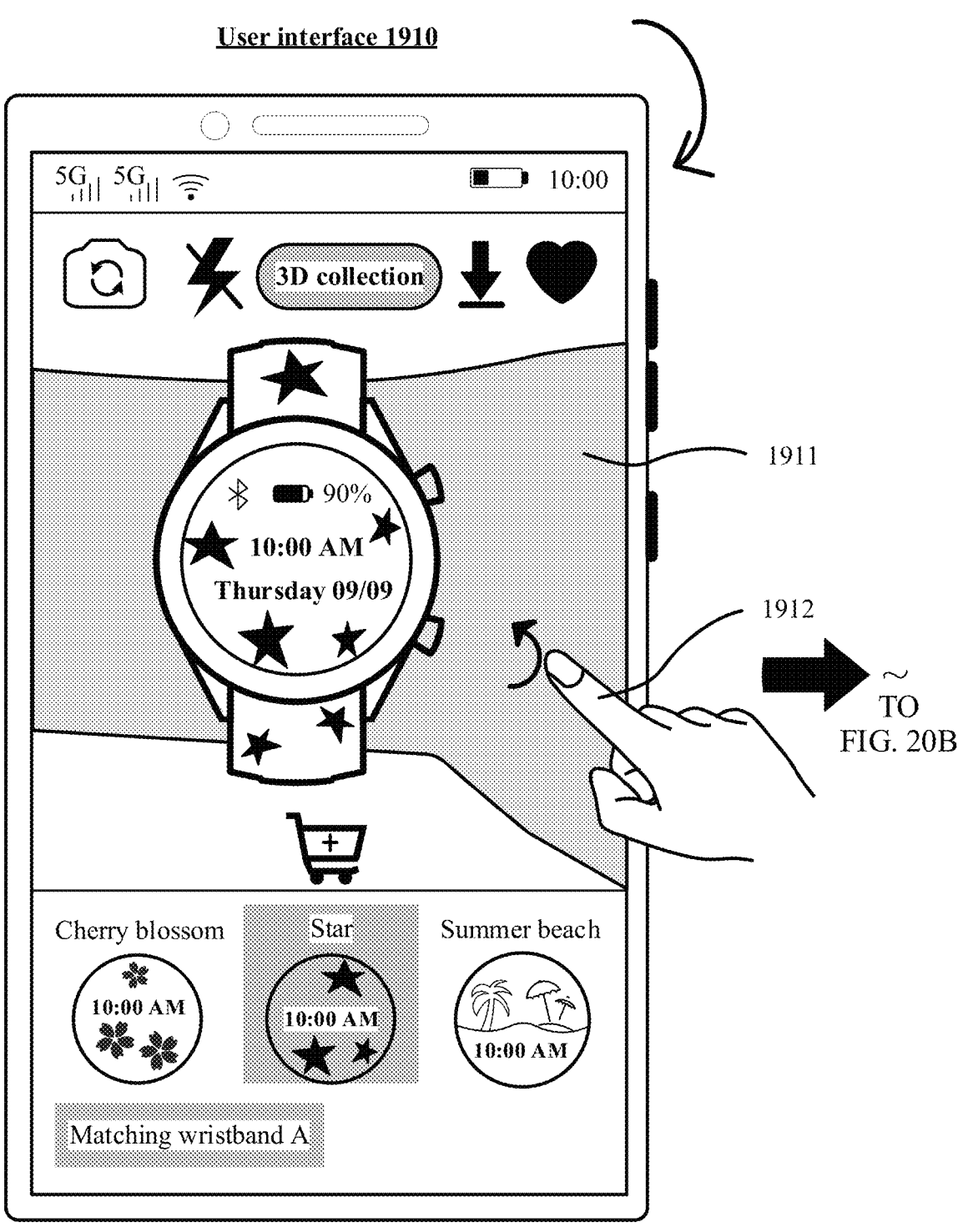
FIG. 20A and FIG. 20B are a schematic diagram of an interaction interface according to an embodiment of this application.
Figures 20A, 20B:
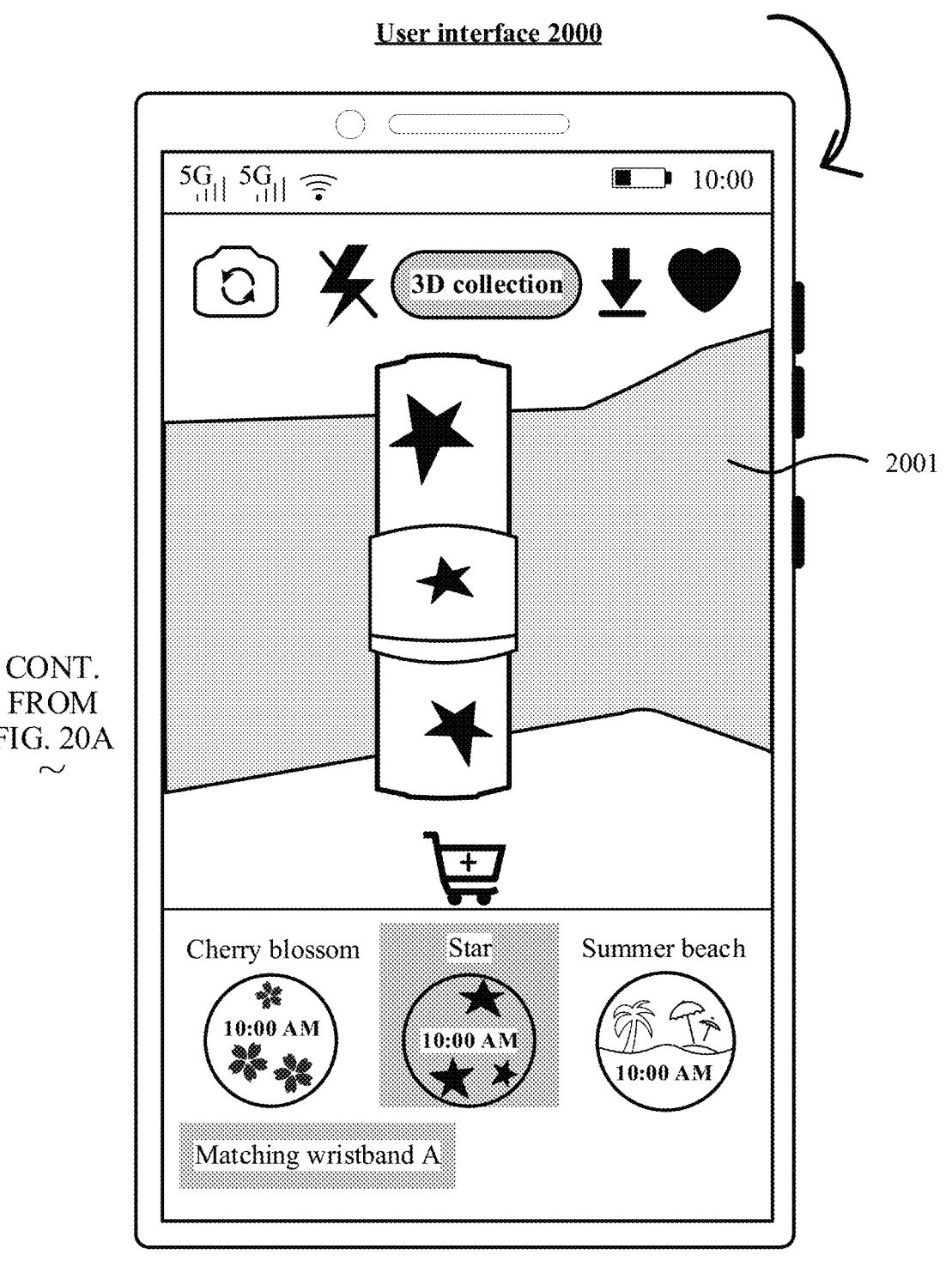

For another example, as shown in FIG. 20A and FIG. 20B, the user may adjust to display an image of a part of the watch, for example, a watch face or a wristband. In the user interface 1910, in response to an operation 1912 performed by the user on the mobile phone, the three-dimensional model of the hand may be rotated. As shown in FIG. 20A and FIG. 20B, the three-dimensional model image of the hand is switched from an outer side of the wrist to an inner side of the wrist. As shown in FIG. 20A and FIG. 20B, the image preview area 1911 of the user interface 1910 displays a three-dimensional model image on the outer side of the wrist of the user and an image of trying on the star watch face. In response to the operation 1912 performed by the user on the screen of the mobile phone, the mobile phone may display a user interface 2000. An image preview area 2001 of the user interface 2000 displays a three-dimensional model image on the inner side of the wrist of the user and an image of trying on the star wristband. The operation 1912 performed by the user on the screen of the mobile phone may be a slide operation with a curve track shown in FIG. 20A and FIG. 20B, and may trigger rotation of the three-dimensional model of the hand.

Figure 21A:
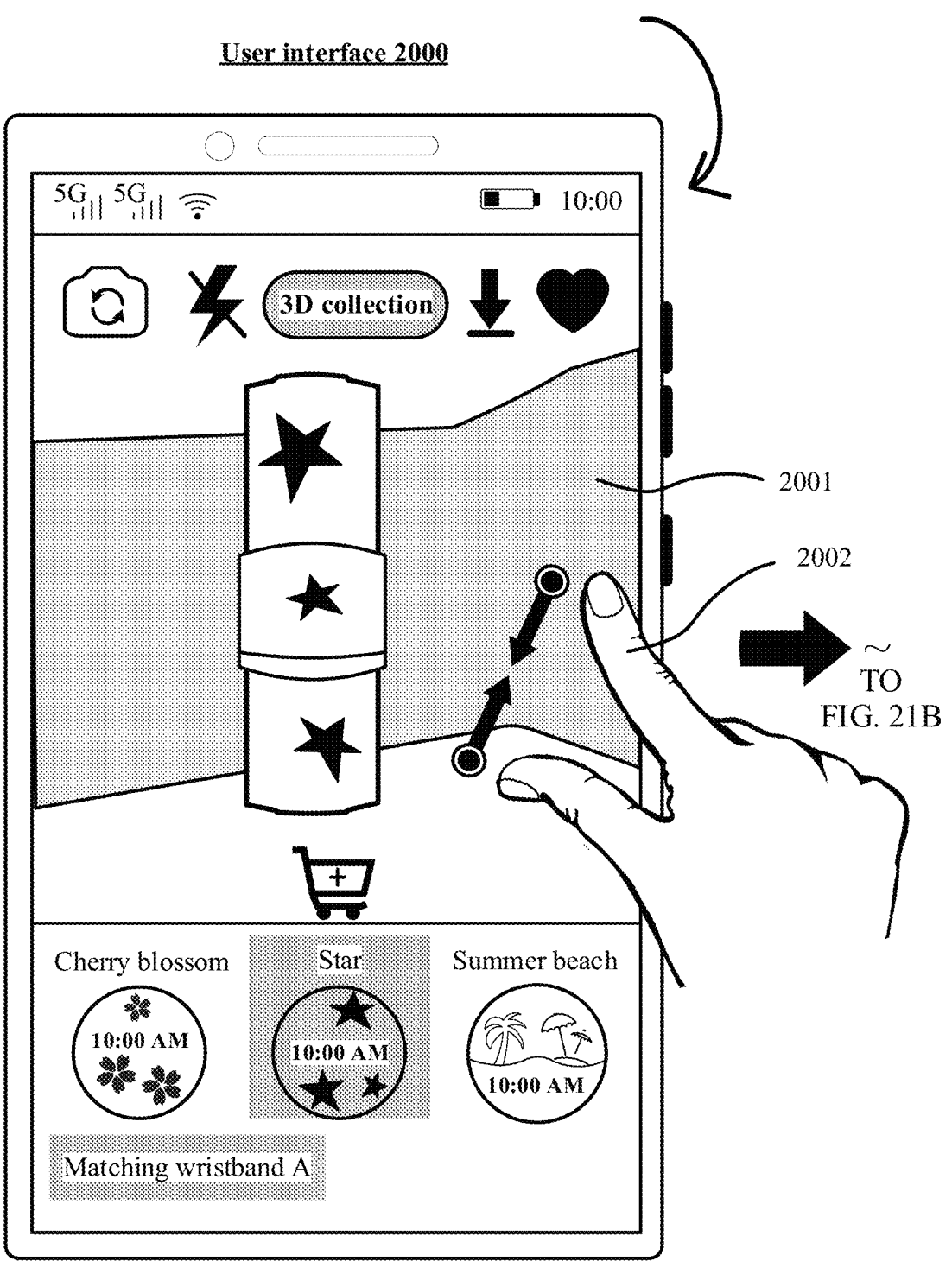
FIG. 21A and FIG. 21B are a schematic diagram of an interaction interface according to an embodiment of this application.
Figures 21A, 21B:
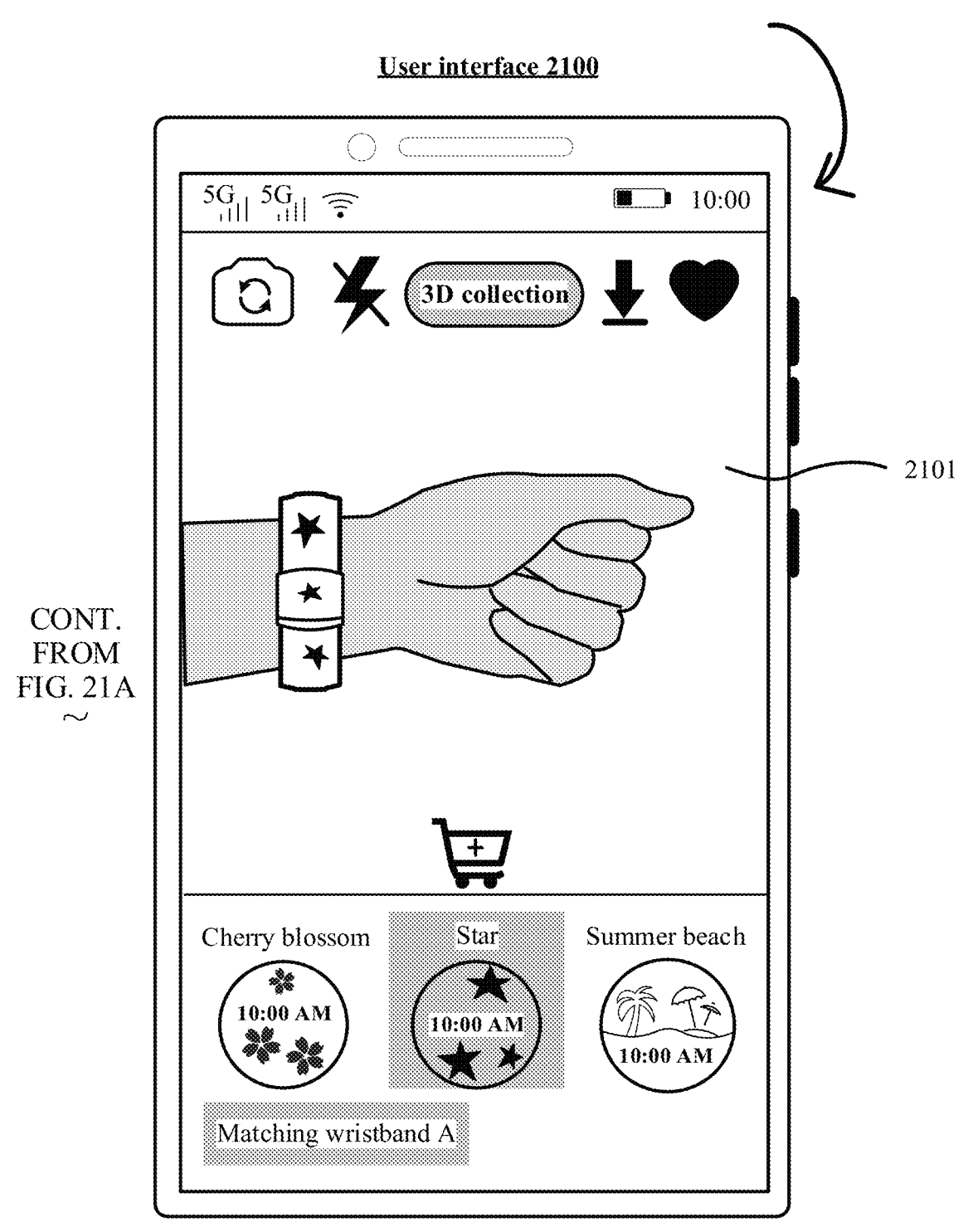

For example, as shown in FIG. 21A and FIG. 21B, the user may zoom out to display the watch image. The mobile phone displays the user interface 2000, and an image in which the user tries on the star wristband is displayed in the image preview area 2001 of the user interface 2000. In response to a zoom-out operation 2002 performed by the user on the screen of the mobile phone, the mobile phone may display a user interface 2100, and a zoomed-out image in which the user tries on the star wristband is displayed in an image preview area 2101 of the user interface 2100. The zoom-out operation 2002 may be an operation of pinching two fingers toward a same position on the screen of the mobile phone shown in FIG. 21A and FIG. 21B, and a smaller distance between the two fingers in a pinching process indicates a larger zoom-out multiple of the watch image. Zooming out the image for viewing helps observe overall effect.

Figure 22A:
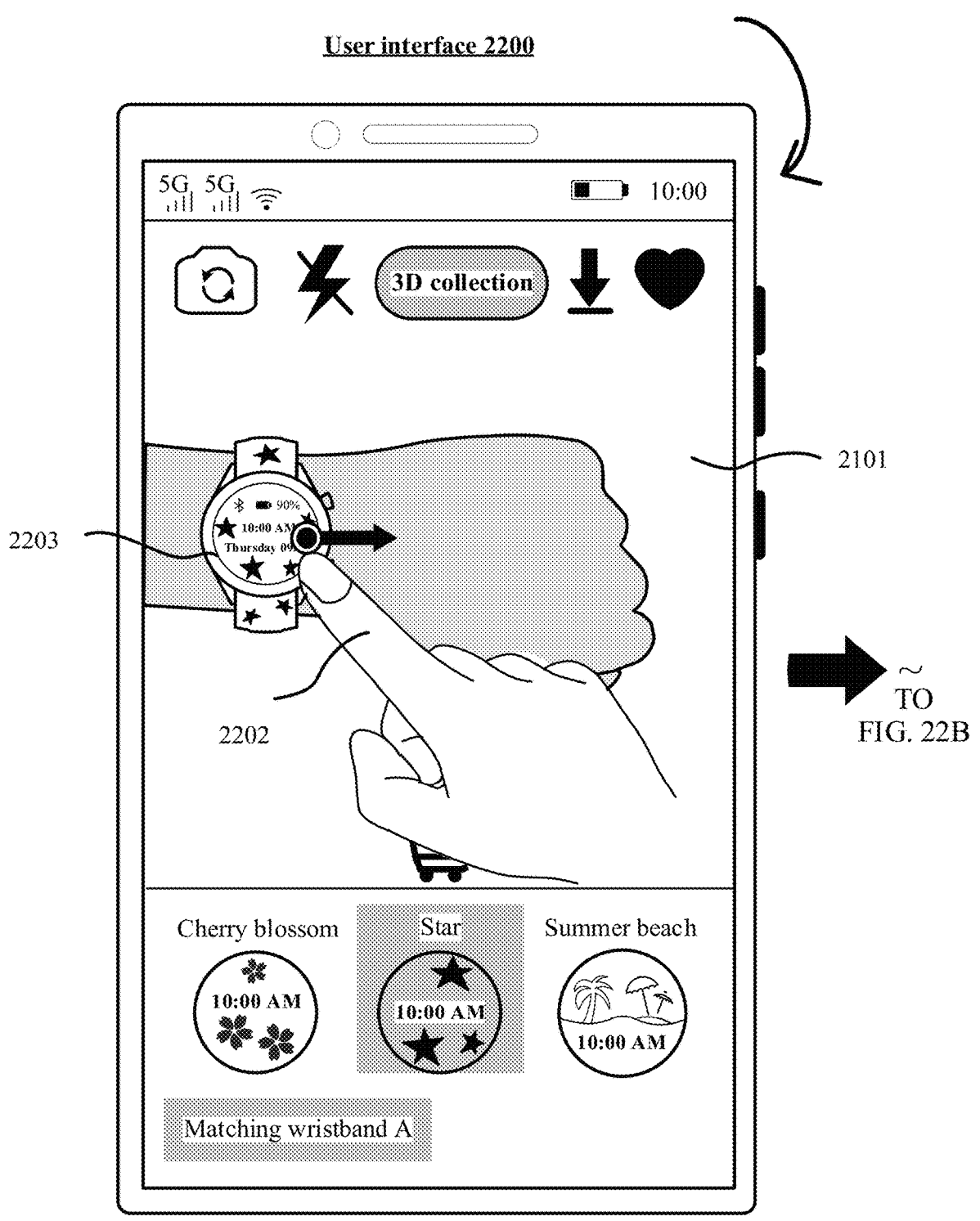
FIG. 22A and FIG. 22B are a schematic diagram of an interaction interface according to an embodiment of this application.
Figure 22B:
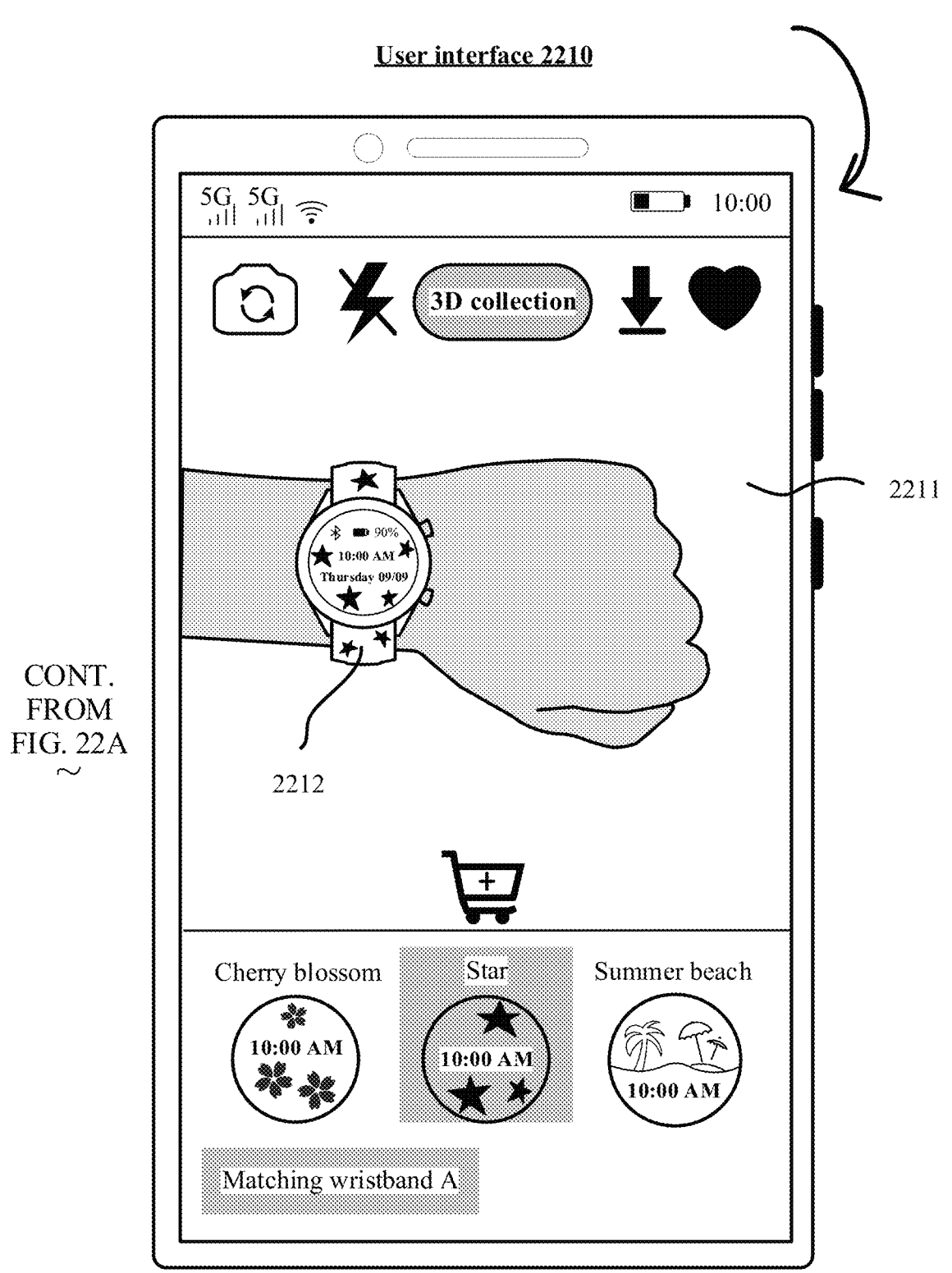

For example, as shown in FIG. 22A and FIG. 22B, the user may further adjust a position of the watch image. The mobile phone displays a user interface 2200, and an image 2203 in which the user tries on the star watch face is displayed in an image preview area 2201 of the user interface 2200. In response to an operation that the user touches and holds the star watch face and drags the star watch face to the right, the mobile phone may display a user interface 2210, and an image 2212 in which the user tries on the star watch face and that is obtained after position fine-tuning is performed is displayed in an image preview area 2211 of the user interface 2210. A fine-tuned watch position displayed in the user interface 2210 is closer to a right side than a watch position in the user interface 2200. This is not limited to dragging to the right. The user may drag the watch to move toward another direction based on a requirement.

Adjustment of the watch position described in FIG. 19A and FIG. 19B to FIG. 22A and FIG. 22B enables the user to more conveniently adjust and view, based on a requirement of the user, an image in which the user tries on a watch face or a watch band. The foregoing descriptions of the user operations are merely examples for description, and these examples do not constitute any limitation on the user operations in another embodiment.

In some embodiments, the mobile phone may further collect a freezing image of the wrist part of the user (which may include the smart watch, or may not include the smart watch), synthesize the freezing image and an image with a different watch face, an image with a wristband, or the like, to obtain a user try-on image, and display the user try-on image in a preview interface. The freezing image may be static or dynamic. Refer to the embodiments shown in FIG. 23, FIG. 24, and FIG. 25.

In this solution, in an entire try-on process, the wrist of the user does not need to be in a camera collection range of the mobile phone, which frees one hand of the user, the entire try-on process is easier and more convenient, and it is more convenient for the user operation.

Figure 23:
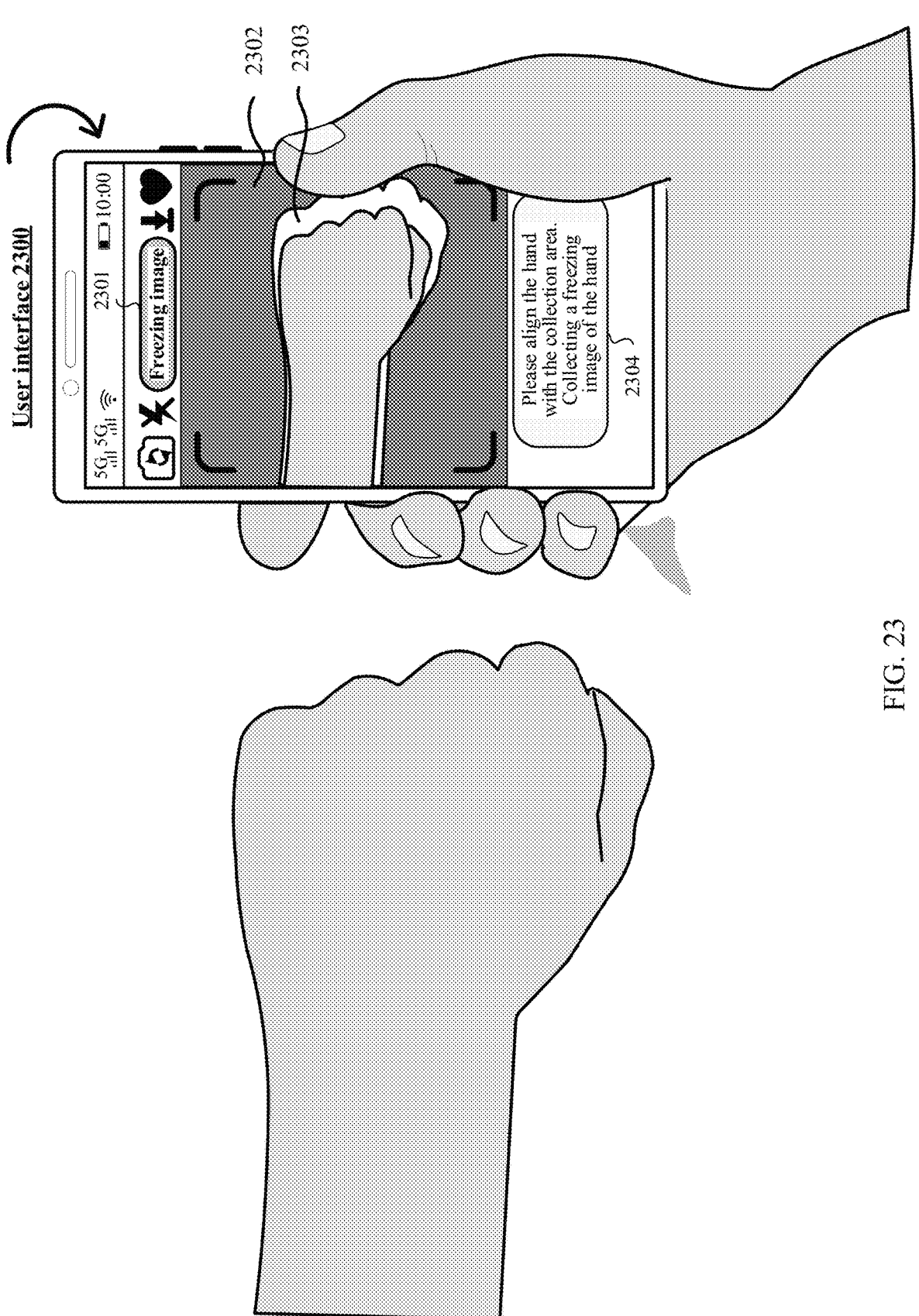
FIG. 23 is a schematic diagram of an interaction interface according to an embodiment of this application.

As shown in FIG. 23, in some embodiments, if the user selects a freezing image control 2301, the mobile phone may display a user interface 2300 shown in FIG. 23. The user interface 2300 is an interface for collecting a freezing image of a body part of the user on which the watch is worn.

For example, the user interface 2300 may include an image preview area 2302, a collection alignment area 2303, a prompt control 2304, and the like. The image preview area 2302 may be used to display, in real time, an image collected by the mobile phone. The collection alignment area 2303 is a collection area shown on the mobile phone. As shown in the user interface 2300, the collection alignment area 2303 is a collection area in a hand shape, and indicates the user to align the wrist part with the collection alignment area 2303, to facilitate collection of a more complete and standard image. The prompt control 2304 may display prompt information "please align the hand with the collection area. Collecting a freezing image of the hand".

The collected freezing image may be a static image or a dynamic video image. During collection, one or more frames of images may be collected, and a plurality of frames of images at a same angle may be processed as one frame of most complete image. For example, the user may rotate the wrist part in front of the camera of the mobile phone, to ensure integrity and clarity of the freezing image collected by the mobile phone when the dynamic video image is collected. A hand image of the user is displayed in the collection alignment area 2303.

Certainly, this solution is also applicable to preview of another device, another product, and another user part. For example, when jewelry such as a necklace is previewed, the mobile phone may also collect a freezing image of the neck of the user and synthesize an image of wearing the necklace. For example, when a computer desktop is previewed, the mobile phone may also collect a freezing image of a computer and synthesize an image with a different desktop theme. For example, when a digital photo frame is previewed, the mobile phone may also collect a freezing image of the digital photo frame, and synthesize and display images of different photos.

Figure 24:
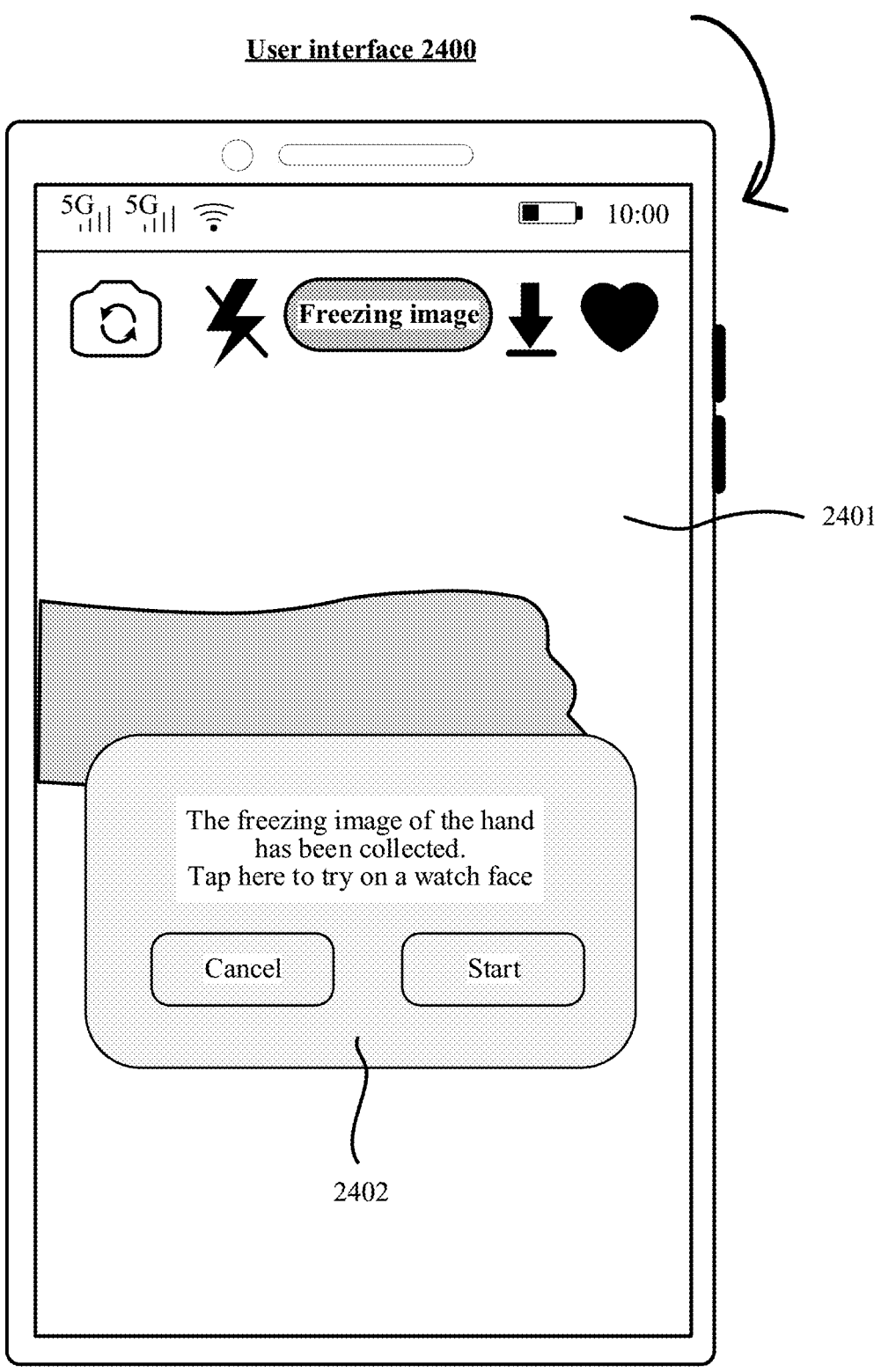
FIG. 24 is a schematic diagram of an interaction interface according to an embodiment of this application.

After the freezing image of the wrist part of the user is collected, the mobile phone may display a user interface 2400 shown in FIG. 24. The user interface 2400 may be used to inform the user that the freezing image has been collected.

As shown in FIG. 24, the user interface 2400 may include an image preview area 2401 and a prompt box 2402. The image preview area 2401 may be used to display the freezing image of the wrist part. The prompt box 2402 may be used to inform the user that the freezing image has been collected, and inform the user that a next operation may be started.

For example, as shown in FIG. 24, a prompt text, a start control, a cancel control, and the like are displayed in the prompt box 2402 of the user interface 2400. The prompt text is used to inform the user that the freezing image of the hand has been collected, and inform the user that the user may start to try on a watch face. The mobile phone may return to the user interface 2300 for display in response to an operation performed on the cancel control. In this way, when the user is not satisfied with the currently collected freezing image, the mobile phone may return to the user interface 2300 to re-collect the freezing image. Alternatively, the mobile phone may display a watch try-on interface in response to an operation performed on the start control.

In some embodiments, the user may further select a style of the smart watch, for example, a circular watch face or a square watch face.

Figure 25:
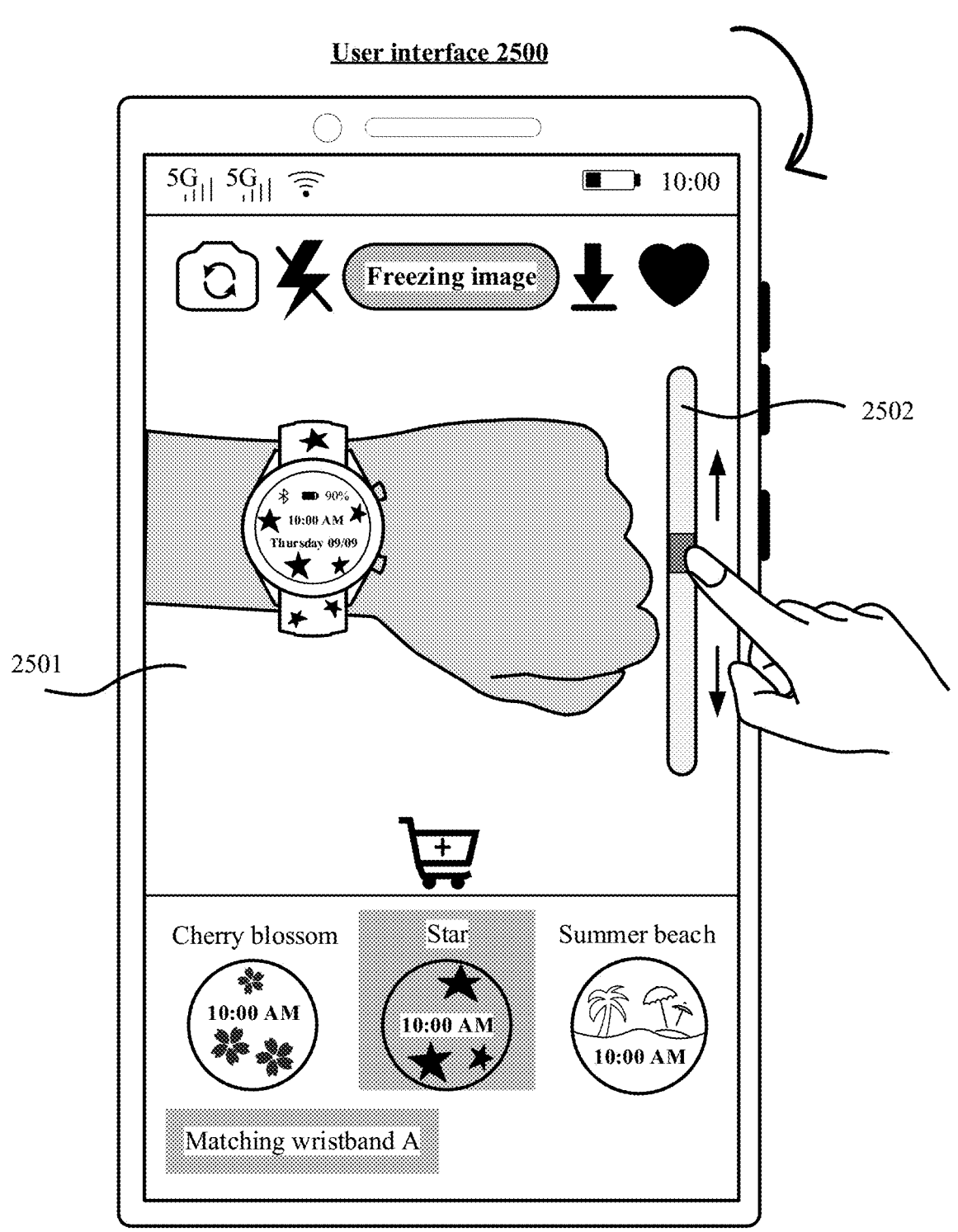
FIG. 25 is a schematic diagram of an interaction interface according to an embodiment of this application.

FIG. 25 shows a user interface 2500 for viewing a freezing image try-on watch face. As shown in FIG. 25, the user interface 2500 includes an image preview area 2501, an angle adjustment bar 2502, and the like. After the user selects a watch face theme, the mobile phone may synthesize a schematic image of the watch face theme into a wrist position of the freezing image of the hand, and display the synthesized image in the image preview area 2501.

In some embodiments, the freezing image may be a freezing image at an angle.

In some other embodiments, the freezing image may be a dynamic video, and the dynamic freezing image may be repeatedly played to display dynamic try-on effect.

In some other embodiments, as shown in FIG. 25, the angle adjustment bar 2502 is displayed in the user interface 2500, and the user may adjust a display angle of the freezing image of the hand by scrolling the angle adjustment bar 2502. For example, the angle adjustment bar 2502 is scrolled upward, and the freezing image of the hand may be rotated upward; the angle adjustment bar 2502 is scrolled downward, and the freezing image of the hand may be rotated downward; and the like. An angle adjustment bar in a left-right direction may be further set, and display effect is viewed in an all-round manner with reference to angles of up, down, left, and right. An angle of the watch face changes accordingly as the hand rotates.

It may be understood that the preview method provided in this application is applicable to watch face preview of the smart watch, and is also applicable to preview of a display home screen, a digital photo frame display interface, a speaker display interface, a vehicle-mounted device display interface, and the like. For implementation of various functions, example interfaces, or user operations of the preview method, refer to the descriptions in embodiments in which the smart watch is used as an example. Details are not described herein again.

It may be understood that the user interfaces described in FIG. 3 to FIG. 25 are merely example interfaces, and are used to assist a reader in understanding the technical solutions described in this application, and do not constitute a limitation on a user interface in another embodiment of this application. In another embodiment, more or fewer user interfaces may be added or reduced, more or fewer controls may be added or reduced, or different human-machine interaction operations may be designed based on an actual situation, or the like, so that the user interface is more adaptable to use experience of the user.

With reference to the embodiments shown in FIG. 1A, FIG. 1B, and FIG. 2 to FIG. 25, the following describes a preview method provided in an embodiment of this application.

This method embodiment provides a novel interaction manner of previewing a watch face, a user can be provided with a faster and more convenient preview interface and easier-to-operate, more user-friendly, and nicer interaction experience. In this embodiment of this application, a first device may enable a photographing preview function, and collect and identify an image of a contour (or a contour of a screen) of a second device or a body part (for example, a wrist part) of a user, and the like. Then, the first device displays, in a photographing preview interface by using an image processing technology, a virtual picture in which a virtual image of a home screen option selected by the user covers a corresponding position such as the second device or the body part of the user. Embodiments of this application do not constitute any limitation on a used image processing algorithm provided that the preview function described in this embodiment can be implemented.

The method provided in this embodiment may be used for the first device, or a communication system 10 that includes the first device and the second device. The first device and/or the second device may be terminal devices/a terminal device configured with a display apparatus. A device type of the first device or the second device may be but is not limited to a mobile phone, a notebook computer, a PAD, a smart band, a smart watch, a digital photo frame, a PC, a smart television (which may also be referred to as a smart screen, a large screen, or the like), a smart speaker, or the like, or may be a desktop computer, a laptop computer, a handheld computer, an AR device, a VR device, an AI device, a vehicle head unit (vehicle-mounted device), a game console, a treadmill, a cloud host/cloud server, another intelligent wearable device, an IoT device, a smart home device such as a smart water heater, a smart lamp, a smart air conditioner, or a smart weighing scale, or another type of electronic device. The device type of the first device or the second device is not limited in this application. For a hardware structure and a software architecture of the first device or the second device, refer to the descriptions of the electronic device 100 in the foregoing embodiments.

In this embodiment of this application, the first device is configured with a camera and the display apparatus, supports a photographing function, and may display an image of a real object collected by the camera. In addition, the first device has a strong image processing capability, and may synthesize a virtual image, and display a virtual object image or an image of combining a virtual object and a real object.

The second device is configured with the display apparatus, configured to display an image. For example, the second device may support display of a plurality of home screens.

The first device and/or the second device may further support detection of a user operation such as a touch, a gesture, or a voice, and convert the user operation into a corresponding instruction. For example, a display of the first device and/or a display of the second device may identify a touch operation, and when a flick-left, flick-right, flick-up, or flick-down user operation on a touchscreen is detected, an image may be correspondingly switched to for display. Alternatively, the first device and/or the second device may detect a device status via one or more sensors such as an acceleration sensor, a gravity sensor, and a gyroscope sensor, for example, tilting leftward, tilting rightward, tilting upward, and tilting downward, and may correspondingly switch to an image for display. Alternatively, the first device and/or the second device may further detect a user gesture via a camera or another sensor, or collect a user voice via a microphone, or the like, convert the foregoing operation into an instruction for switching to an image for display, and respond to the instruction.

FIG. 26 is a flowchart of a preview method according to an embodiment. The method specifically includes the following steps.

S101: A first device displays a first interface, where the first interface includes an image collection area and one or more theme options.

In some embodiments, the first device may enable a photographing preview function, and display the image collection area and the one or more theme options in the first interface. The image collection area may be used to display an image collected by a camera of the first device. The theme option is an option indicating a set of home screen themes, and may include one or more images. For example, when different watch faces of a smart watch need to be previewed, the theme option may be a watch face option or the like. One watch face option may include one or more images, such as a main interface, an icon interface, a lock screen interface, and a password input interface of a watch face, and even may include a matching wristband image. One watch face option may alternatively be series watch faces, including a plurality of watch faces with similar design styles.

In some embodiments, the first device detects an operation that a user selects a first control in a description interface of a second theme. In response to the operation that the user selects the first control, the first device enables an image preview function, and displays the image collection area. Refer to the embodiments shown in FIG. 4 and FIG. 5.

For example, with reference to the embodiment shown in FIG. 6A and FIG. 6B, the first device is a mobile phone, and the mobile phone is configured with a camera and a display. The camera may be configured to capture and collect an image, and the display may display an image of a real object collected by the camera. In addition, the mobile phone has a strong image processing capability, and may synthesize a virtual image and display a virtual object image or an image of combining a virtual object and a real object. The user interface 600 shown in FIG. 6A and FIG. 6B may include an image preview area 602, a watch face style selection area 611, and the like. The image preview area 602 may display an image collected by the camera of the mobile phone. The image preview area 602 may include a viewfinder frame 610. The viewfinder frame 610 is used to determine a range in which a virtual watch face image is generated by using an image processing technology. The watch face style selection area 611 includes one or more watch face options. For example, as shown in FIG. 6A and FIG. 6B, the watch face style selection area 611 displays three watch face options: a cherry blossom watch face option, a star watch face option 612, and a summer beach watch face option.

S102: The first device collects an image of a first object, where the first object may include a second device or a part suitable for wearing the second device.

In some embodiments, the first object may be a screen of the second device, for example, a screen of a smart watch. In some other embodiments, the first object includes a screen area of the second device, and may further include another non-screen area of the second device, for example, a wristband, a watch crown, or a side frame of the smart watch, or a keyboard, a base, or a side frame of a computer. In another embodiment, the first object may be a part that the second device may be worn. For example, the smart watch or a smart band may be worn on a wrist part, a necklace may be worn on a neck part, a television is mounted on a television wall, and the computer is placed on a computer table.

The second device has a display, a home screen theme displayed on the display is a first theme, and the collected image of the first object includes a display of the first object and the home screen theme, that is, the first theme, displayed on the display.

S103: The first device detects that an option of the second theme is selected.

S104: The first device generates a first virtual image based on the second theme selected by the user, where the first virtual image is an image indicated by the second theme.

An image processing algorithm for generating an image is not limited in this embodiment.

S105: The first device displays a second interface, where the second interface displays a first image in which the first virtual image covers the first object.

Refer to the embodiment shown in FIG. 6A and FIG. 6B. The user needs to align the camera with the smart watch. When an image of the smart watch is displayed in the range specified by the viewfinder frame 610, the mobile phone may identify an area (for example, a watch face contour) of an original watch face interface 601 of the smart watch, and cover the area of the original watch face interface with a virtual image of a watch face selected by the user. The viewfinder frame 610 displays an image in which the user wears the virtual watch face selected by the user. As shown in FIG. 6A and FIG. 6B, the star watch face option 612 is selected by the user in the watch face style selection area 611. The star watch face option 612 may be displayed with a distinctive identifier, to distinguish the star watch face option 612 from an unselected watch face option. For example, a dark filling identifier or a highlight identifier may be added to the star watch face option 612, to indicate that the star watch face option is selected. In response to the operation that the star watch face option 612 is selected by the user, the viewfinder frame 610 displays an image in which the watch face of the smart watch worn by the user is a star watch face interface 603 corresponding to the star watch face option 612.

In some embodiments, the user may not wear the smart watch. The mobile phone captures an image of the wrist part of the user, identifies a contour of the wrist part of the user, synthesizes a virtual watch face image based on the image of the wrist part, covers the wrist of the user with the virtual watch face image, to obtain an image in which the user tries on this watch face, and displays the image in a preview interface. Refer to the embodiments shown in FIG. 15A and FIG. 15B. In some embodiments, the user may further select a style of the smart watch, for example, a circular watch face or a square watch face.

The mobile phone may synthesize a virtual watch face or wristband image in real time based on different wrist parts of the user. If the mobile phone identifies that a currently photographed wrist part of the user is a back part of a hand, the watch face image is added to cover the back part of the hand. If the mobile phone identifies that a currently photographed wrist part of the user is an inner part of the wrist, the wristband image is added to cover the inner part of the wrist. When the user rotates the wrist to change an angle, a virtual smart watch image displayed on the mobile phone also changes accordingly.

In this embodiment of this application, the first virtual image may be a static image, or may be a dynamic image. A representation form of the first virtual image is not limited in this embodiment.

S106: The first device detects a first switching instruction, where the first switching instruction instructs to switch a theme to a third theme.

In this embodiment of this application, the first device may generate the first switching instruction in response to a user operation performed on the first device or the second device, to instruct to switch a previewed image. The user operation that triggers theme option switching may include any one or more of the following: a flick operation, a tap operation, a voice input operation, a gesture operation, a button pressing operation, and the like. The user operation that triggers theme option switching is not limited in this embodiment.

In some other embodiments, generation of the first switching instruction may be set to automatically triggering a switching instruction at a specific time interval. For example, the foregoing switching instruction such as switching between different previewed watch faces, switching between different functional interfaces of a theme watch face, or switching between different watch faces in series watch faces for display may be that the mobile phone sets automatic switching that is performed at an interval of a first time threshold (for example, two seconds), to save the user operation. For example, in an example of simple series watch faces, the mobile phone switches to a watch face of a next date for display at an interval of two seconds.

To be specific, the first switching instruction may include any one or more of the following: a first user operation that is detected by the first device and that is performed on the first device, a second user operation that is detected by the second device and that is performed on the second device, and a switching instruction that is automatically sent by the first device at an interval of a first time period.

The first user operation may include any one or more of the following: a flick operation performed on a touchscreen of the first device, a tap operation performed on the touchscreen of the first device, a gesture operation of moving toward a first direction, a voice switching operation, and a press, touch, or rotation operation performed on a first button of the first device. The flick operation performed on the touchscreen of the first device includes a flick operation performed on the image collection area in the touchscreen of the first device.

The second user operation may include any one or more of the following: a flick operation performed on a touchscreen of the second device, a tap operation performed on the touchscreen of the second device, a gesture operation of moving toward a second direction, a gesture operation of rotating a wrist toward a third direction, a voice switching operation, and a press, touch, or rotation operation performed on a second button (for example, a watch crown) of the second device.

If the theme watch face includes a plurality of different interfaces, for example, includes a series of interfaces such as a main interface, an icon interface, a screen-off interface, a lock screen interface, and a password input interface, for an example operation of switching an interface, refer to the embodiments shown in FIG. 9A and FIG. 9B and FIG. 10A and FIG. 10B. Details are not described herein again.

If the theme watch face is series watch faces, a plurality of watch faces whose styles are similar or alike are included. For example, series watch faces may include seven watch faces with similar styles. In a week, one of the series watch faces is displayed every day, and a watch face displayed every day in the week is different. For an example operation of switching an interface, refer to the embodiments shown in FIG. 11A-1 and FIG. 11A-2 and FIG. 11B-1 and FIG. 11B-2. Details are not described herein again.

For example, a same home screen theme includes a first display interface and a second display interface. For example, the first display interface is a main interface, and displays a wireless signal strength indicator, a battery level indicator, a time indicator, and the like; and the second display interface is an icon interface, and displays one or more application icons.

The first device receives a second switching instruction, where the second switching instruction instructs to switch from a first display interface of the first theme to a second display interface. The first device displays a third image in the image collection area, where the second display interface of the first theme is displayed in the area of the display in the third image.

The second switching instruction may include any one or more of the following: a third user operation that is detected by the first device and that is performed on the first device, a fourth user operation that is detected by the second device and that is performed on the second device, and a switching instruction that is automatically sent by the first device at an interval of a second time period.

The third user operation may include any one or more of the following: a flick operation performed on the touchscreen of the first device, a tap operation performed on the touchscreen of the first device, a gesture operation of moving toward a fourth direction, a voice switching operation, and a press, touch, or rotation operation performed on a third button. The flick operation performed on the touchscreen of the first device includes a flick operation performed on the image collection area in the touchscreen of the first device.

The fourth user operation may include any one or more of the following: a flick operation performed on the touchscreen of the second device, a tap operation performed on the touchscreen of the second device, a gesture operation of moving toward a fifth direction, a gesture operation of rotating a wrist toward a sixth direction, a voice switching operation, and a press, touch, or rotation operation performed on a fourth button (for example, the watch crown).

The first direction, the second direction, the third direction, the fourth direction, the fifth direction, and the sixth direction may be directions at any angle. This is not limited in this embodiment.

For example, with reference to the embodiments shown in FIG. 7A and FIG. 7B and FIG. 8A and FIG. 8B, the mobile phone may trigger previewed watch face switching in response to a flick operation of the user on the touchscreen of the mobile phone. For example, the mobile phone sends, to the mobile phone in response to a flick-left operation of the user on the display of the mobile phone, an instruction of "switching to previous one". The mobile phone receives and responds to the instruction, and switches a previewed watch face to a previous watch face. The mobile phone sends, to the mobile phone in response to a flick-right operation of the user on the display of the mobile phone, an instruction of "switching to next one". The mobile phone receives and responds to the instruction, and switches a previewed watch face to a next watch face. A flick direction of the flick operation may be flick-left or flick-right. In a possible implementation, the flick operation may alternatively be flick-down, flick-up, or the like.

For example, the smart watch may send the switching instruction to the mobile phone in response to the flick operation performed by the user on the display of the smart watch. In this embodiment of this application, a flick direction of the flick operation may be flick-left or flick-right. In a possible implementation, the flick operation may alternatively be flick-down, flick-up, or the like. For example, the smart watch sends, to the mobile phone in response to a flick-right operation of the user on the display of the smart watch, an instruction of "switching to previous one". The mobile phone receives and responds to the instruction, and switches a previewed watch face to a previous watch face.

For example, the smart watch may send the switching instruction to the mobile phone in response to the tap operation of the user on the smart watch. For example, in response to a tap operation performed by the user on the display of the smart watch, the smart watch sends an instruction of "switching to next one" to the smart watch. The mobile phone receives and responds to the instruction, and switches a previewed watch face to a next watch face. For example, if the user selects the cherry blossom watch face option 703 in the watch face style selection area 611, the mobile phone may switch the previewed watch face from the star watch face interface 603 to the cherry blossom watch face interface 702, as shown in the user interface 700. If the user selects the summer beach watch face option 803 in the watch face style selection area 611, the mobile phone may switch the previewed watch face from the star watch face interface 603 to the summer beach watch face interface 802, as shown in the user interface 800.

For example, refer to the embodiments shown in FIG. 12A-1, FIG. 12A-2, and FIG. 12A-3, FIG. 12B-1, FIG. 12B-2, and FIG. 12B-3, FIG. 12C-1, FIG. 12C-2, and FIG. 12C-3, and FIG. 12D-1, FIG. 12D-2, and FIG. 12D-3. In some embodiments provided in this application, the mobile phone may alternatively determine, by detecting a status of the mobile phone or the smart watch, to switch the previewed watch face. For example, the mobile phone detects a device status of the mobile phone or the smart watch via one or more sensors such as an acceleration sensor, a gravity sensor, and a gyroscope sensor, for example, tilting leftward, tilting rightward, tilting upward, or tilting downward, and may correspondingly switch to a previous or next watch face image for display.

For example, when detecting an action of rotating or swinging the wrist of the user upward, downward, leftward, rightward, or another action, the smart watch may generate a corresponding switching instruction, and send the switching instruction to the mobile phone, and the mobile phone switches to a previewed watch face image for display. Details are not described herein again.

Certainly, this is not limited to detecting the wrist action. The smart watch may alternatively generate a switching instruction by detecting another operation performed on the smart watch, for example, a flick operation (flick-up, flick-down, flick-left, flick-right, or the like) performed on the touchscreen of the smart watch, a watch crown rotation operation performed on a watch crown in different directions, a tap operation performed on the touchscreen of the smart watch, a voice input operation or a gesture input operation (movement of a hand in a direction such as leftward, rightward, upward, or downward) performed on the smart watch, or the like.

In some other embodiments, the mobile phone may alternatively switch the previewed watch face in response to a voice input of the user. For example, the mobile phone may identify a specific voice in which a voice instruction of the user is "switching to previous one" or "switching to next one", and switch a previewed watch face to a previous watch face or switch a previewed watch face to a next watch face.

In some embodiments, the smart watch may alternatively send the switching instruction to the mobile phone in response to the voice input of the user on the smart watch. For example, after identifying that the voice input of the user is "previous", the smart watch sends an instruction of "switching to previous one" to the mobile phone. The mobile phone receives and responds to the instruction, and switches a previewed watch face to a previous watch face.

In some other embodiments, the mobile phone may alternatively switch the previewed watch face in response to a gesture input of the user for the mobile phone. The mobile phone may identify that a gesture image of the user is a specific gesture for switching to previous one or next one, for example, a left movement gesture, a right movement gesture, an up movement gesture, or a down movement gesture, and switch the previewed watch face to a previous watch face or switch the previewed watch face to a next watch face.

It should be noted that the switching operations such as switching between different previewed watch faces, switching between different functional interfaces of the theme watch face, or switching between different watch faces in the series watch faces to display may be the same or may be different. The watch face switching may alternatively be implemented with reference to one or more user operations described above. For example, when the mobile phone detects the flick-up operation performed on the screen of the mobile phone, or the smart watch detects the operation of rotating the wrist of the user upward, switching to the previous watch face may be triggered.

In some embodiments, if a currently displayed watch face is a last watch face in the series watch faces, when an operation of indicating to display next one is detected, a first watch face in the series watch faces may be returned. For example, when displaying a simple series watch face corresponding to Sunday, after detecting a flick-down operation of the user, the mobile phone may display a simple series watch face corresponding to Monday. When displaying the simple series watch face corresponding to Monday, after detecting a flick-up operation of the user, the mobile phone may display the simple series watch face corresponding to Sunday, where watch face options of Monday and Sunday may be linked.

In some other embodiments, if a currently displayed watch face is a last watch face in the series watch faces, when an operation of indicating to display next one is detected, a next watch face of the series watch faces may be displayed, where the watch face is a theme watch face different from a theme of the series watch faces. For example, when displaying a simple series watch face corresponding to Sunday, after detecting a flick-down operation of the user, a mobile phone may display a next theme cherry blossom watch face.

Similarly, if the first object is a body part of the user, for descriptions of switching a theme option and displaying a virtual synthesized image, refer to the foregoing embodiments. Details are not described herein again. For example, the mobile phone may switch a previewed watch face in response to a user operation performed on the mobile phone. The user operation that triggers watch face switching may include any one or more of the following: a flick operation, a tap operation, a voice input operation, a gesture operation, and the like. The user operation that triggers watch face switching is not limited in this embodiment. For specific descriptions of the previewed watch face switching function, refer to the embodiments in FIG. 6A and FIG. 6B to FIG. 14. Details are not described herein again.

S107: The first device displays a third interface, where the third interface displays a second image in which a second virtual image covers the first object, and the second virtual image is an image indicated by the third theme.

The third theme is different from the second theme, and the second virtual image is different from the first virtual image.

In another embodiment, the user may preview a try-on image of the watch face, and may also preview a try-on image of a wristband. Refer to the embodiment shown in FIG. 13A, FIG. 13B, and FIG. 13C.

In some embodiments, the first device may first select a home screen theme, and then enable an image collection function to collect the image of the first object. For example, before the first device collects the image of the first object, the first device displays options of one or more home screen themes, where the one or more home screen themes include the second theme, and the user selects the second theme, and then enables an image collection function to collect the image of the first object.

In some embodiments, the first device may first enable an image collection function, and then select a home screen theme after identifying the first object. After the first device collects the image of the first object, the first device displays options of one or more home screen themes, where the one or more home screen themes include the second theme; and then in response to an operation that the user selects the second theme, the first device displays the first image in the image collection area.

In some other embodiments, if a product previewed by the user is jewelry such as a necklace, a front-facing camera may be used for photographing, which is more convenient for the user to view try-on effect. The mobile phone may quickly switch the lens from the rear-facing camera to the front-facing camera in response to an operation that the user selects the lens switching control. A type of the switched camera is not limited herein. Cameras may include the front-facing camera, the rear-facing camera, a wide-angle camera, a depth camera, and other types.

In some embodiments, an entire preview process is a process in which the mobile phone collects the first object in real time. The first image is a real-time preview image, and positions of the second device and the object for wearing the second device in the first image displayed in the image collection area change with a relative position between the first object and the first device.

In some embodiments, the mobile phone may further collect a freezing image of the wrist part of the user (which may include the smart watch, or may not include the smart watch), synthesize the freezing image and an image with a different watch face, an image with a wristband, or the like, to obtain a user try-on image, and display the user try-on image in a preview interface. The freezing image may be static or dynamic. To be specific, the first device collects one or more frames of images of the first object at one or more angles. After the first device collects the one or more frames of images of the first object at the one or more angles, the first device generates a freezing image of the first object, and displays the freezing image of the first object in the first image, where the freezing image of the first object generated by collecting an image of the first object at one angle is a static image, and the freezing image of the first object generated by collecting images of the first object at a plurality of angles is a dynamic image. A position of the first object in the dynamic image changes with an indication operation of the user, the indication operation is performed on the first device, and the indication operation may include one or more of the following: a flick operation performed on the touchscreen of the first device, a tap operation performed on the touchscreen of the first device, a gesture operation of moving toward a seventh direction, a voice operation of indicating a rotation position, and a press, touch, or rotation operation performed on a fifth button of the first device. Refer to the embodiments shown in FIG. 23, FIG. 24, and FIG. 25. Details are not described herein again.

In some embodiments, this application further provides a solution of previewing images of different watch faces and wristbands based on a three-dimensional model of a hand. The mobile phone may first collect a 3D image of a wrist part of the user (which may include the smart watch, or may not include the smart watch), construct a three-dimensional model of the wrist part of the user based on the 3D image, and then synthesize, by using an image processing technology, an image of trying on the watch face or the wristband and the three-dimensional model of the wrist of the user, to generate a virtual image in which the smart watch with the selected virtual watch face is worn on the hand of the user. In this solution, in an entire try-on process, the wrist of the user does not need to be in a camera collection range of the mobile phone, which frees one hand of the user, the entire try-on process is easier and more convenient, and it is more convenient for the user operation. For specific descriptions, refer to the embodiments shown in FIG. 16 to FIG. 22A and FIG. 22B.

For example, the first device collects one or more frames of images of the first object at a plurality of angles. After the first device collects the one or more frames of images of the first object at the plurality of angles, the first device synthesizes a three-dimensional image of the first object based on an image at each angle, where the three-dimensional image of the first object is displayed in the first image. A position of the first object in the three-dimensional image of the first object changes with an indication operation of the user, the indication operation is performed on the first device, and the indication operation includes one or more of the following: a flick operation performed on the touchscreen of the first device, a tap operation performed on the touchscreen of the first device, a gesture operation of moving toward an eighth direction, a voice operation of indicating a rotation position, and a press, touch, or rotation operation performed on a sixth button of the first device.

The seventh direction and the eighth direction may be any direction.

In some other embodiments, the second device may be in a screen-off state. In a case of the screen-off state, the first device may also collect an image of the second device and synthesize images with different home screen themes to preview display effect for the user.

If the user previews a favorite theme home screen, the user may add the watch face to favorites or purchase the watch face, and configure the watch face on the smart watch. In some embodiments, the user may browse and select a home screen on the first device, and then the first device sends a configuration file of the home screen to the second device, and the second device displays, based on the configuration file, the home screen selected by the user. In some other embodiments, the second device may alternatively store some home screens for the user to select, and the user may select and configure a home screen on the second device.

For example, the first device detects a fifth user operation, where the fifth user operation indicates the second device to configure the home screen theme as the second theme. The first device sends a configuration file of the second theme to the second device in response to the fifth user operation. After completing receiving of the configuration file of the second theme, the second device displays, on the display, the second theme selected by the user to be the home screen theme.

A first connection may be established between the first device and the second device. The first connection between the first device and the second device may be a wired connection or a wireless connection, for example, a Bluetooth connection or a Wi-Fi connection. This is not limited in this embodiment. Data or instructions may be transmitted between the first device and the second device through the established first connection.

In the foregoing embodiments, an example in which the first device is the mobile phone and the second device is the smart watch is basically used for description. It may be understood that a plurality of embodiments described in this application by using the mobile phone and the smart watch as an example do not constitute a limitation on another embodiment. The device type of the first device and the device type of the second device may alternatively be other devices. The preview method provided in this application is applicable to watch face preview of the smart watch, and is also applicable to preview of a display home screen, a digital photo frame display interface, a speaker display interface, a home screen theme of a vehicle-mounted device display interface, and the like. For implementation of various functions, example interfaces, or user operations of the preview method, refer to the descriptions in embodiments in which the smart watch is used as an example. Details are not described herein again. All solutions that can implement the inventive concept of this application fall within the protection scope of this application.

According to the method provided in this application, the foregoing problem that actual display effect of the home screen cannot be previewed is resolved. The user may preview display effect of different styles of selected home screens or other objects in an actual environment. According to the method provided in this application, human-machine interaction performance can be enhanced, a more intuitive, vivid, convenient, and interesting preview manner is provided for the user, and user experience is improved.

With reference to the foregoing embodiments, the following describes functional modules of a communication system provided in an embodiment of this application.

FIG. 27 shows functional modules of a communication system 10. The communication system 10 may include an image collection module 2701, an image processing module 2702, a communication module 2703, a user operation monitoring module 2704, a display module 2705, and the like. For the communication system, refer to the foregoing embodiment of describing the communication system 10. Details are not described herein again. The communication system may include a plurality of devices such as a first device and a second device. Alternatively, these functional modules are integrated into the first device.

The image collection module 2701 may be configured to collect an image of the second device (for example, a smart watch) or a user body part (for example, a wrist) on which the second device is worn. For specific descriptions, refer to the foregoing embodiments. Details are not described herein again. After completing image collection, the image collection module 2701 may send the collected image to the image processing module 2702. In some other embodiments, the image collection module 2701 may be further configured to collect a three-dimensional image (for example, a wrist part of a user).

The image processing module 2702 may be configured to synthesize a virtual image. For example, the image processing module 2702 receives a smart watch image collected by the image collection module 2701, and generates, based on a watch face option selected by the user, a virtual watch face image to cover a display area of the smart watch, to obtain an image in which the user tries on a selected watch face. After generating the virtual image in which the user tries on the selected watch face, the image processing module may send the image to the display module 2705. In some other embodiments, when the image processing module 2702 receives a three-dimensional image of the wrist part of the user, the image processing module 2702 may construct a three-dimensional model of the wrist part of the user based on the three-dimensional image of the wrist part of the user, and then synthesize an image of the watch face selected by the user on the three-dimensional model of the wrist part of the user.

The communication module 2703 is configured to receive or send data or instructions.

The user operation monitoring module 2704 may be configured to monitor a user operation performed by the user on the first device or the second device. For example, the first device may monitor a flick-left or flick-right operation performed by the user on a screen of the first device, and generate an instruction for switching to a previous or next watch face. The monitored user operation may include a touch operation, a voice operation, a gesture operation, and the like.

The display module 2705 may be configured to display a preview image in which the user tries on the selected watch face option. In some embodiments, the display module 2705 may further display an image in which the user tries on a wristband matching the selected watch face option.

For more function descriptions of the image collection module 2701, the image processing module 2702, the communication module 2703, the user operation monitoring module 2704, the display module 2705, and the like, refer to the descriptions of the foregoing embodiments in FIG. 3 to FIG. 26 and the like. Details are not described herein again.

The implementations described in the foregoing embodiments are merely example descriptions, and do not constitute any limitation on another embodiment of this application. Specific internal implementations may vary based on different types of electronic devices, different installed operating systems, different used programs, and different invoked interfaces. Embodiments of this application constitute no limitation provided that the specific functions described in embodiments of this application can be implemented. Various implementations of this application may be combined randomly to achieve different technical effects.

According to the context, the term "when" used in the foregoing embodiments may be interpreted as "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the foregoing embodiments may be implemented by a computer program instructing related hardware. The program may be stored in a computer-readable storage medium. When the program is executed, the procedures of the methods in embodiments may be performed. The foregoing storage medium includes: any medium that can store program code, such as a ROM, a random access memory RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
   displaying, by a first device, an image collection area;
   collecting, by the first device, an image of a first object, wherein the first object comprises a second device, wherein the second device comprises a display, wherein a home screen theme displayed on the display comprises a first theme, wherein the image of the first object comprises an image depiction of the first object and the first theme, and wherein the first object comprises an object enabling wearing of the second device; and
   displaying, by the first device, a first image in the image collection area, wherein the first image comprises an image depiction of the second device and an image depiction of the object enabling wearing of the second device, wherein the home screen theme displayed in an area of the display in the first image comprises a second theme selected by a user from a plurality of themes displayed in a style selection area of the display, wherein each theme of the plurality of themes, including the second theme, is associated with a plurality of design elements.

2. The method according to claim 1, further comprising:
   receiving, by the first device, a first switching instruction, wherein the first switching instruction instructs to switch from the second theme to a third theme; and
   displaying, by the first device, a second image in the image collection area, wherein the home screen theme displayed in the area of the display in the second image comprises the third theme.

3. The method according to claim 2, wherein the first switching instruction comprises one or more of:
   a first user operation detected by the first device and performed on the first device;
   a second user operation detected by the second device and performed on the second device; or
   a switching instruction automatically sent by the first device at an interval of a first time period.

4. The method according to claim 3, wherein the first user operation comprises one or more of:

a first flick operation performed on a touchscreen of the first device;

a first tap operation performed on the touchscreen of the first device;

a first gesture operation of moving toward a first direction;

a first voice switching operation; or a first press, touch, or rotation operation performed on a first button of the first device; and wherein the second user operation comprises one or more of:

a second flick operation performed on a touchscreen of the second device;

a second tap operation performed on the touchscreen of the second device;

a second gesture operation of moving toward a second direction;

a second gesture operation of rotating a wrist toward a third direction;

a second voice switching operation; or a second press, touch, or rotation operation performed on a second button of the second device.

5. The method according to claim 1, wherein the first theme comprises a first display interface and a second display interface, the method further comprising:

receiving, by the first device, a second switching instruction, wherein the second switching instruction instructs to switch from the first display interface of the first theme to the second display interface; and displaying, by the first device, a third image in the image collection area, wherein the second display interface of the first theme is displayed in the area of the display in the third image.

6. The method according to claim 5, wherein the second switching instruction comprises one or more of:

a third user operation detected by the first device and performed on the first device;

a fourth user operation detected by the second device and performed on the second device; or a switching instruction automatically sent by the first device at an interval of a second time period.

7. The method according to claim 6, wherein the third user operation comprises one or more of:

a first flick operation performed on a touchscreen of the first device;

a first tap operation performed on the touchscreen of the first device;

a first gesture operation of moving toward a fourth direction;

a first voice switching operation; or a first press, touch, or rotation operation performed on a third button; and wherein the fourth user operation comprises one or more of:

a second flick operation performed on a touchscreen of the second device;

a second tap operation performed on the touchscreen of the second device;

a second gesture operation of moving toward a fifth direction;

a second gesture operation of rotating a wrist toward a sixth direction;

a second voice switching operation; and a second press, touch, or rotation operation performed on a fourth button.

8. The method according to claim 1, further comprising:

before collecting, by the first device, the image of the first object:

displaying, by the first device, at least one option of one or more home screen themes, wherein the one or more home screen themes comprises the second theme, and wherein the user selects the second theme.

9. The method according to claim 1, further comprising:

performing, after the collecting, by the first device, the image of the first object:

displaying, by the first device, at least one option of one or more home screen themes, wherein the one or more home screen themes comprises the second theme, and wherein the user selects the second theme; and displaying, by the first device, the first image in the image collection area in response to the user selecting the second theme.

10. The method according to claim 1, wherein the first image comprises a real-time preview image, and wherein a position of the image depiction of the second device and a position of the image depiction of the object enabling wearing of the second device in the first image displayed in the image collection area change with a relative position between the first object and the first device.

11. The method according to claim 1, wherein collecting, by the first device, the image of the first object comprises:

collecting, by the first device, one or more frames of images of the first object at one or more angles, and wherein the method further comprises:

performing, after the first device collects the one or more frames of images of the first object at the one or more angles:

generating, by the first device, a freezing image of the first object; and displaying the freezing image of the first object in the first image, wherein the freezing image of the first object is a static image generated by collecting an image of the first object at one angle, or wherein the freezing image of the first object is a dynamic image generated by collecting images of the first object at a plurality of angles.

12. The method according to claim 1, wherein collecting, by the first device, the image of the first object comprises:

collecting, by the first device, one or more frames of images of the first object at a plurality of angles; and wherein the method further comprises:

performing, after the first device collects the one or more frames of images of the first object at the plurality of angles:

synthesizing, by the first device, a three-dimensional image of the first object based on an image at each angle of the plurality of angles, wherein the three-dimensional image of the first object is displayed in the first image.

13. The method according to claim 12, wherein a position of the first object in the three-dimensional image of the first object changes with an indication operation of the user, wherein the indication operation is performed on the first device, and wherein the indication operation comprises one or more of:

a flick operation performed on a touchscreen of the first device;

a tap operation performed on the touchscreen of the first device;

a gesture operation of moving toward an eighth direction;

a voice operation of indicating a rotation position; and a press, touch, or rotation operation performed on a sixth button of the first device.

14. The method according to claim 1, further comprising:

performing, before displaying, by the first device, the image collection area:

detecting, by the first device, the user selecting a first control in a description interface of the second theme;

wherein displaying, by the first device, the image collection area comprises:

performing, in response to the user selecting the first control:

enabling, by the first device, an image preview function; and displaying the image collection area.

15. The method according to claim 1, further comprising:

detecting, by the first device, a fifth user operation, wherein the fifth user operation instructs the second device to configure the home screen theme as the second theme;

sending, by the first device, a configuration file of the second theme to the second device in response to the fifth user operation; and displaying, after receiving the configuration file of the second theme, by the second device on the display, the second theme selected by the user as the home screen theme.

16. A first device comprising:

at least one processor; and at least one non-transitory computer-readable memory connected to the at least one processor and including computer program code, wherein the at least one non-transitory computer-readable memory and the computer program code are configured, with the at least one processor, to cause the first device to:

display an image collection area;

collect an image of a first object, wherein the first object comprises a second device, the second device has a display, a home screen theme displayed on the display comprises a first theme, the image of the first object comprises an image depiction of the first object and the first theme, and the first object comprises an object enabling wearing of the second device; and display a first image in the image collection area, wherein the first image comprises an image depiction of the second device and an image depiction of the object enabling wearing of the second device, and wherein the home screen theme displayed in an area of the display in the first image comprises a second theme selected by a user from a plurality of themes displayed in a style selection area of the display, wherein each theme of the plurality of themes, including the second theme, is associated with a plurality of design elements.

17. The first device according to claim 16, wherein the at least one non-transitory computer-readable memory and the computer program code are configured, with the at least one processor, to further cause the first device to:

receive a first switching instruction, wherein the first switching instruction instructs to switch from the second theme to a third theme; and display a second image in the image collection area, wherein the home screen theme displayed in the area of the display in the second image comprises the third theme.

18. The first device according to claim 16, wherein the first theme comprises a first display interface and a second display interface, and wherein the at least one non-transitory computer-readable memory and the computer program code are configured, with the at least one processor, to further cause the first device to:

receive a second switching instruction, wherein the second switching instruction instructs to switch from the first display interface of the first theme to the second display interface; and display a third image in the image collection area, wherein the second display interface of the first theme is displayed in the area of the display in the third image.

19. The first device according to claim 18, wherein the second switching instruction comprises one or more of:

a third user operation detected by the first device and performed on the first device;

a fourth user operation detected by the second device and performed on the second device; or a switching instruction automatically sent by the first device at an interval of a second time period.

20. A method, comprising:

displaying, by a first device, an image collection area;

collecting, by the first device, an image of a first object, wherein the first object comprises a second device, wherein the second device has a display, wherein a home screen theme displayed on the display comprises a first theme, wherein the image of the first object comprises a display of the first object and the first theme; and displaying, by the first device, a first image in the image collection area, wherein the first image comprises an image depiction of the second device, and wherein a home screen theme displayed in an area of the display in the first image comprises a second theme selected by a user from a plurality of themes displayed in a style selection area of the display, wherein each theme of the plurality of themes, including the second theme, is associated with a plurality of design elements.

\* \* \* \* \*